MONOLITHIC INTEGRATED STRUCTURE INCLUDING FABRICATION THEREOF

Filed May 23, 1967

36 Sheets-Sheet 1

INVENTORS
IRVING FEINBERG
JACK LEE LANGDON
CARL LEE SITLER

BY Harry M Weiss
ATTORNEY

MONOLITHIC INTEGRATED STRUCTURE INCLUDING FABRICATION THEREOF

Filed May 23, 1967 36 Sheets-Sheet 3

MONOLITHIC INTEGRATED STRUCTURE INCLUDING FABRICATION THEREOF

Filed May 23, 1967 36 Sheets-Sheet 5

Nov. 10, 1970 I. FEINBERG ET AL 3,539,876

MONOLITHIC INTEGRATED STRUCTURE INCLUDING FABRICATION THEREOF

Filed May 23, 1967 36 Sheets-Sheet 6

Nov. 10, 1970 I. FEINBERG ET AL 3,539,876

MONOLITHIC INTEGRATED STRUCTURE INCLUDING FABRICATION THEREOF

Filed May 23, 1967 36 Sheets-Sheet 9

MASK B

MASK A

MONOLITHIC INTEGRATED STRUCTURE INCLUDING FABRICATION THEREOF

Filed May 23, 1967

MASK D

MASK C

MONOLITHIC INTEGRATED STRUCTURE INCLUDING FABRICATION THEREOF

Filed May 23, 1967 36 Sheets-Sheet 21

MONOLITHIC INTEGRATED STRUCTURE INCLUDING FABRICATION THEREOF

United States Patent Office 3,539,876
Patented Nov. 10, 1970

3,539,876

MONOLITHIC INTEGRATED STRUCTURE INCLUDING FABRICATION THEREOF

Irving Feinberg, Poughkeepsie, and Jack L. Langdon and Carl L. Sitler, Wappingers Falls, N.Y., assignors to International Business Machines Corporation, Armonk, N.Y., a corporation of New York Filed May 23, 1967, Ser. No. 640,610
Int. Cl. H02b *1/04;* H05k *1/16*
U.S. Cl. 317—101 35 Claims

ABSTRACT OF THE DISCLOSURE

This invention relates generally to monolithic integrated structures including the fabrication thereof and, more particularly, to a monolithic integrated structure that is used to provide a multiplicity of various circuit interconnections so as to permit more than one circuit to be made for each structure. Many logic type integrated structures can be fabricated from a single master slice configuration which contains a number of components in a pattern favorable to the formation of any selected logic circuit from a class of many such circuits. Additionally, fabrication techniques are described for facilitating formation of the integrated chip which include mask alignment techniques, chip testing techniques, chip identification, process step identification, engineering change number identification, etc.

CROSS REFERENCES TO RELATED APPLICATIONS OR PATENTS (1) Ser. No. 364,834, now U.S. 3,335,340 filed Feb. 24, 1964, inventors Fred Barson and Walter E. Mutter.
(2) Ser. No. 376,066, now U.S. 3,343,049 filed June 18, 1964, inventors Fred Barson and William H. Miller.
(3) Ser. No. 428,733, now U.S. 3,369,991 filed Jan. 28, 1965, inventors Pieter D. Davidse and Leon I. Maissel.
(4) Ser. No. 465,034, now U.S. 3,429,040 "Circuit Structure and Method," filed June 18, 1965, inventor Lew Miller.
(5) Ser. No. 539,210, "Monolithic Integrated Structure Including Fabrication and Package Therefor," filed Mar. 31, 1966, inventors Benjamin Augusta et al.
(6) Ser. No. 606,939, "Digital Circuit With Anti-Saturation Collector Load Network," filed Jan. 3, 1967, inventor Joseph R. Cavaliere.
(7) Ser. No. 607,923, "Method for Etching an Opening in an Insulating Layer Without Forming Pinholes Therein," filed Jan. 9, 1967, inventors Fred Barson et al.
(8) "Current Switch," U.S. Pat. 2,964,652 to H. S. Yourke.
(9) "Semiconductor Device," U.S. Pat. 3,429,029, to J. L. Langdon et al.

BACKGROUND OF THE INVENTION

Field of the invention

This invention relates generally to monolithic semiconductor integrated structures including the fabrication thereof, and, more particularly, to monolithic integrated logic structures that can be readily mounted onto a module for use in machines such as computers, etc.

Description of the prior art

Recently, the fabrication of monolithic integrated semiconductor circuits, preferably of silicon, has become more important in producing electronic equipment that requires, for competitive reasons, low cost integrated devices. The current trend in making integrated devices is to use the socalled "planar technology" wherein all diffusions are carried out on one surface of the semiconductor structure. In the manufacture of integrated devices using the "planar technology," the "master slice concept" became important in permitting the fabrication of integrated circuits of many types from a single "master slice." Problems were encountered in selected the proper master slice configuration which would provide the flexibility desired for making a number of desired electrical circuits. The proper location of components became an important consideration. Furthermore, fabrication techniques were needed to permit proper identification of the integrated chip, the completed step in the process of making the integrated chip, the dicing of the integrated chip, etc.

SUMMARY OF THE INVENTION

Accordingly, it is an object of this invention to provide an improved monolithic integrated structure.

It is a further object of this invention to provide an improved monolithic semiconductor master slice configuration.

It is a still further object of this invention to provide an improved monolithic semiconductor master slice structure for use in making monolithic integrated logic chips.

It is a still further object of this invention to provide an improved fabrication method for making monolithic integrated devices.

It is an even further object of this invention to provide an improved package for a monolithic integrated chip.

It is another object of this invention to provide improved active and passive components for use in monolithic integrated chips.

DESCRIPTION OF THE PREFERRED EMBODIMENTS

In accordance with one embodiment of this invention, a monolithic semiconductor master slice structure comprises a monocrystalline semiconductor substrate and spaced terminal pad areas located about the peripheral portion of the structure. An excess number of active and passive components are located in the area defined by the pad areas thereby permitting several integrated circuits to be fabricated from the master slice structure by selecting and interconnecting the desired active and passive components.

In accordance with another embodiment of this invention, a monolithic integrated semiconductor chip comprises a monocrystalline semiconductor substrate having spaced terminal pads located about the peripheral portion of the chip. Active and passive components are located in the semiconductor area defined by the terminal pads. Metal conductive paths electrically interconnect less than all of said active and passive components located in the area defined by the terminal pads to specified terminal pads.

In accordance with still another embodiment of this invention, a resistor for a monolithic integrated semiconductor chip comprises a substrate of one type conductivity. A low resistance region of the opposite type conductivity is located in the substrate and along one surface portion thereof. A high resistance region of the same conductivity type as the low resistance region is located on the substrate and on the low resistance region. A surrounding region of the same conductivity type as the substrate and in contact therewith electrically isolates the high resistance region. A pair of spaced low resistivity regions is located in surface portions of the high resistance region. Each of the pair of spaced low resistivity regions is of the same conductivity type as the high resistance region and right angularly skewed with respect to the separated low resistance region. Ohmic contacts are provided to the pair of spaced low resistivity regions.

In accordance with still another embodiment of this invention, a process for fabricating a monolithic integrated semiconductor chip includes the formation of spaced terminal pads in a parallel-sided configuration. Two adjacent spaced pads located on each side of two opposite parallel sides of the chip are spaced further apart than the space between any other pair of adjacent pads. Metallized marks are formed 90° apart on at least one corner terminal pad for mask alignment purposes. Additionally, metallized dicing mark indicators are formed adjacent the corner pads of the chip.

In accordance with another embodiment of this invention, a module package for monolithic integrated semiconductor structures comprises a dielectric substrate. A conductive land pattern is formed on a surface of the dielectric substrate. A plurality of pins for module connection penetrates the dielectric substrate and connects to the conductive land pattern. A monolithic integrated semiconductor chip is spaced from the surface of the dielectric substrate by means of terminal pads which are connected to the lands. Each of the plurality of pins is electrically connected to a terminal pad of the chip.

The foregoing and other objects, features and advantages of the invention will be apparent from the following more particular description of the preferred embodiments of the invention, as illustrated in the accompanying drawings.

BRIEF DESCRIPTION OF THE FIGURES

FIG. 1R′ is a top view of the resistor structure shown in step 5 of FIG. 1R which identifies the 1R resistor of the master slice of FIG. 4 (FIGS. 4A, 4B) and FIG. 20 (FIGS.20A, 20B, 20C and 20D);

FIG. 1U′ is a top view of the underpass structure shown in step 4 of FIG. 1U;

FIG. 2R′ is a top view of the resistor structure shown in step 6 of FIG. 2R;

FIG. 3R′ is a top view of the 3R resistor structure shown in step 4 of FIG. 3R;

FIG. 4′ is a diagrammatic representation illustrating FIG. 4A and FIG. 4B as left and right portions of FIG. 4;

FIG. 5′ is a diagrammatical view, in box form, showing the interrelationship of FIGS. 5A and 5B which together form the composite metallized pattern of FIG. 5;

FIG. 6′ is a diagrammatical view, in box form, showing the interrelationship of FIGS. 6A and 6B which together form the composite metallized master slice configuration of FIG. 6;

FIG. 20′ is a diagrammatical view, in box form, showing the interrelationship of FIGS. 20A, 20B, 20C, and 20D which together form the composite master slice of FIG. 20;

FIG. 21′ is a diagrammatical view, in box form, showing the interrelationship of FIGS. 21A, 21B, 21C and 21D which together form the composite metallized master slice configuration of FIG. 21;

FABRICATION METHOD

Figure 1:
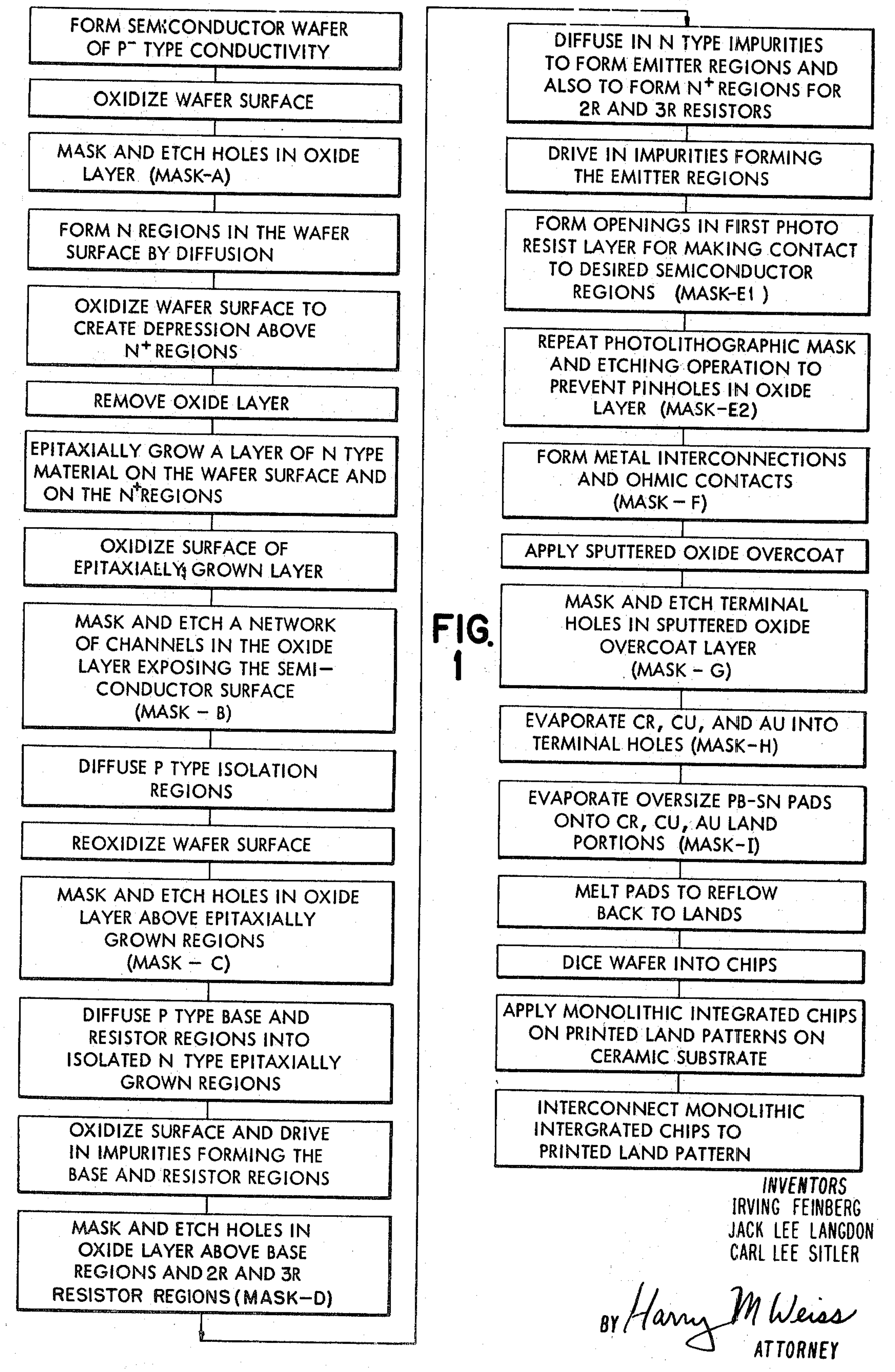
FIG. 1 is a flow diagram of the entire fabrication process for making the monolithic integrated structure and interconnecting it to a conductive land pattern formed on a ceramic substrate.

In discussing the semiconductor fabrication method, as illustrated by the flow diagram of FIG. 1, the usual terminology that is well known in the transistor field will be used. In discussing concentrations, references will be made to majority or minority carriers. By "carriers" is signified the free-holes or electrons which are responsible for the passage of current through a semiconductor material. Majority carriers are used in reference to those carriers in the material under discussion, i.e. holes in P type material or electrons in N type material. By use of the terminology "minority carriers" it is intended to signify those carriers in the minority, i.e. holes in N type material or electrons in P type material. In the most common type of semiconductor materials used in present day transistor structure, carrier concentration is generally due to the concentration of the "significant impurity," that is, impurities which impart conductivity characteristics to extrinsic semiconductor materials.

Although for the purpose of describing this invention reference is made to a semiconductor configuration wherein a $P^-$ type region is utilized as the substrate and subsequent semiconductor regions of the composite semiconductor structure are formed in the conductivity type described, it is readily apparent that the same regions that are referred to as being of one conductivity type can be of the opposite type conductivity and furthermore, some of the operations which are described as diffusion operations can be made by epitaxial growth and some of the epitaxial growth regions can also be fabricated by diffusion techniques.

A wafer of $P^-$ type conductivity preferably having a resistivity of 10 to 20 ohms-centimeter and a thickness of about 10 mils is used as the starting substrate. The substrate is preferably a monocrystalline silicon structure which can be fabricated by conventional techniques such as by pulling a rod-shaped silicon semiconductor member from a melt containing the desired impurity concentration and then slicing the pulled member into a plurality of wafers. The substrate preferably has a crystallographic orientation of about 2.5° off the <111> plane in the direction of the <110> plane to minimize pattern "shift" or "washout" after epitaxial growth. An oxide coating preferably of silicon dioxide and preferably having a thickness of approximately 6000 angstrom units is either thermally grown or deposited by pyrolytic deposition. Alternatively, an RF sputtering technique, as described in a patent application identified as S.N. 428,733, filed Jan. 28, 1965, in the names of Davidse and Maissel and assigned to the same assignee as this invention, can be used to form the silicon dioxide layer.

Figure 7:
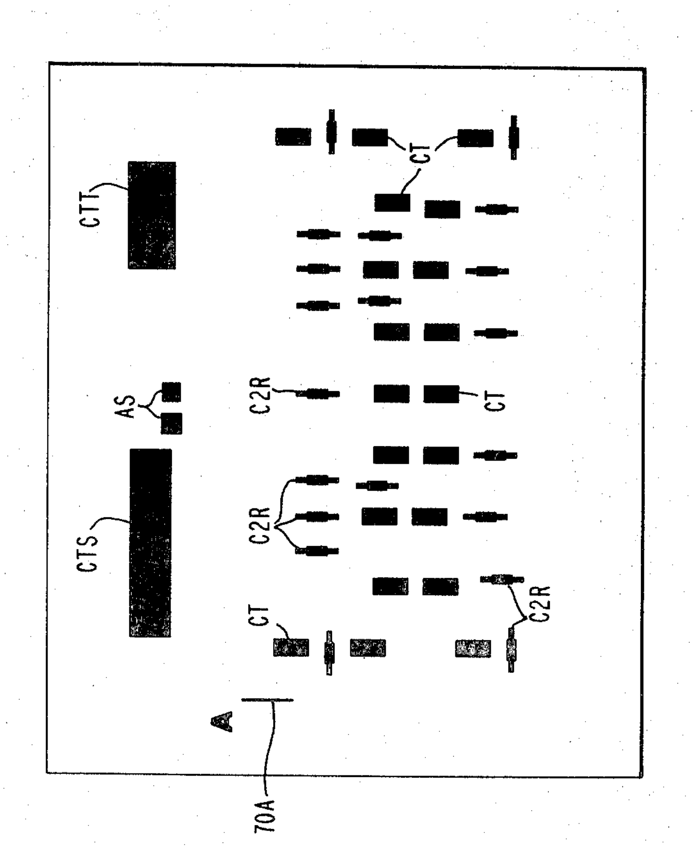

Using standard photolithographic masking and etching techniques a photoresist layer (not shown) is deposited onto the oxide layer located on the substrate surface. By using an appropriate mask (mask A as shown by FIG. 7) the photoresist layer serves as a mask to expose surface regions on the surface of the substrate by etching away the desired portions of the $SiO_2$ layer with a buffered HF solution. The photoresist layer is then removed to permit further processing.

A diffusion operation is carried out to diffuse into the exposed surface portions of the substrate $N^+$ type regions having a $C_o$ of $2\times10^{20}$ cm.$^{-3}$ of N type majority carriers. The sheet resistance of the $N^+$ regions is approximately 9.0 ohms per square, and the depth of each diffused region is approximately 90 micro inches. The surface oxide layer serves as a diffusion mask to prevent the $N^+$ diffusion operation from forming an $N^+$ region across the entire surface of the substrate. Preferably, the diffusion operation is carried out in an evacuated quartz capsule using degenerate arsenic doped silicon powder. As an alternative variation, each $N^+$ region can be formed by etching out regions in the $P^-$ type substrate and then subsequently epitaxially growing $N^+$ regions thereby using an etch and refill technique.

After the $N^+$ diffusion operation, an oxidation step is preferably performed which causes conversion of the $N^+$ surface regions into oxide (more than the remainder of the oxide masked surface of the substrate) and thereby creates a depression on each $N^+$ surface region to permit subsequent identification or location after epitaxial growth.

The oxide layer which is located on the entire surface of the substrate layer is removed with a buffered HF solution. A region of N type conductivity, preferably having a resistivity of 0.09 ohms centimeter, is epitaxially grown on the surface of the substrate and over the depressed $N^+$ surface regions. The epitaxial region is an arsenic doped layer approximately $5.5\pm.2$ microns thick. The depressions or recesses designating the location of the $N^+$ regions are now located on the surface of the epitaxial layer to facilitate subsequent photolithographic masking and etching operations. In actual device fabrication, the arsenic impurities in the $N^+$ regions, which are now buried, outdiffuse about one micron during the epitaxial deposition.

An oxide layer approximately 4000 angstrom units thick is formed on the surface of the epitaxially grown region either by the thermal oxidation process, by pyrolytic deposition, or by RF sputtering techniques.

Figure 8:
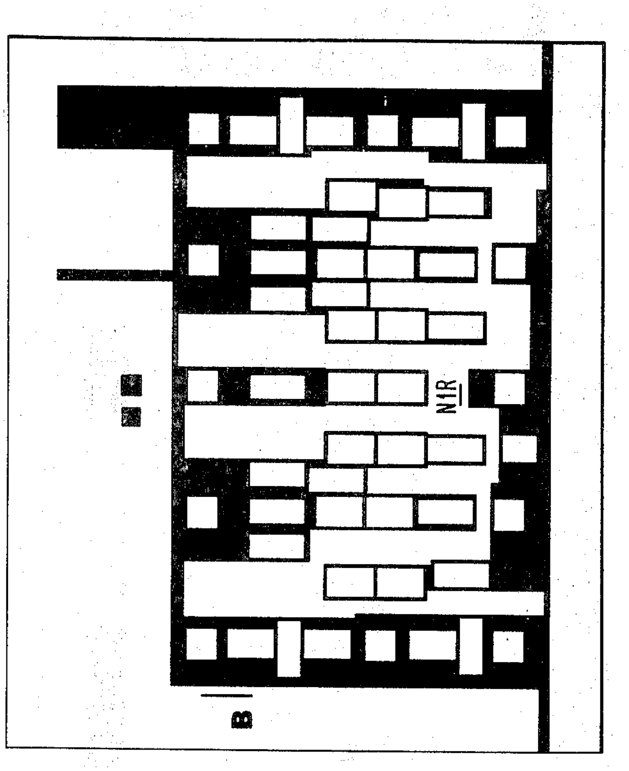
FIGS. 7, 8, 9, 10, 11, 12, 13, 14, 15 and 16 are planar views of the masks used in the fabrication process for making the monolithic integrated structure of the FIG. 6 embodiment of this invention.

An isolation pattern of channels are formed in the oxide layer by standard photolithographic masking and etching techiques using a photoresist layer as a mask and a buffered HF solution to remove the desired oxide portions. The mask used in conjunction with the photoresist layer is Mask B as shown in FIG. 8.

The structure is now prepared for the subsequent isolation diffusion operation. A $P^+$ diffusion operation is now carried out, preferably using a boron source, to form isolating $P^+$ regions and the $P^+$ under pass region (see FIG. 1U) in the N type epitaxially grown region. The $P^+$ regions have a $C_o$ (surface concentration) of $2.2\times10^{20}$ cm.$^{-3}$ and a sheet resistance of 2.5 ohms per square. It is evident that the $P^+$ diffused regions have a low resistivity surface region which extends downwardly from the surface of the semiconductor structure and each $P^+$ region extends continuously from the $P^-$ type substrate region to the surface of the semiconductor structure. The depth of each P+ region is approximately 300 micro inches.

Figure 9:
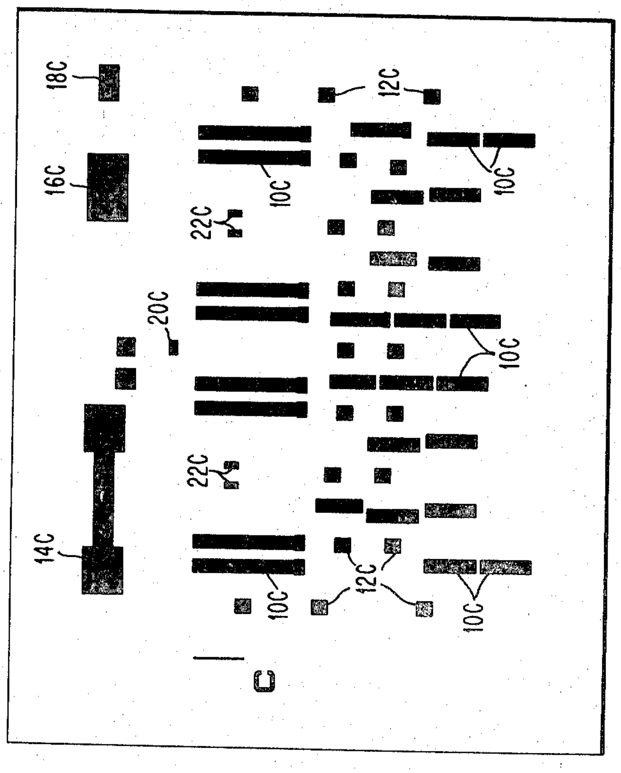

A reoxidation operation is now carried out and by using photolithographic masking and etching techniques (with Mask C as shown in FIG. 9) holes are opened up in the oxide layer to permit a base or P-type diffusion. The P-type diffusion operation is carried out through the exposed semiconductor surface portions to form P-type base regions for each transistor T, P-type resistivity regions for each 1R resistor, and the P++ regions for the U underpass conductor. Boron is preferably used as the P-type impurity source to form regions having a $C_o$ of $1\times10^{19}$ atoms per cm.$^{+3}$, a sheet resistance of $150\pm$ 5 ohms per square, and a depth of about 80 micro inches.

The P-type diffusion step is followed by a simultaneous reoxidation and drive-in operation. Another layer of $SiO_2$ is thereby grown on the substrate surface. During this heat treatment, the boron impurities are redistributed thereby increasing the junction depth and lowering the $C_0$.

Figure 10:
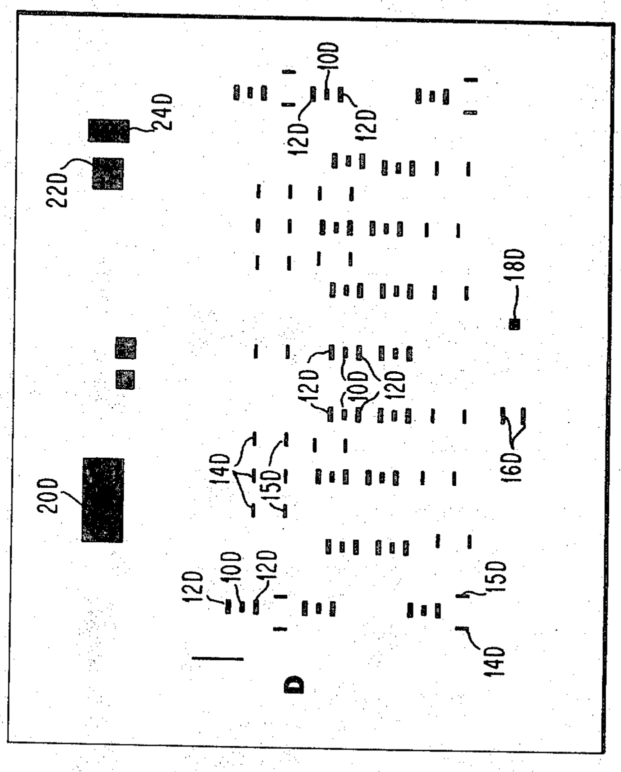

A photoresist coating is applied over the thermally grown oxide layer and by photolithographic masking and etching operations (using Mask D as shown in FIG. 10) openings are formed in this oxide layer to permit N+ emitter type regions (for each T transistor) to be formed by a subsequent diffusion operation, two N+ contact regions for the collector of each T transistor, and N+ contact regions for the 2R and 3R resistors. The two N+ contact regions for each collector of the T transistor reduces the series resistance of the collector. N+ emitter regions are formed in the P-type base region of each T transistor.

The N+ regions are preferably formed using a phosphorous impurity source. The N+ contact regions for the 2R resistors are located right angularly skewed with respect to narrow extension portions of the buried N+ subcollector region. The $C_o$ is $2.5\times10^{21}$, the sheet resistance is 3.5 ohms per square, and the depth is approximately 71 microinches. A phosphosilicate glass layer is formed on the substrate surface due to the phosphorous diffusion operation. The base channel width of each T transistor is approximately 17 microinches due to "push out" of the base region after formation of the diffused emitter region. The emitter and base regions of each T transistor are formed over the buried N+ region to permit this region to act as a buried low resistivity subcollector.

Figure 12:
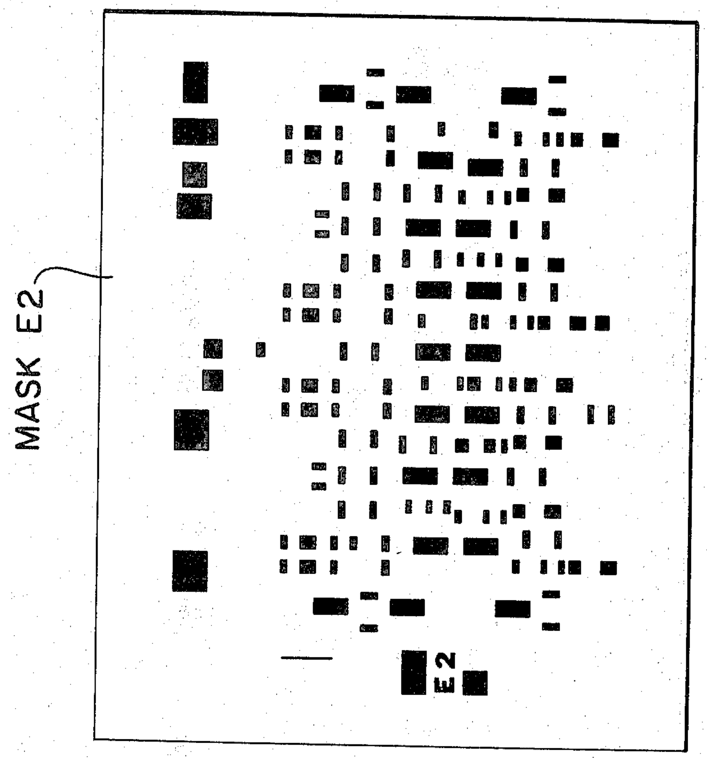
Figure 11:
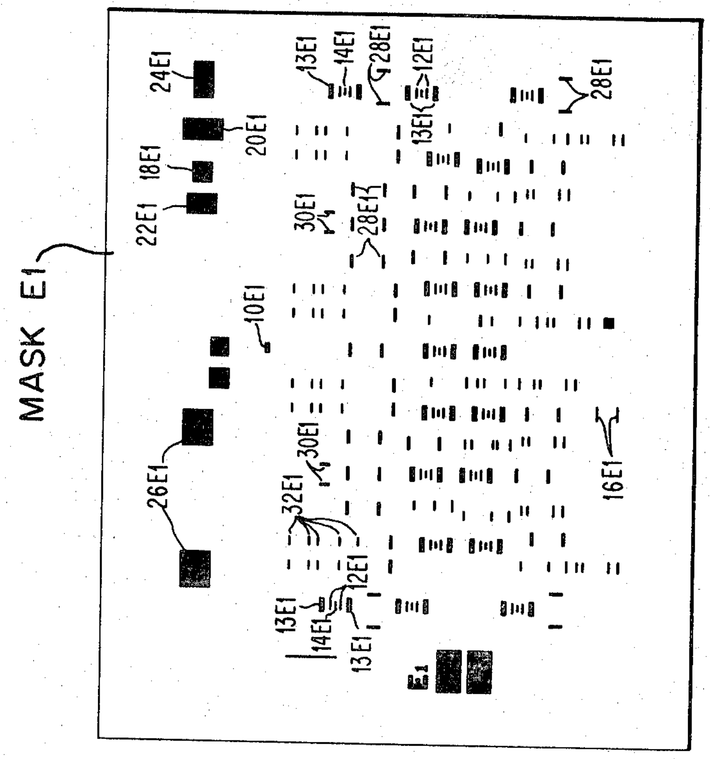

A drive-in operation is carried out using a nitrogen atmosphere. The purpose of carrying out a drive-in operation in a non-oxidizing atmosphere such as nitrogen is to maintain a high $\beta$ for the transistor T. If desired, following the emitter drive-in operation, a sputtered glass layer can be deposited on the phosphosilicate glass layer to protect the phosphosilicate glass layer which is needed for stability purposes as described in copending U.S. patent application S.N. 376,066, now U.S. 3,343,049 inventors William H. Miller and Fred Barson, filed June 18, 1964 and assigned to the same assignee of this invention. Contact holes are opened up in the oxide layer in selected areas thereof by using two photoresist layers and two successive photolithographic masking and etching techniques (one for each layer using Mask E1 as shown in FIG. 11 on the first photoresist layer and Mask E2 as shown in FIG. 12 on the second photoresist layer). The advantages of such a masking and etching process where the second mask also acts as a block out mask is clearly set forth in FIG. 3 of a copending patent application entitled "Method for Etching an Opening in an Insulating Layer Without Forming Pinholes Therein," filed Jan. 9, 1967, inventors Fred Barson et al., and assigned to the same assignee of this invention. For example, the dimensions of the emitter contact hole is 0.7 x 0.2 mils, each base contact hole 0.2 x 1.0 mils, and each collector contact hole 0.5 x 1.4 mils.

Figure 13:
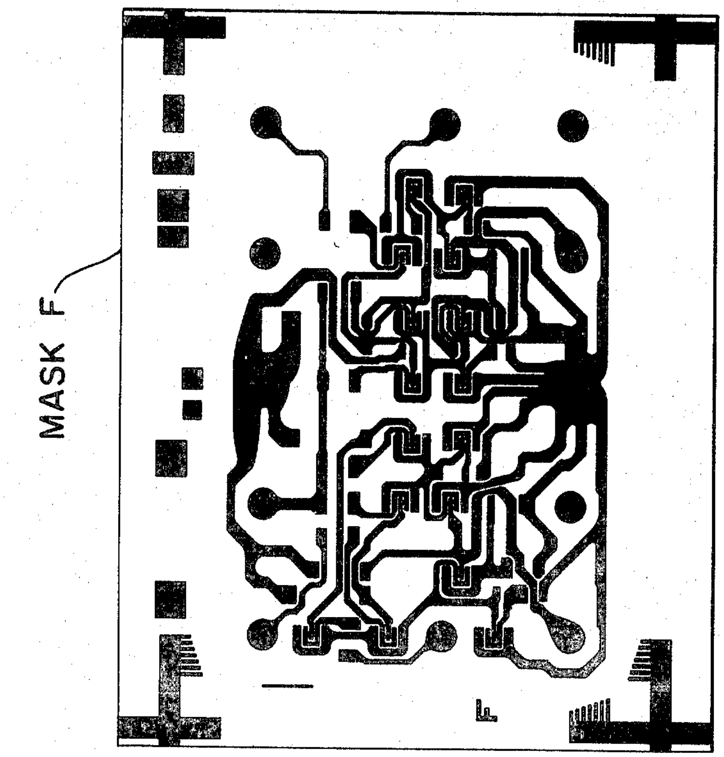

A layer of aluminum or other suitable metal such as molybdenum is evaporated over the entire wafer surface and portions of this layer are etched away to produce the desired interconnection pattern. An evaporated layer of aluminum with a thickness of several thousand angstrom units is useful to permit the formation of an interconnecting conductive path between components to thereby form the desired integrated circuit. A layer of photoresist is then applied to the wafer, dried, exposed, developed, and fixed. The aluminum interconnections are formed by a subtractive etching operation (with Mask F as shown in FIG. 13) using a warm solution of $H_3PO_4+HNO_3+H_2O$. The photoresist layer is stripped off and the wafer is cleaned and dried.

The wafers are sintered in a nitrogen atmosphere at a temperature of about 450° C. for a period of about 15 minutes to permit the aluminum to produce good ohmic contact to the contacted semiconductor regions of the wafer. Thus, ohmic contacts are formed to each of the components.

Figure 14:
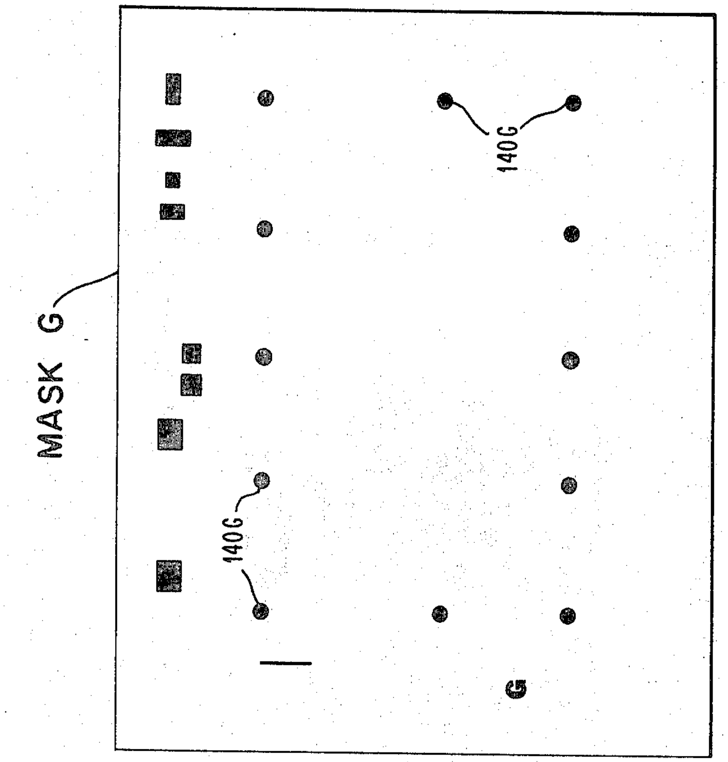

Subsequently, a sputtered or otherwise deposited insulating layer of $SiO_2$ or other form of glass material is formed on the entire wafer surface. This encapsulating layer is provided over the entire wafer surface after the aluminum land pattern is formed on the oxide layer. Openings are formed over the terminal portion of each land that is selected for pad P formation. This opening is made by conventional photoltihographic masking and etching techniques using a photoresist layer as a mask (Mask G as shown in FIG. 14).

Figure 15:
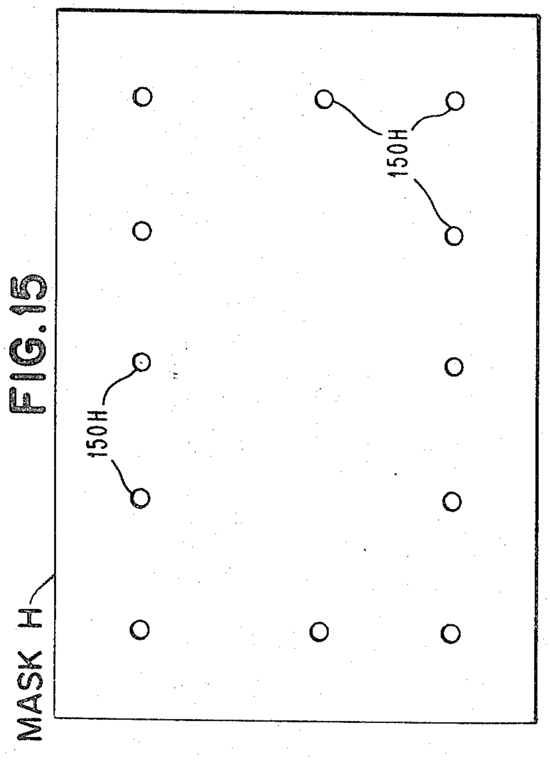

Successive layers of chromium, copper, and gold are deposited into and about the periphery of each opening formed by the previous photolithographic masking and etching operation. This is carried out using mask H as shown in FIG. 15 to permit terminal contact formation.

Figure 16:
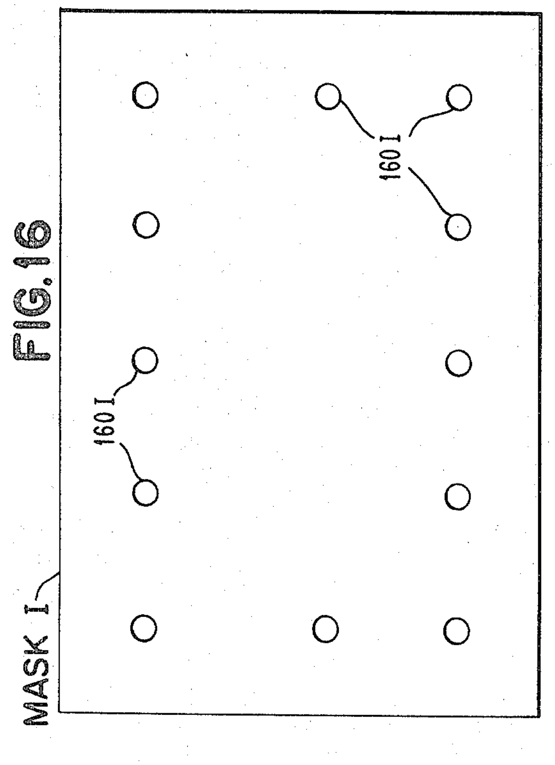

Subsequently, a layer of lead-tin solder is deposited over each gold layer of each terminal hole and, by heat and reflow techniques, a ball of solder is formed on the gold limiting land as the solder will not adhere to or wet the surface of the sputtered insulating layer. Mask I as shown in FIG. 16 is used for the purpose of depositing the lead-tin solder areas. Thus, the pads P of the master slice are formed in this manner to thereby permit electrical contact between the devices—through the lands—to the module. The pads P are designated on the master slice of FIG. 4 as P1, P2 . . . P12 and are designated on the master slice of FIG. 20 as P1, P2 . . . P16. The pads P also permit electrical standoff between the chip and the module.

The wafer is now ready to be tested or, if desired, the wafer is diced into chips and each of the chip are tested electrically.

The integrated circuit chips are mounted on a module having printed conductive lands located thereon. The lands on the module are preferably coated with a lead-tin solder to facilitate interconnection between each chip and the module.

In joining the chips to the module, a joining procedure, described in a patent application entitled, "Circuit Structure and Method," filed June 18, 1965, S.N. 465,034, now U.S. 3,429,040 inventor Lew Miller, and assigned to the same assignee of this invention, is used.

A copending patent appliaction entitled, "Monolithic Integrated Structure Including Fabrication and Package Therefor," which was filed in the name of Benjamin Agusta et al. on Mar. 31, 1966, S.N. 539,210, and assigned to the same assignee of this invention provides additional detailed information in fabricating integrated devces of this type. Accordingly, this copending patent application is incorporated herewith by reference.

The following descriptions of the individual components used in each master slice indicate generally the specific fabrication steps that are employed in making each semiconductor component.

TRANSISTOR (T)

Although for the purpose of describing the transistor reference is made to a semiconductor configuration wherein a P− type region is utilized as the substrate and subsequent semiconductor regions of the composite semiconductor structure are formed in the conductivity type shown in the drawings, it is readily apparent that the same regions shown in the drawings can be of opposite type conductivities and furthermore, some of the operations which are described as diffusion operations can be made by epitaxial growth and some of the epitaxial growth regions can also be fabricated by diffusion techniques.

Figures 1C, 2C, 3C, 4C:
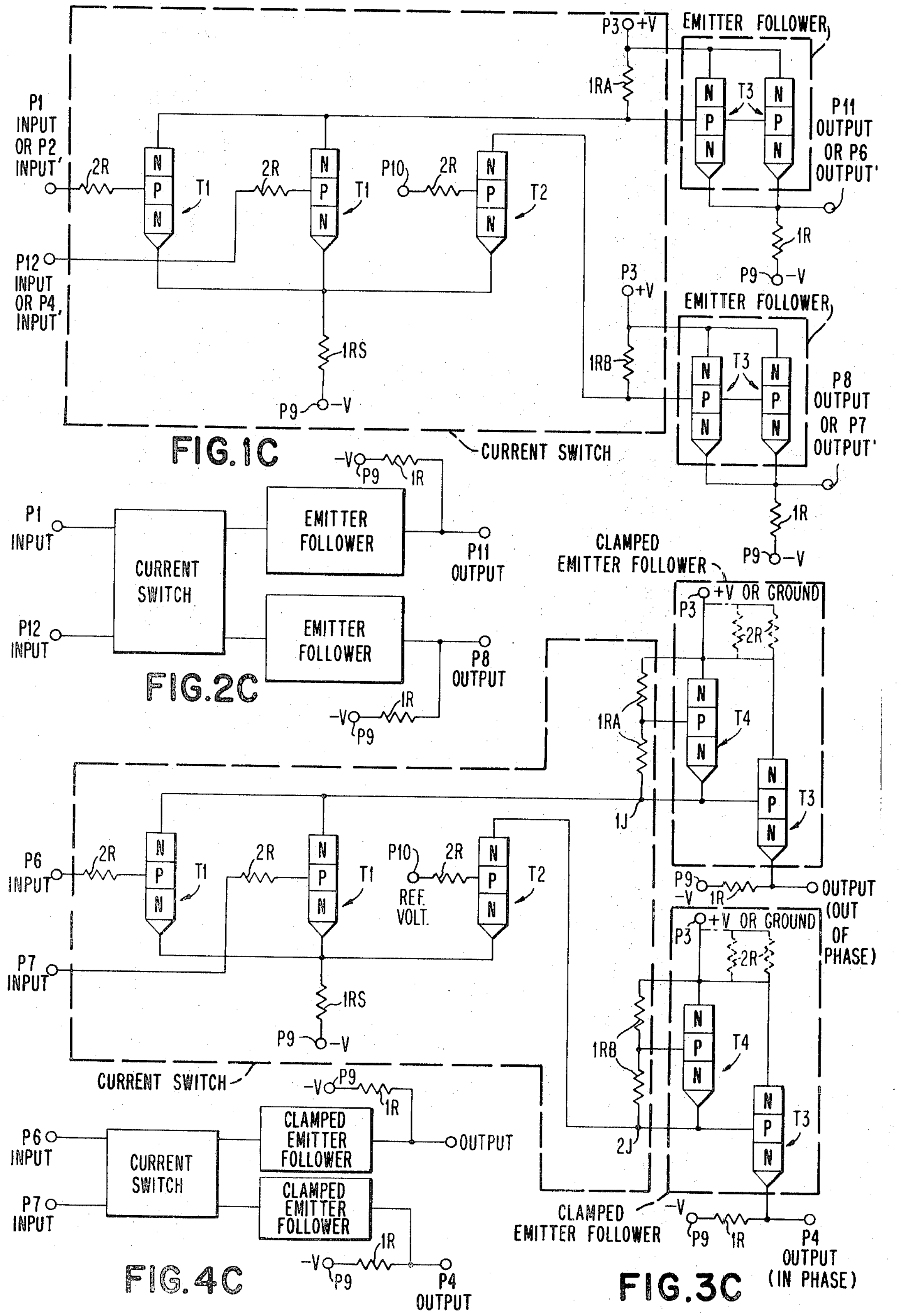
FIG. 1C is an electrical schematic representation of one type of logic circuit manufactured by the process of FIG. 1.
FIG. 2C is a logic diagram, in block form, of the logic circuit of FIG. 1C.
FIG. 3C is an electrical schematic representation of another logic circuit which is used in the metallized integrated structure of FIGURE 6.
FIG. 4C is a logic diagram, in box form, of the logic circuit of FIG. 3C.
Figure 1R:
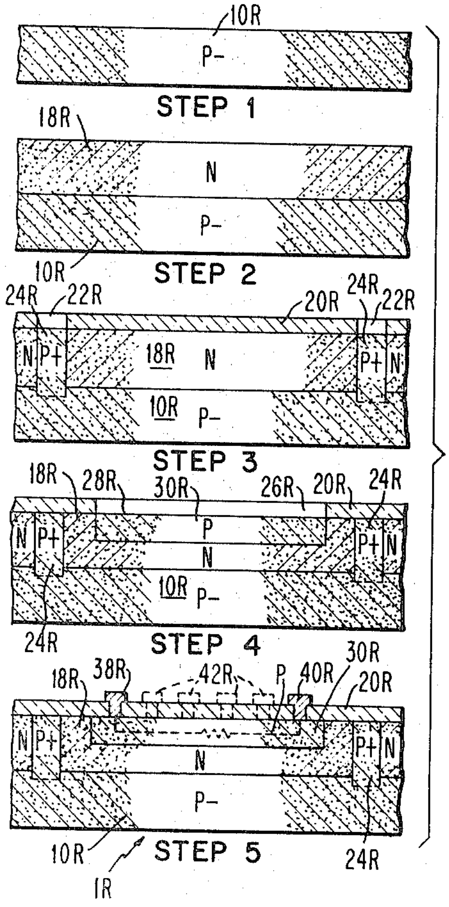
FIG. 1R is a flow diagram depicting in cross section, the steps in the process for fabricating the 1R resistor identified in the master slice of FIG. 4 (FIGS. 4A, 4B) and FIG. 20 (FIGS. 20A, 20B, 20C and 20D)
Figures 1P, 1U:
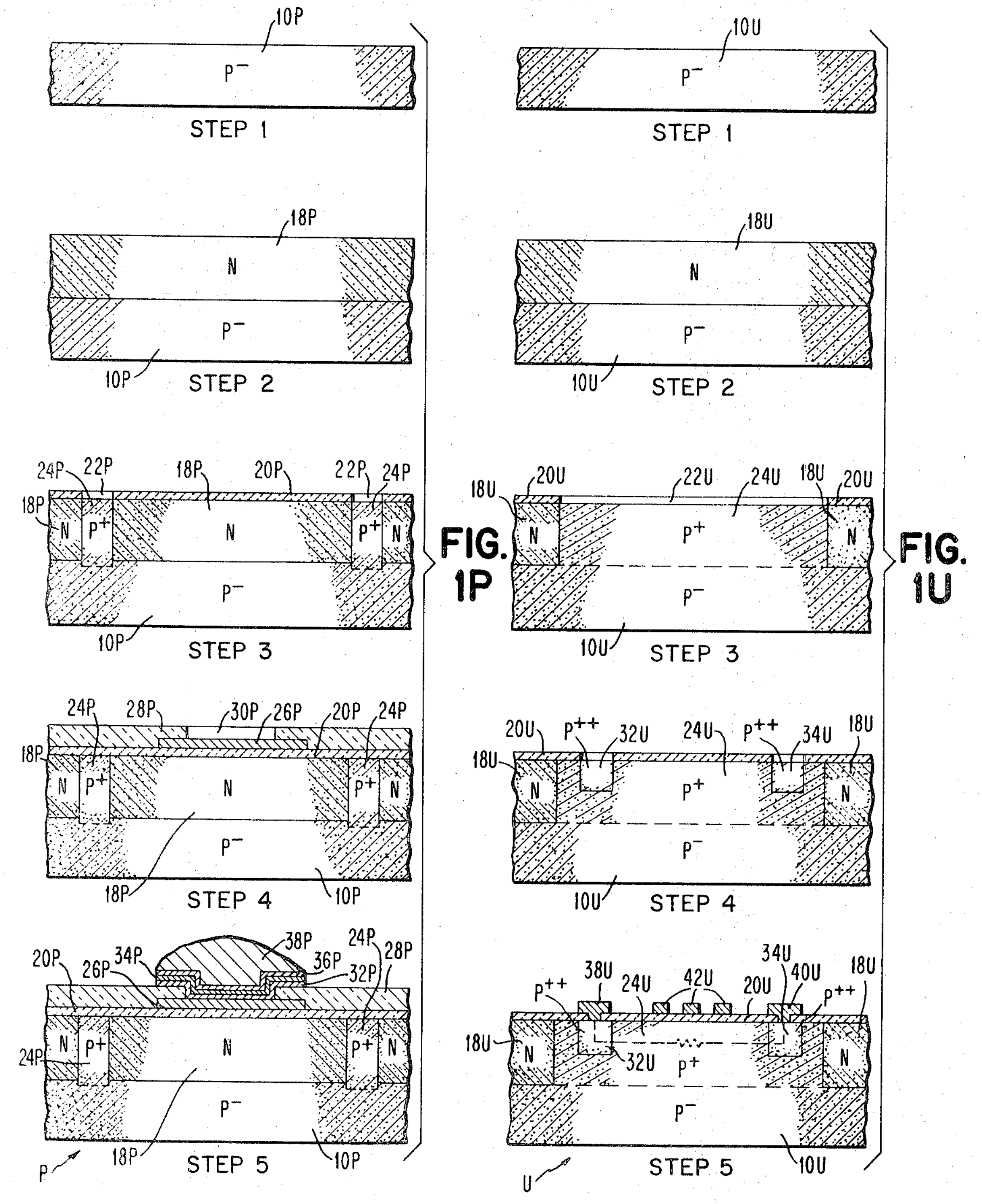
FIG. 1P is a flow diagram, in cross section, depicting the steps in the process for fabricating each terminal structure P of the integrated structure of FIGS. 5, 6 and 21.
FIG. 1U is a flow diagram, in cross section, showing the steps in the process for fabricating the semiconductor underpass conductor U of the master slice of FIG. 4 (FIGS. 4A, 4B)
Figures 1T, 2T:
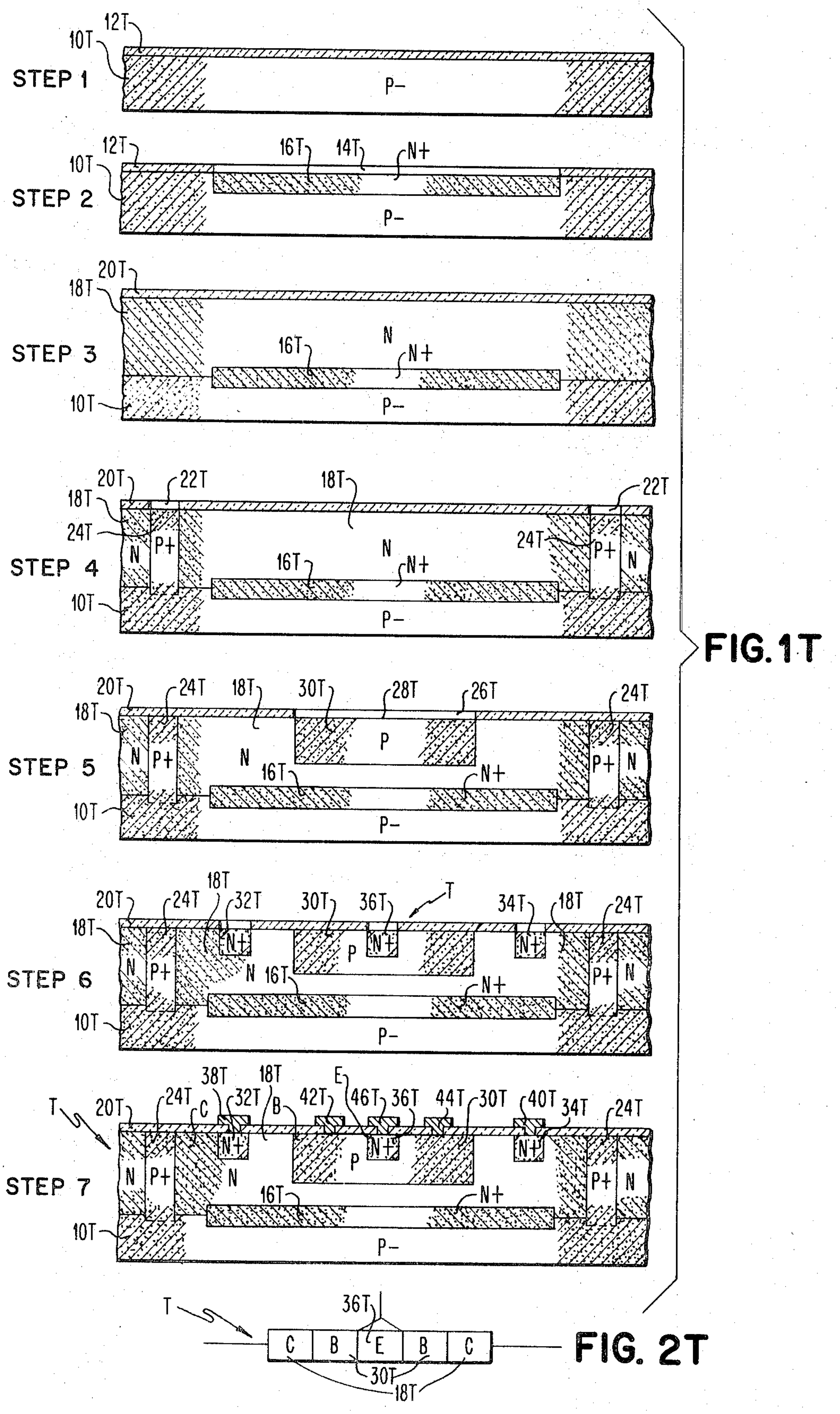
FIG. 1T is a flow diagram, in cross-sectional form, depicting the steps in the process for fabricating the transistor T of the master slice of FIG. 4 (FIGS. 4A, 4B) and FIG. 20 (FIGS. 20A, 20B, 20C and 20D)
FIG. 2T is an electrical schematic representation of the transistor device shown in step 7 of FIG. 1T of the master slice of FIG. 4 (FIGS. 4A, 4B) and FIG. 20 (FIGS. 20A, 20B, 20C and 20D), which transistor representation is used to depict the transistor T in the electrical schematics of FIGS. 5C, 6C, and 22.
Figure 1R:
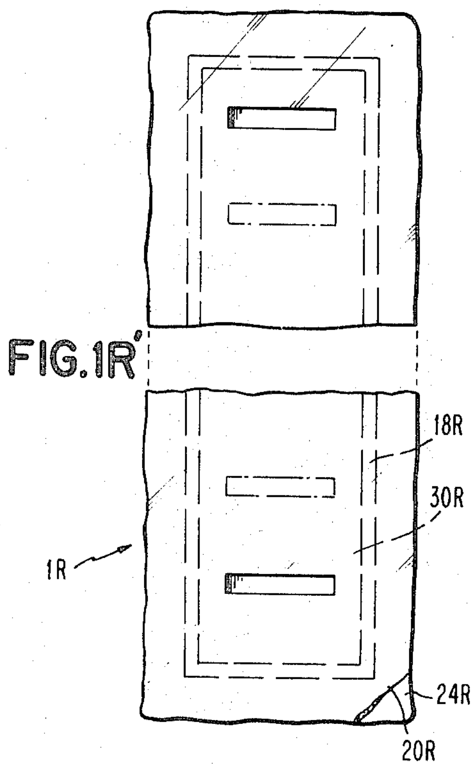
Figure 2R:
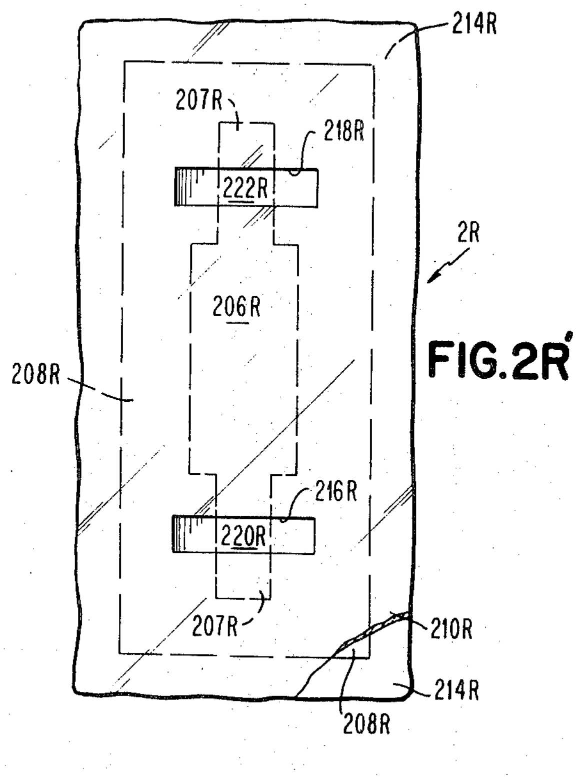

Referring to FIG. 1T, step 1 depicts a substrate 10T of $P^-$ type conductivity, preferably having a resistivity of 10 to 20 ohms-centimeter and a thickness of about 10 mils. The substrate 10T is preferably a monocrystalline silicon structure which can be fabricated by conventional techniques such as by pulling a rod-shaped silicon semiconductor member from a melt containing the desired impurity concentration and then slicing the pulled member into a plurality of wafers. The substrate 10T is a portion of one such wafer and has a crystallographic orientation of about 2.5° off the <111> plane in the direction of the <110> plane. An oxide coating 12T preferably of silicon dioxide and preferably having a thickness of approximately 6000 angstrom units is either thermally grown or deposited by pyrolytic deposition. Alternatively, an RF sputtering technique, as described in a patent application identified as S.N. 428,733, filed Jan. 28, 1965, in the names of Davidse and Maissel and assigned to the same assignee as this invention, can be used to form the silicon dioxide layer 12T.

In step 2, by standard photolithographic masking and etching techniques a photoresist layer (not shown) is deposited onto the substrate including the surface of the oxide layer 12T and by using the photoresist layer as a mask a surface region 14T is exposed on the surface of the substrate 10T by etching away the desired portion of the $SiO_2$ layer 12T with a buffered HF solution. The photoresist layer is then removed to permit further processing. A diffusion operation is carried out to diffuse into the surface 14T of the substrate 10T an $N^+$ type region 16T having a $C_0$ of $2\times20^{20}$ cm.$^{-3}$ of N type majority carriers. The sheet resistance of the $N^+$ region 16T is approximately 9.0 ohms per square, and the depth of the diffused region is approximately 90 micro inches. The oxide layer 12T serves as a mask to prevent the $N^+$ region 16T from being formed across the entire surface of the substrate 10T. Preferably, the diffusion operation is carried out in an evacuated quartz capsule using degenerate arsenic doped silicon powder. As an alternative variation, the $N^+$ region 16T can be formed by etching out a channel in the $P^-$ type substrate 10T and then subsequently epitaxially growing an $N^+$ region.

In step 3, after removing the oxide layer 12T with a buffered HF solution, a region 18T of N type conductivity, preferably having a resistivity of 0.09 ohms centimeter, is epitaxially grown on the surface of the substrate. The epitaxial region 18T is an arsenic doped layer approximately 5.5±.2 microns thick. In actual device fabrication, the arsenic impurities in the region 16T, which are now buried, outdiffuse about one micron during the epitaxial deposition. An oxide layer 20T approximately 4000 angstrom units thick is formed on the surface of the epitaxially grown region 18T either by the thermal oxidation process, by pyrolytic deposition, or by RF sputtering techniques.

In step 4, a continuous opening 22T is formed in the oxide layer by standard photolithographic masking and etching techniques using a photoresist layer as a mask and a buffered HF solution to remove the desired oxide portions. The structure is now prepared for the subsequent isolation diffusion operation. A $P^+$ diffusion is now carried out, preferably using a boron source, to form surrounding region 24T in the N type epitaxially grown region 18T. The region 24T has a $C_0$ (surface concentration) of $2.2\times10^{20}$ cm.$^{-3}$ and a sheet resistance of 2.5 ohms per square. It is evident that the $P^+$ isolation diffused region 24T will have a low resistivity surface region which extends downwardly from the surface of the semiconductor structure and the full isolation region extends continuously from the P type substrate region 10T to the surface of the semiconductor structure. The depth of the $P^+$ region 24T is approximately 300 micro inches.

In step 5, a reoxidation operation is carried out and by using photolithographic masking and etching techniques a hole 26T is opened up in the oxide layer 20T above the isolated N type region 18T so as to permit a base type diffusion. A base type diffusion operation is carried out through semiconductor surface portion 28T to form a P-type base region 30T. Boron is preferably used as the impurity source to form a region having a $C_0$ of $1\times10^{19}$ atoms per cm.$^{-3}$, a sheet resistance of 150±5 ohms per square, and a depth of about 80 micro inches.

In step 6, the base diffusion step is followed by a simultaneous reoxidation and drive-in operation. Another layer of $SiO_2$ is thereby grown on the substrate surface. During this heat treatment, the boron impurities are redistributed thereby increasing the junction depth and lowering the $C_0$.

A photoresist coating is applied over the oxide layer 20T and by photolithographic masking and etching operations three portions of this oxide layer are removed to permit emitter type regions to be formed by a diffusion operation. Two $N^+$ emitter type regions 32T and 34T are formed in the N type collector region 18T to provide good electrical contact regions and thus permit more than one low resistance electrical contact to be made to the collector thereby reducing the series resistance thereof. An $N^+$ emitter region 36T is also formed in the P-type base region 30T simultaneous with the formation of regions 32T and 34T.

The $N^+$ regions 32T, 34T, and 36T are preferably formed using a phosphorous impurity source. The $C_0$ of the regions 32T, 34T, and 36T is $2.5\times10^{21}$, the sheet resistance is 3.5 ohms per square, and the depth is approximately 71 microinches. Hence, the base channel width is approximately 17 microinches due to "push out" of the base region after formation of the diffused emitter region. The emitter and base regions are formed over the buried $N^+$ region to permit this region to act as a buried low resistivity sub-collector.

A drive-in operation is carried out using a nitrogen atmosphere. Holes are opened up in the oxide layer in selected areas thereof by using photolithographic masking and etching techniques. For example, the dimensions of the emitter contact hole is 0.7 x 0.2 mils, each base contact hole 0.2 x 1.0 mils, and each collector contact hole 0.5 x 1.4 mils. A layer of aluminum or other suitable metal such as molybdenum is evaporated over the entire wafer surface and portions of this layer are etched away to produce the desired interconnection pattern. The evaporated layer of aluminum has a thickness of several thousand angstrom units. A layer of photoresist is then applied to the wafer, dried, exposed, developed, and fixed. The aluminum interconnections are formed by a subtractive etching operation using a warm solution of $H_3PO_4+HNO_3+H_2O$. The photoresist layer is stripped off and the wafer is cleaned and dried.

The wafers are sintered in a nitrogen atmosphere at a temperature of about 450° C. for a period of about 15 minutes to permit the aluminum to produce good ohmic contact to the contacted semiconductor regions of the wafer. Thus, ohmic contacts 38T and 40T provide electrical connection to the collector 18T, ohmic contacts 42T and 44T provide electrical connection to the base region 30T, and ohmic contact 46T provides electrical connection to the emitter region 36T (see step 7).

Each transistor T shown in the master slice is fabricated in this manner. FIG. 2T illustrates schematically how each transistor T is depicted. Due to the two contacts 38T and 40T to the collector region 18T, two C boxes are used to facilitate showing electrical connection to each of the two collector contacts. Similarly, due to the two contacts 42T and 44T to the base region 30T, two B boxes are used to facilitate showing electrical connection to each of the two base contacts. Finally, the E box, located in the center of the five box array depicting the transistor device of this monolithic integrated structure, designates the emitter 36T.

Figure 3R:
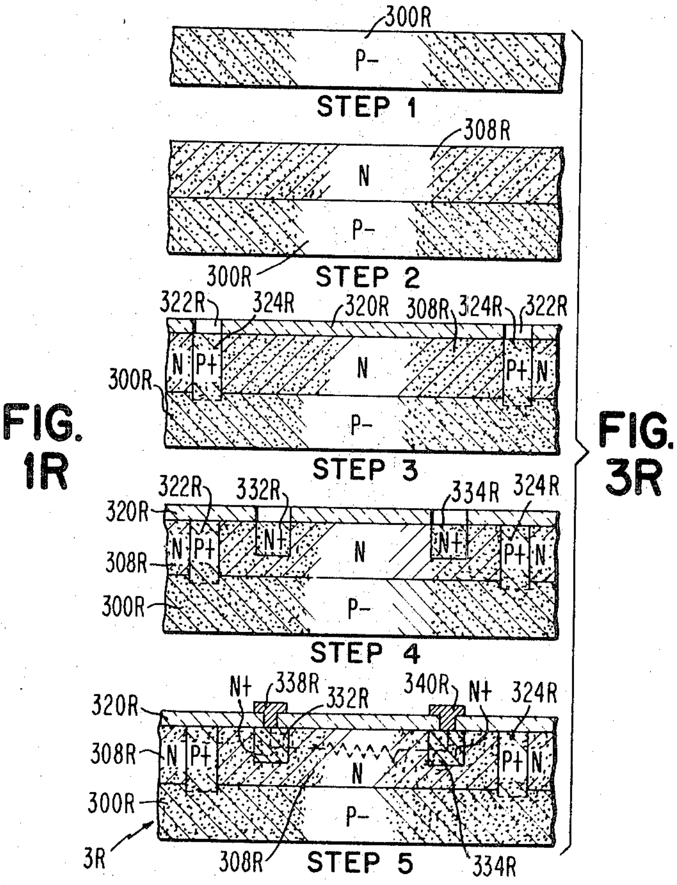
FIG. 3R is a flow diagram, in cross section, depicting the steps in the process for fabricating the 3R resistor of the master slice of FIG. 4 (FIGS. 4A, 4B) and FIG. 20 (FIGS. 20A, 20B, 20C and 20D)
Figure 3T:
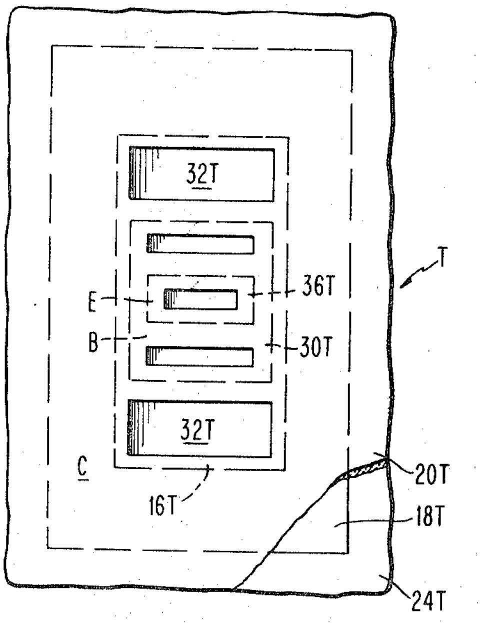
FIG. 3T is a top view of the transistor structure shown in step 6 of FIG. 1T which identifies the transistor T of each master slice.
Figure 3R:
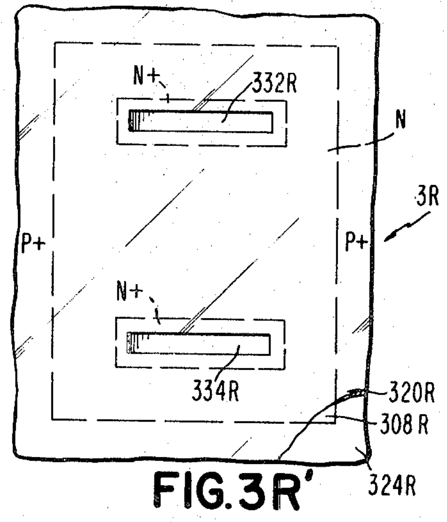
Figure 1U:
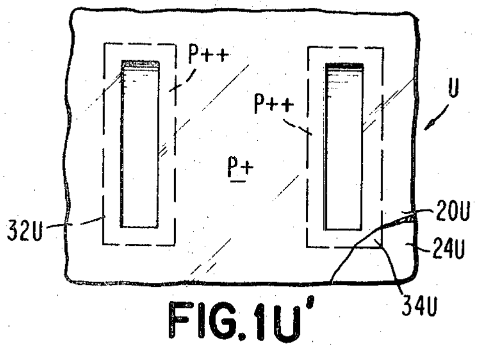

Referring to FIG. 3T, which is a top view showing the structure depicted in step 6 of FIG. 1T, the diffusion patterns and holes are shown as they designate or identify the transistor device T as it appears on the master slice. The letter T is used to designate the location of the transistor T on the master slice.

RESISTOR 1R

Although for the purpose of describing the resistor 1R reference is made to a semiconductor configuration wherein a $P^-$ type region is utilized as the substrate and subsequent semiconductor regions of the composite semiconductor structure are formed in the conductivity type shown in the drawings, it is readily apparent that the same regions shown in the drawings can be of opposite type conductivities and furthermore, some of the operations which are described as diffusion operations can be made by epitaxial growth and some of the epitaxial growth regions can also be fabricated by diffusion techniques.

Referring to FIG. 1R, step 1 depicts a substrate 10R of $P^-$ type conductivity, preferably having a resistivity of 10 to 20 ohms-centimeter and a thickness of about 10 mils. The substrate 10R is preferably a monocrystalline silicon structure which can be fabricated by conventional techniques such as by pulling a rod-shaped silicon semiconductor member from a melt containing the desired impurity concentration and then slicing the pulled member into a plurality of wafers. The substrate 10R is a portion of one such wafer and has a crystallographic orientation of about 2.5° off the <111> plane in the direction of the <110> plane.

In step 2, a region 18R of N type conductivity, preferably having a resistivity of 0.09 ohm-centimeter, is epitaxially grown on the surface of the substrate. The epitaxial region 18R is an arsenic doped layer approximately $5.5\pm.2$ microns thick.

In step 3, an oxide layer 20R approximately 4000 angstrom units thick is formed on the surface of the epitaxially grown region 18R either by the thermal oxidation process, by pyrolytic deposition, or by RF sputtering techniques. A continuous opening 22R is formed in the oxide layer by standard photolithographic masking and etching techniques using a photoresist layer as a mask and a buffered HF solution to remove the desired oxide portions. The structure is now prepared for the subsequent isolation diffusion operation. A $P^+$ diffusion is now carried out, preferably using a boron source, to form surrounding region 24R in the N type epitaxially grown region 18R. The region 24R has a $C_0$ (surface concentration) of $2.2\times10^{20}$ cm.$^{-3}$ and a sheet resistance of 2.5 ohms per square. It is evident that the $P^+$ isolation diffused region 24R will have a low resistivity surface region which extends downwardly from the surface of the semiconductor structure and the full isolation region extends continuously from the P type substrate region 10R to the surface of the semiconductor structure. The depth of the $P^+$ region 24R is approximately 300 microinches.

In step 4, a reoxidation operation is carried out and by using photolithographic masking and etching techniques a hole 26R is opened up in the oxide layer 20R above the isolated N type region 18R so as to permit a base type diffusion to be carried out to form the desired resistor. A base or P type diffusion operation is carried out through semiconductor surface portion 28R to form a P-type region 30R. Boron is preferably used as the impurity source to form a region having a $C_0$ of $1\times10^{19}$ atoms per cm.$^{-3}$, a sheet resistance of $150\pm5$ ohms per square, and a depth of about 80 microinches.

In step 5, the base or P-type diffusion step is followed by a simultaneous reoxidation and drive-in operation. Another layer of $SiO_2$ is thereby grown on the substrate surface. During this heat treatment, the boron impurities are redistributed thereby increasing the junction depth and lowering the $C_0$.

A photoresist coating is applied over the oxide layer 20R and by photolithographic masking and etching operations at least two portions of this oxide layer are removed to permit ohmic contacts to be made to the region 30R. A layer of aluminum or other suitable metal such as molybdenum is evaporated over the entire wafer surface and portions of this layer are etched away to produce the desired interconnection pattern. The evaporated layer of aluminum has a thickness of several thousand angstrom units. A layer of photoresist is then applied in the wafer, dried, exposed, developed, and fixed. The aluminum interconnections are formed by a subtractive etching operation using a warm solution of $$H_3PO_4+HNO_3+H_2O$$

The photoresist layer is stripped off and the wafer is cleaned and dried.

The wafers are sintered in a nitrogen atmosphere at a temperature of about 450° C. for a period of about 15 minutes to permit the aluminum to produce good ohmic contact to the contacted semiconductor region of the wafer. Thus, ohmic contacts 38R and 40R provide electrical connection to the P-type region 30R.

Each 1R resistor shown in the master slice is fabricated in this manner. When referring to the electrical schematic representation of the logic circuit such as FIG. 1C, the resistors designated as 1R, 1RA, 1RB, and 1RS are all fabricated in the manner shown by the flow diagram of FIG. 1R. In step 5, four phantom ohmic contacts 42R are shown disposed between the two ohmic contacts 38R and 40R. The purpose of the four phantom contacts 42R is to indicate that any two ohmic contacts can be made to the P-type region 30R which serves as the resistor as shown by the phantom line designation. By referring to the master slice, it is clear that some 1R resistors have 2, 3, 4, 5, or 6 openings in the oxide layer thereby permitting a great deal of freedom and flexibility in selecting a resistance value by choosing the desired two contacts. All the openings shown in the oxide layer for each 1R resistor are left uncovered to permit the selection of the desired resistance by the metallization pattern of the selected mask. In some cases, two openings adjacent each other at one or both ends of the 1R resistor are used to form essentially one contact since the closeness of the two adjacent openings has very little effect on the resistance value. Hence, with the use of more than two openings on the oxide surface layer, various resistor values can be selected depending on circuit requirements as selected by the metallization mask that is used.

Referring to FIG. 1R′, which is a top view showing the structure depicted in step 5 of FIG. 1R, the diffusion patterns and holes are shown as they designate or identify the 1R resistor device as it appears on the master slice. The 1R designation is used to identify the location of the 1R resistor on the master slice. The rectangular size of the 1R resistor can be varied as desired as indicated by the center break away portion.

RESISTOR (2R)

Although for the purpose of describing this resistor reference is made to a semiconductor configuration wherein a $P^-$ type region is utilized as the substrate and subsequent semiconductor regions of the composite semiconductor structure are formed in the conductivity types shown in the drawings, it is readily apparent that the same regions shown in the drawings can be of opposite type conductivities and furthermore, some of the operations which are described as diffusion operations can be made by epitaxial growth and some of the epitaxial growth regions can also be fabricated by diffusion techniques.

Figure 2R:
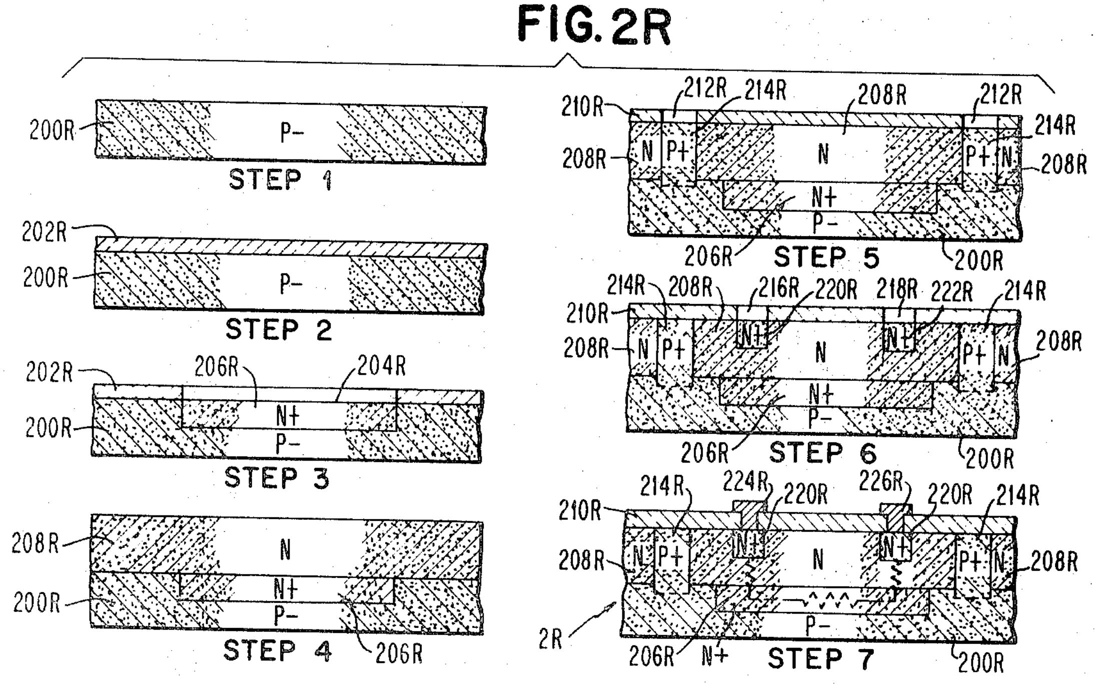
FIG. 2R is a flow diagram, in cross section, depicting the steps in the process for fabricating the 2R resistor of the master slice of FIG. 4 (FIGS. 4A, 4B) and FIG. 20 (FIGS. 20A, 20B, 20C and 20D)

Referring to FIG. 2R, step 1 depicts a substrate 200R of $P^-$ type conductivity, preferably having a resistivity of 10 to 20 ohms-centimeter and a thickness of about 10 mils. The substrate 200R is preferably a monocrystalline silicon structure which can be fabricated by conventional techniques such as by pulling a rod-shaped silicon semiconductor member from a melt containing the desired impurity concentration and then slicing the pulled member into a plurality of wafers. The substrate 200R is a portion of one such wafer and has a crystallographic orientation of about 2.5° off the <111> plane in the direction of the <110> plane.

Referring to step 2, an oxide coating 202R preferably of silicon dioxide and preferably having a thickness of approximately 6000 angstrom units is either thermally grown by conventional heating in a wet atmosphere at 1050° C. for about 60 minutes or by pyrolytic deposition of an oxide layer on the surface of the substrate 200R. Alternatively, an RF sputtering technique, as described in a patent application identified as S.N. 428,733, filed Jan. 28, 1965 in the names of Davidse and Maissel and assigned to the same assignee as this invention, can be used to form the silicon dioxide layer 202R.

In step 3, by standard photolithographic masking and etching techniques a photoresist layer (not shown) is deposited onto the substrate including the surface of the oxide layer 202R and by using the photoresist layer as a mask a surface region 204R is exposed on the surface of the substrate 200R by etching away the desired portion of the $SiO_2$ layer 202R with a buffered HF solution. The photoresist layer is then removed to permit further processing. A diffusion operation is carried out to diffuse into the surface 204R of the substrate 200R an $N^+$ type region 206R having a $C_o$ of $2\times10^{20}$ cm.$^{-3}$ of N type majority carriers. The sheet resistance of the $N^+$ region 206R is approximately 9.0 ohms per square and the depth of the diffused region is approximately 90 microinches. The oxide layer 202R serves as a mask to prevent the $N^+$ region 206R from being formed across the entire surface of the substrate 200R. Preferably, the diffusion operation is carried out in an evacuated quartz capsule using degenerate arsenic doped silicon powder. As an alternative variation, the $N^+$ region 206R can be formed by etching out a channel in the $P^-$ type substrate 200R and then subsequently epitaxially growing an $N^+$ region.

In step 4 after removing the oxide layer 202R with a buffered HF solution, a region 208R of N type conductivity, preferably having a resistivity of 0.09 ohms centimeter, is epitaxially grown on the surface of the substrate. The epitaxial region 208R is an arsenic doped layer approximately 5.5±.2 microns thick. In actual device fabrication, the arsenic impurities in the region 206R, which are now buried, outdiffuse about one micron during the epitaxial deposition.

In step 5, an oxide layer 210R approximately 4000 angstrom units thick is formed on the surface of the epitaxially grown region 208R either by the thermal oxidation process, by pyrolytic deposition, or by RF sputtering techniques. A continuous opening 212R is formed in the oxide layer 210R by photolithographic masking and etching techniques using a photoresist layer as a mask and a buffered HF solution to remove the desired oxide portions. The structure is now prepared for the subsequent isolation diffusion operation. A $P^+$ diffusion is carried out, preferably using a boron source, to form surrounding isolation region 214R. The region 214R has a $C_o$ (surface concentration) of $2.2\times10^{20}$ cm.$^{-3}$ and a sheet resistance of 2.5 ohms per square. It is evident from the drawing that the $P^+$ isolation region 214R extends continuously from the surface of the semiconductor structure to the P type substrate region 200R. Furthermore, it is evident that the $P^+$ diffused region 214R will have a low resistivity surface region which extends downwardly from the surface of the semiconductor structure. The depth of the $P^+$ region 214R is approximately 300 microinches.

In step 6, a reoxidation operation is carried out after the isolation diffusion operation to cover the openings 212R.

A photoresist coating is applied to the surface of this oxide layer and by photolithographic masking and etching techniques the desired portion of the $SiO_2$ layer is removed using a buffered HF solution. Separate openings 216R and 218R are formed in the oxide layer 210R. The openings 216R and 218R are formed during the step in the overall fabrication process when openings are made to permit $N^+$ emitter or collector contact regions to be formed by diffusion (for transistor T). An emitter type diffusion is now carried out preferably using phosphorus as the impurity source to form $N^+$ diffused regions 220R and 222R beneath the openings 216R and 218R, respectively. The $C_o$ of $N^+$ diffused regions 220R and 222R is like the emitter of the transistor T with the sheet resistance and depth also being the same.

Referring to FIG. 2R′, which is a top view of the structure shown in step 6 of FIG. 2R, the holes 218R and 216R are shown to be rectangular in configuration (for example 0.3 x 1.3 mils) and right angularly skewed with respect to narrow extension portions 207R of the buried high conductivity region 206R. The wider portion (for example, 0.9 mil wide) of the region 206R is for the purpose of reducing the resistance along the length of the region 206R and thereby permit a longer distance between the reduced end portions (for example, 0.5 mil wide) thereof than could be permitted without the wider intermediate portions. This is very important for the reason that one or more conductors can be passed on the surface of the oxide coated portion of the 2R resistor between regions 220R and 222R thereby permitting the 2R resistor to function as an underpass resistor. In the fabrication of integrated structures where space is at a premium and density is important, the 2R resistor is very useful to maintain one level of interconnection between all devices of each circuit.

The feature of having the holes 216R and 218R right angularly skewed with respect to the narrow extension portions 207R of the buried region 206R is for the purpose of assuring that there will always be an overlapped portion defined by the portion of extension portion 207R located directly beneath a portion of each opening 220R, 222R. Therefore, two dimensional displacement of the holes 220R, 222R with respect to the longitudinal axis of the region 206R will not, unless the displacement is unusually great, affect the positioning of the overlapped region with respect to the openings 220R, 222R. Displacements in epitaxial growth cause shifts or movements of the various buried regions with respect to regions or openings formed on the surface of the epitaxial layer. However, by means of this arrangement, normal displacements can be compensated for with the result that the 2R resistor is an accurate composite resistor element composed basically of the high resistance of the epitaxial layer and the low resistance of the $N^+$ buried region (see the phantom resistance line in step 7).

In step 7, the emitter type diffusion step is followed by a drive-in operation in a nitrogen atmosphere. Because of the phosphorus diffusion operation a $P_2O_5$ glass or oxide layer is formed.

By photolithographic masking and etching operations portions of this oxide layer are removed over the diffused $N^+$ regions 220R and 222R. A pair of holes are opened up in the oxide layer to permit the formation of metal ohmic contacts 224R and 226R. These ohmic contacts are preferably formed by evaporating a layer of aluminum and then subtractively removing undesired portions to leave the desired metal land pattern on the surface of the oxide layer. Hence, the resistor structure is formed.

The 2R resistor functions as an underpass resistor and permits conductive lands to pass over the oxide insulated surface portion of the component. One particular advantage of this underpass 2R resistor component is that the oxide layer on the surface of the 2R resistor is as thick as the thickest oxide (except for the thin oxide that is formed over the $N^+$ contact regions) that is formed on the surface of the epitaxially grown N region. No oxide (except for the portions removed to make the $N^+$ contact regions) is removed during the fabrication process and, hence, the thick oxide surface portion is very useful to reduce or minimize capacitance between the conductive lands and semiconductor surface which is very desirable.

Figure 20:
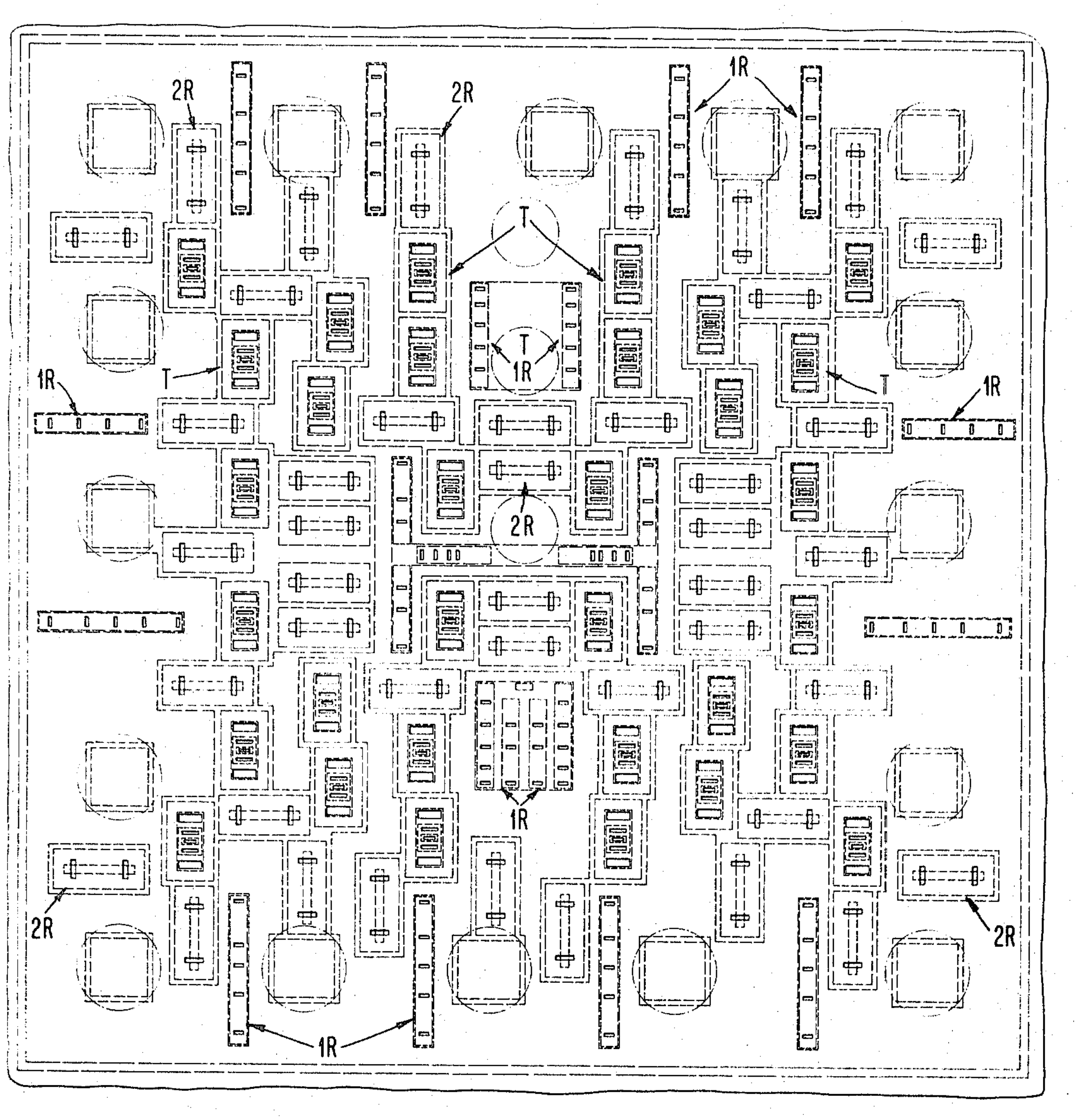
FIG. 20 is a top view of another master slice embodiment of this invention illustrating the location of each component.
Figure 20:
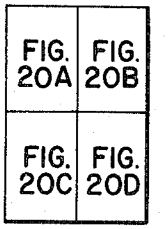
Figure 20A:
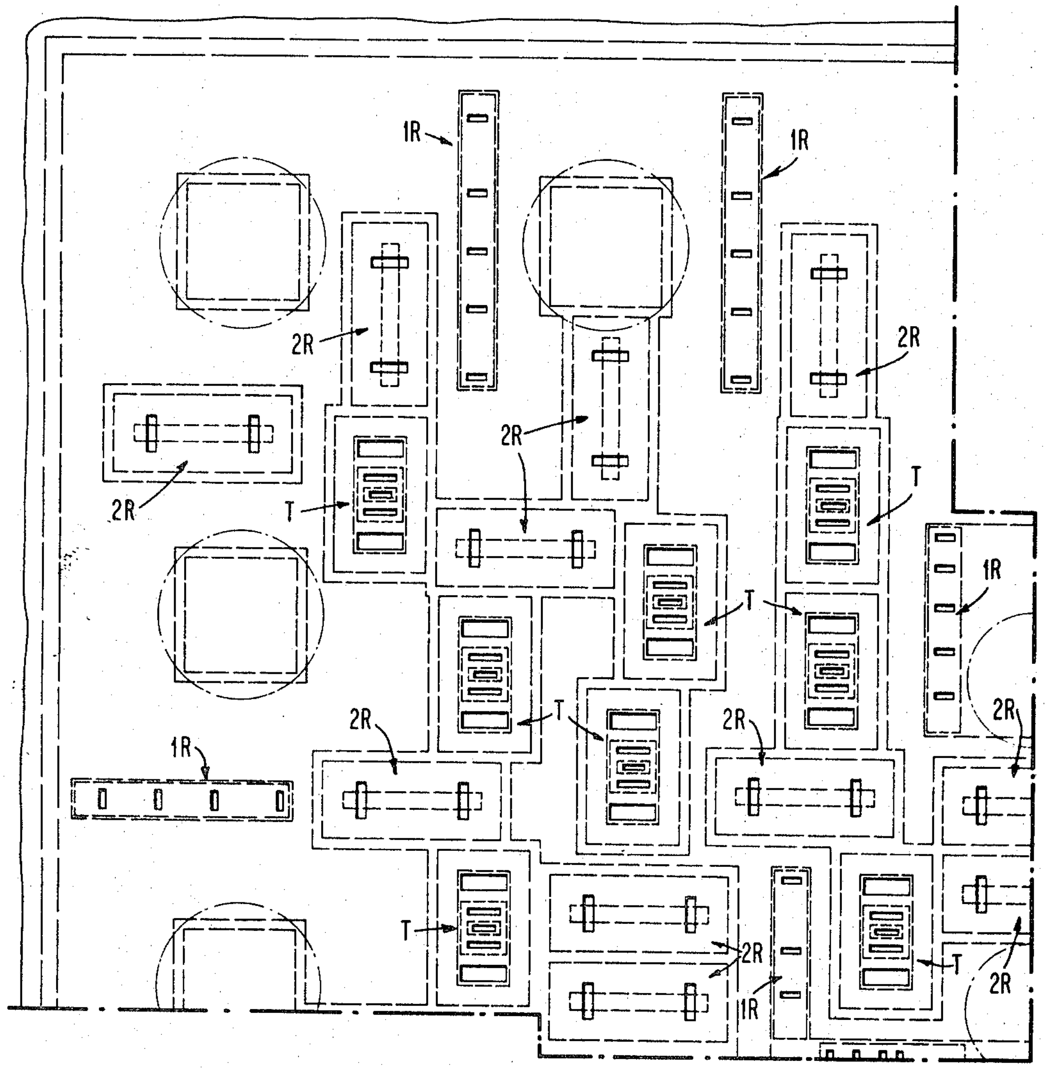
FIG. 20A is an enlarged view of the upper left hand quadrant portion of FIG. 20.
Figure 20B:
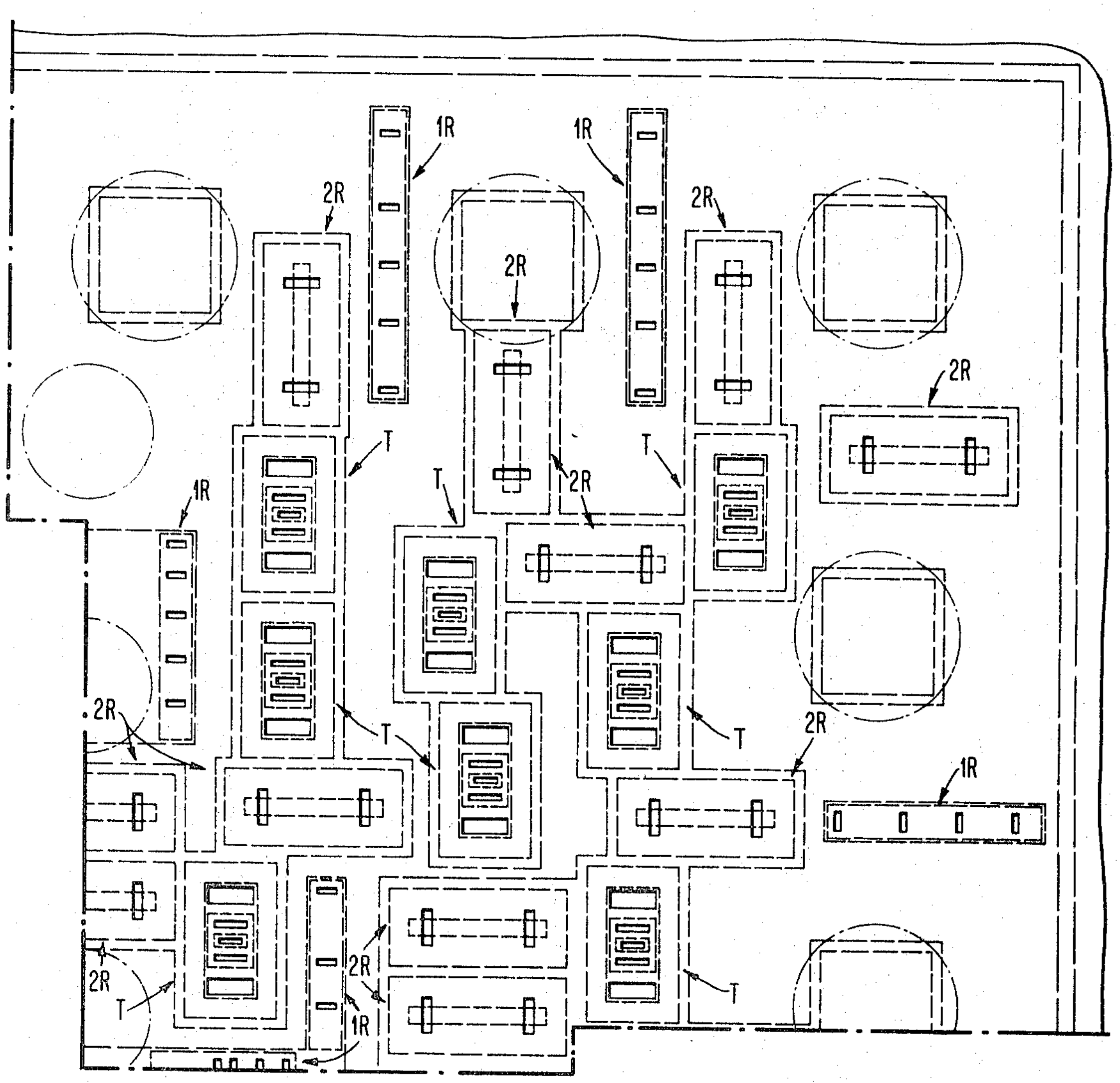
FIG. 20B is an enlarged view of the upper right hand quadrant portion of FIG. 20.
Figure 20C:
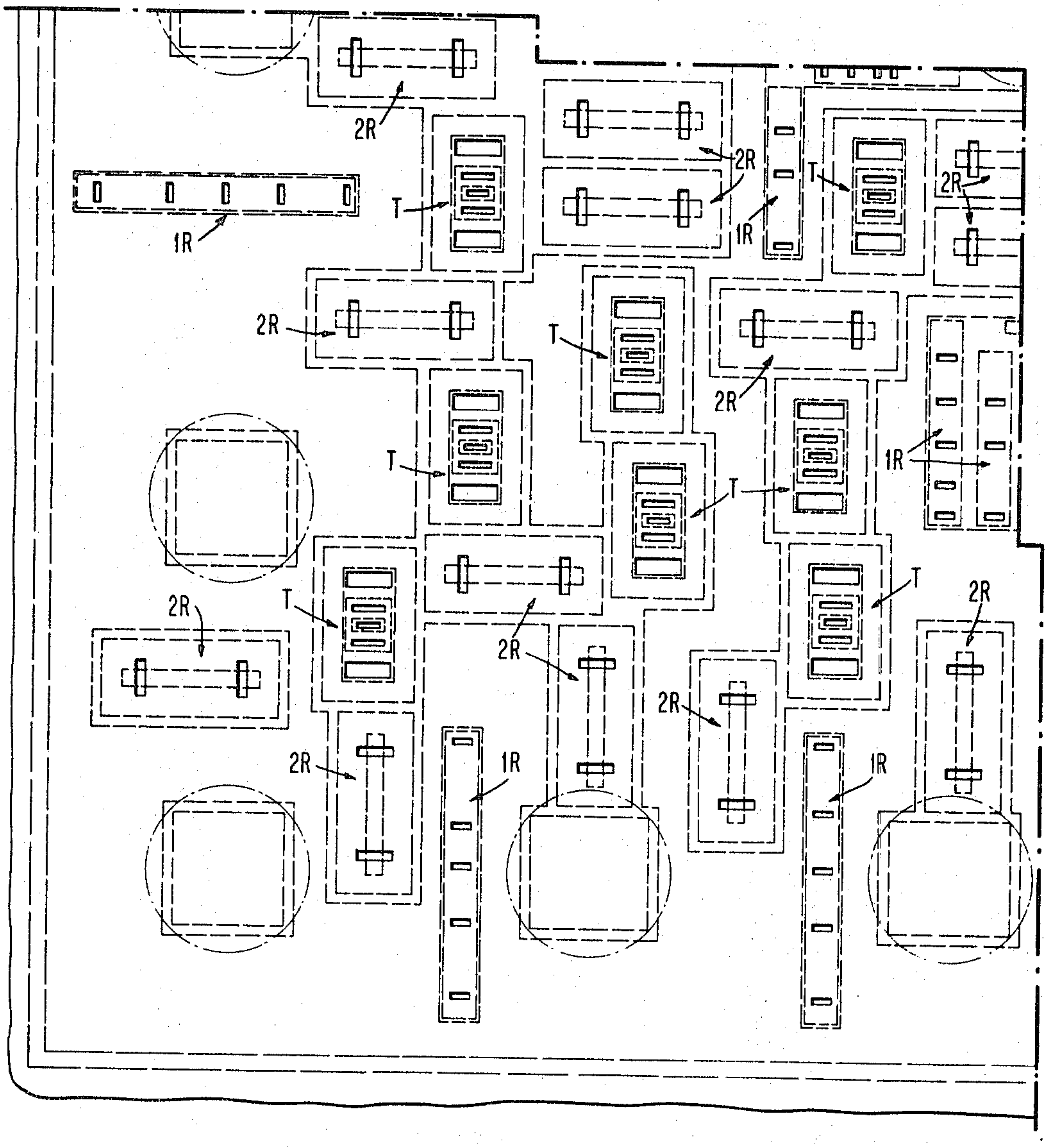
FIG. 20C is an enlarged view of the lower left hand quadrant portion of FIG. 20.
Figure 20D:
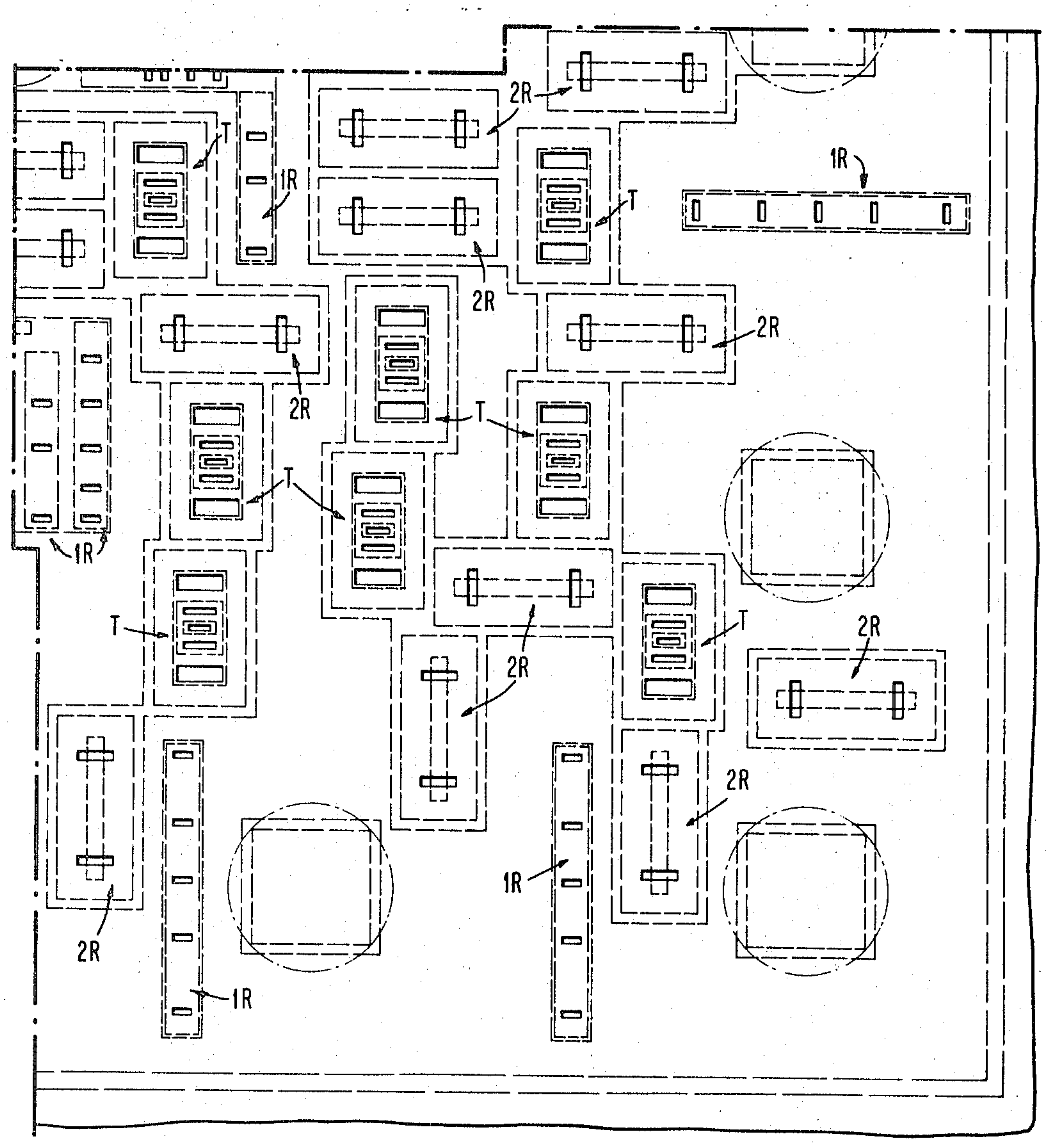
FIG. 20D is an enlarged view of the lower right hand quadrant portion of FIG. 20.

The 2R resistor used in the master slice of FIG. 20 does not use narrow portions as part of the subcollector region. In the FIG. 20 embodiment, a rectangular subcollector region is used for each 2R resistor.

RESISTOR 3R

Although for the purpose of describing the resistor reference is made to a semiconductor configuration wherein a $P^-$ type region is utilized as the substrate and subsequent semiconductor regions of the composite semiconductor structure are formed in the conductivity type shown in the drawings, it is readily apparent that the same regions shown in the drawings can be of opposite type conductivities and, furthermore, some of the operations which are described as diffusion operations can be made by epitaxial growth and some of the epitaxial growth regions can also be fabricated by diffusion techniques.

Referring to FIG. 3R, step 1 depicts a substrate 300R of $P^-$ type conductivity, preferably having a resistivity of 10 to 20 ohms-centimeter and a thickness of about 10 mils. The substrate 300R is preferably a monocrystalline silicon structure which can be fabricated by conventional techniques such as by pulling a rod-shaped silicon semiconductor member from a melt containing the desired impurity concentration and then slicing the pulled member into a plurality of wafers. The substrate 300R is a portion of one such wafer and has a crystallographic orientation of about 2.5° off the <111> plane in the direction of the <110> plane.

In step 2, a region 308R of N type conductivity, preferably having a resistivity of 0.09 ohm per centimeter, is epitaxially grown on the surface of the substrate. The epitaxial region 308R is an arsenic doped layer approximately 5.5±.2 microns thick.

In step 3, an oxide layer 320R approximately 4000 angstrom units thick is formed on the surface of the epitaxially grown region 308R either by the thermal oxidation process, by pyrolytic deposition, or by RF sputtering techniques. A continuous opening 322R is formed in the oxide layer by standard photolithographic masking and etching techniques using a photoresist layer as a mask and a buffered HF solution to remove the desired oxide portions. The structure is now prepared for the subsequent isolation diffusion operation. A $P^+$ diffusion is now carried out, preferably using a boron source, to form surrounding region 324R in the N type epitaxially grown region 308R. The region 324R has a $C_o$ (surface concentration) of $2.2 \times 10^{20}$ cm.$^{-3}$ and a sheet resistance of 2.5 ohms per square. It is evident that the $P^+$ isolation diffused region 324R will have a low resistivity surface region which extends downwardly from the surface of the semiconductor structure and the full isolation region extends continuously from the P type substrate region 300R to the surface of the semiconductor structure. The depth of the $P^+$ region 324R is approximately 300 microinches.

In step 4, another layer of $SiO_2$ is thermally grown on the substrate surface. A photoresist coating is applied over the oxide layer 320R and by photolithographic masking and etching operations two portions of this oxide layer are removed to permit emitter type regions to be formed by a diffusion operation. Two $N^+$ emitter type regions 332R and 334R are formed in the N type epitaxial region 308R to provide good electrical contact regions.

The $N^+$ regions 332R and 334R are preferably formed using a phosphorous impurity source. The $C_o$ of the regions 332R and 334R is $2.5 \times 10^{21}$, the sheet resistance is 3.5 ohms per square, and the depth is approximately 71 microinches.

In step 5, a layer of aluminum or other suitable metal such as molybdenum is evaporated over the entire wafer surface and portions of this layer are etched away to produce the desired interconnection pattern. The evaporated layer of aluminum has a thickness of several thousand angstrom units. A layer of photoresist is then applied to the wafer, dried, exposed, developed, and fixed. The aluminum interconnections are formed by a subtractive etching operation using a warm solution of $$H_3PO_4 + HNO_3 + H_2O$$

The photoresist layer is stripped off and the wafer is cleaned and dried.

The wafers are sintered in a nitrogen atmosphere at a temperature of about 450° C. for a period of about 15 minutes to permit the aluminum to produce good ohmic contact to the contacted semiconductor regions of the wafer. Thus, ohmic contacts 338R and 340R provide electrical connection to the N region 308R.

The 3R resistor shown in the master slice is fabricated in this manner. The resistance of the 3R resistor is determined by the resistivity of the N-type region 308R and the distance between contacts 338R and 340R. This is diagrammatically shown by the phantom resistance line in the N-type region 308R.

Referring to FIG. 3R′, which is a top view showing the structure depicted in step 5 of FIG. 3R, the diffusion patterns and holes are shown as they designate or identify the 3R resistor device as it appears on the master slice. The letter 3R is used to designate the location of the 3R resistor on the master slice.

UNDERPASS U

Although for the purpose of describing the underpass U reference is made to a semiconductor configuration wherein a $P^-$ type region is utilized as the substrate and subsequent semiconductor regions of the composite semiconductor structure are formed in the conductivity type shown in the drawings, it is readily apparent that the same regions shown in the drawings can be of opposite type conductivities and furthermore, some of the operations which are described as diffusion operations can be made by epitaxial growth and some of the epitaxial growth regions can also be fabricated by diffusion techniques.

Referring to FIG. 1U, step 1 depicts a substrate 10U of $P^-$ type conductivity, preferably having a resistivity of 10 to 20 ohms-centimeter and a thickness of about 10 mils. The substrate 10U is preferably a monocrystalline silicon structure which can be fabricated by conventional techniques such as by pulling a rod-shaped silicon semiconductor member from a melt containing the desired impurity concentration and then slicing the pulled member into a plurality of wafers. The substrate 10U is a portion of one such wafer and has a crystallographic orientation of about 2.5° off the <111> plane in the direction of the <110> plane.

In step 2, a region 18U of N type conductivity, preferably having a resistivity of 0.09 ohms per centimeter, is epitaxially grown on the surface of the substrate. The epitaxial region 18U is an arsenic doped layer approximately 5.5±.2 microns thick.

In step 3, an oxide layer 20U approximately 4000 angstrom units thick is formed on the surface of the epitaxially grown region 18U either by the thermal oxidation process, by pyrolytic deposition, or by RF sputtering techniques. An opening 22U is formed in the oxide layer by standard photolithographic masking and etching techniques using a photoresist layer as a mask and a buffered HF solution to remove the desired oxide portion. The structure is now prepared for the subsequent isolation type diffusion operation. A $P^+$ diffusion is now carried out, preferably using a boron source, to form region 24U in the N type epitaxially grown region 18U. The region 24U has a $C_0$ (surface concentration) of $2.2 \times 10^{20}$ cm.$^{-3}$ and a sheet resistance of 2.5 ohms per square. It is evident that the $P^+$ isolation type diffused region 24U will have a low resistivity surface region which extends downwardly from the surface of the semiconductor structure and the full isolation type region extends continuously from the P type substrate region 10U to the surface of the semiconductor structure. The depth of the $P^+$ region 24U is approximately 300 microinches.

In step 4, another layer of $SiO_2$ is thermally grown on the substrate surface. A photoresist coating is applied over the oxide layer 20U and by photolithographic masking and etching operations two portions of this oxide layer are removed to permit base or P-type regions to be formed by a diffusion operation. Two $P^{++}$ base type regions 32U and 34U are formed in the $P^+$ type diffused region 24U to provide very low resistance electrical contact regions.

The $P^{++}$ regions 32U and 34U are preferably formed using a boron impurity source. The $C_0$ of the regions 32U and 34U is very high since these two diffused regions are the combination of two successive P-type diffusion operations of $P^+$ and P type concentrations thereby providing the two $P^{++}$ regions 32U and 34U, as shown.

In step 5, a layer of aluminum or other suitable metal such as molybdenum is evaporated over the entire wafer surface and portions of this layer are etched away to produce the desired interconnection pattern. The evaporated layer of aluminum has a thickness of several thousand angstrom units. A layer of photoresist is then applied to the wafer, dried, exposed, developed, and fixed. The aluminum interconnections are formed by a subtractive etching operation using a warm solution of $$H_3PO_4+HNO_3+H_2O$$

The photoresist layer is stripped off and the wafer is cleaned and dried.

The wafers are sintered in a nitrogen atmosphere at a temperature of about 450° C. for a period of about 15 minutes to permit the aluminum to produce good ohmic contact to the contacted semiconductor regions of the wafer. Thus, ohmic contacts 38U and 40U provide electrical connection to the $P^{++}$ regions 32U and 34U respectively. As can be seen from step 5, the phantom line between $P^{++}$ regions 32U and 34U represents the low resistance current path provided by the high conductivity portion of the underpass U. Conductors or lands 42U shown on the oxide layer 20U, between ohmic contacts 38U and 40U, illustrate how the underpass U is used to provide a low resistance current path in the semiconductor body thereby permitting the lands or conductors 42U to pass at right angles to a line between ohmic contacts 38U and 40U. In this manner, one level of metallurgy can be used to interconnect up all the devices of each circuit.

The underpass U shown in the master slice is fabricated in this manner.

PAD P

Although for the purpose of describing the terminal structure of pad P reference is made to a semiconductor configuration wherein a $P^-$ type region is utilized as the substrate and subsequent semiconductor regions of the composite semiconductor structure are formed in the conductivity type shown in the drawings, it is readily apparent that the same regions shown in the drawings can be of opposite type conductivities and furthermore, some of the operations which are described as diffusion operations can be made by epitaxial growth and some of the epitaxial growth regions can also be fabricated by diffusion techniques.

Referring to FIG. 1P, step 1 depicts a substrate 10P of $P^-$ type conductivity, preferably having a resistivity of 10 to 20 ohms-centimeter and a thickness of about 10 mils. The substrate 10P is preferably a monocrystalline silicon structure which can be fabricated by conventional techniques such as by pulling a rod-shaped silicon semiconductor member from a melt containing the desired impurity concentration and then slicing the pulled member into a plurality of wafers. The substrate 10P is a portion of one such wafer and has a crystallographic orientation of about 2.5° off the <111> plane in the direction of the <110> plane.

In step 2, a region 18P of N type conductivity, preferably having a resistivity of 0.09 ohms per centimeter, is epitaxially grown on the surface of the substrate. The epitaxial region 18P is an arsenic doped layer approximately 5.5±.2 microns thick.

In step 3, an oxide layer 20P approximately 4000 angstrom units thick is formed on the surface of the epitaxially grown region 18P either by the thermal oxidation process, by pyrolytic deposition, or by RF sputtering techniques. A continuous opening 22P is formed in the oxide layer by standard photolithographic masking and etching techniques using a photoresist layer as a mask and a buffered HF solution to remove the desired oxide portions. The structure is now prepared for the subsequent isolation diffusion operation. A $P^+$ diffusion is now carried out, preferably using a boron source, to form surrounding region 24P in the N type epitaxially grown region 18P. The region 24P has a $C_0$ (surface concentration) of $2.2 \times 10^{20}$ cm.$^{-3}$ and a sheet resistance of 2.5 ohms per square. It is evident that the $P^+$ isolation diffused region 24P will have a low resistivity surface region which extends downwardly from the surface of the semiconductor structure and the full isolation region extends continuously from the P type substrate region 10P to the surface of the semiconductor structure. The depth of the $P^+$ region 24P is approximately 300 microinches.

In step 4, another layer of $SiO_2$ is thermally grown on the substrate surface. A layer of aluminum 26P or other suitable metal such as molybdenum is evaporated over the entire wafer surface and portions of this layer are etched away to produce the desired land interconnection pattern. The evaporated layer of aluminum has a thickness of several thousand Angstrom units. A layer of photoresist is then applied to the wafer, dried, exposed, developed, and fixed. The aluminum interconnections are formed by a subtractive etching operation using a warm solution of $H_3PO_4+HNO_3+H_2O$. The photoresist layer is stripped off and the wafer is cleaned and dried. Subsequently, a sputtered or otherwise deposited insulating layer of $SiO_2$ or other form of glass material is formed on the entire wafer surface. Layer 28P designates this encapsulating layer which is provided over the entire wafer surface after the land pattern is formed on the oxide layer. The use of the isolated N-type region 18P is for the purpose of preventing any possible electrical shorts to the $P^+$ isolation region which is all at one electrical potential (reverse-biased) to provide electrical isolation between devices. Electrical shorts can be created by means of undesired pinhole openings in the oxide layer 20P beneath the land 26P. However, due to the use of the isolated N-type region 18P, shorts of the type described will be of no consequence. An opening 30P is formed over the portion of the land 26P that is located over the electrically isolated N-type region 18P. This opening is made by conventional photolithographic masking and etching techniques using a photoresist layer as a mask.

Referring to step 5, successive layers of chromium 32P, copper 34P, and gold 36P are deposited into and about the periphery of the opening 26P formed in step 4. This is carried out using suitable masks for terminal contact formation. Subsequently, a layer of lead-tin solder is deposited over the gold layer 36P and, by heat and reflow techniques, a ball of solder 38P is formed on the land 36P as the solder will not adhere to or wet the surface of the insulating layer 28P. Thus, the pads P of the master slice are formed in this manner to thereby permit electrical contact between the devices—through the lands—to the module. The pads P are designated on the master slice as P1, P2 . . . . The solder ball 38P also permits electrical standoff between the chip and the module.

MASTER CHIP

Figure 4:
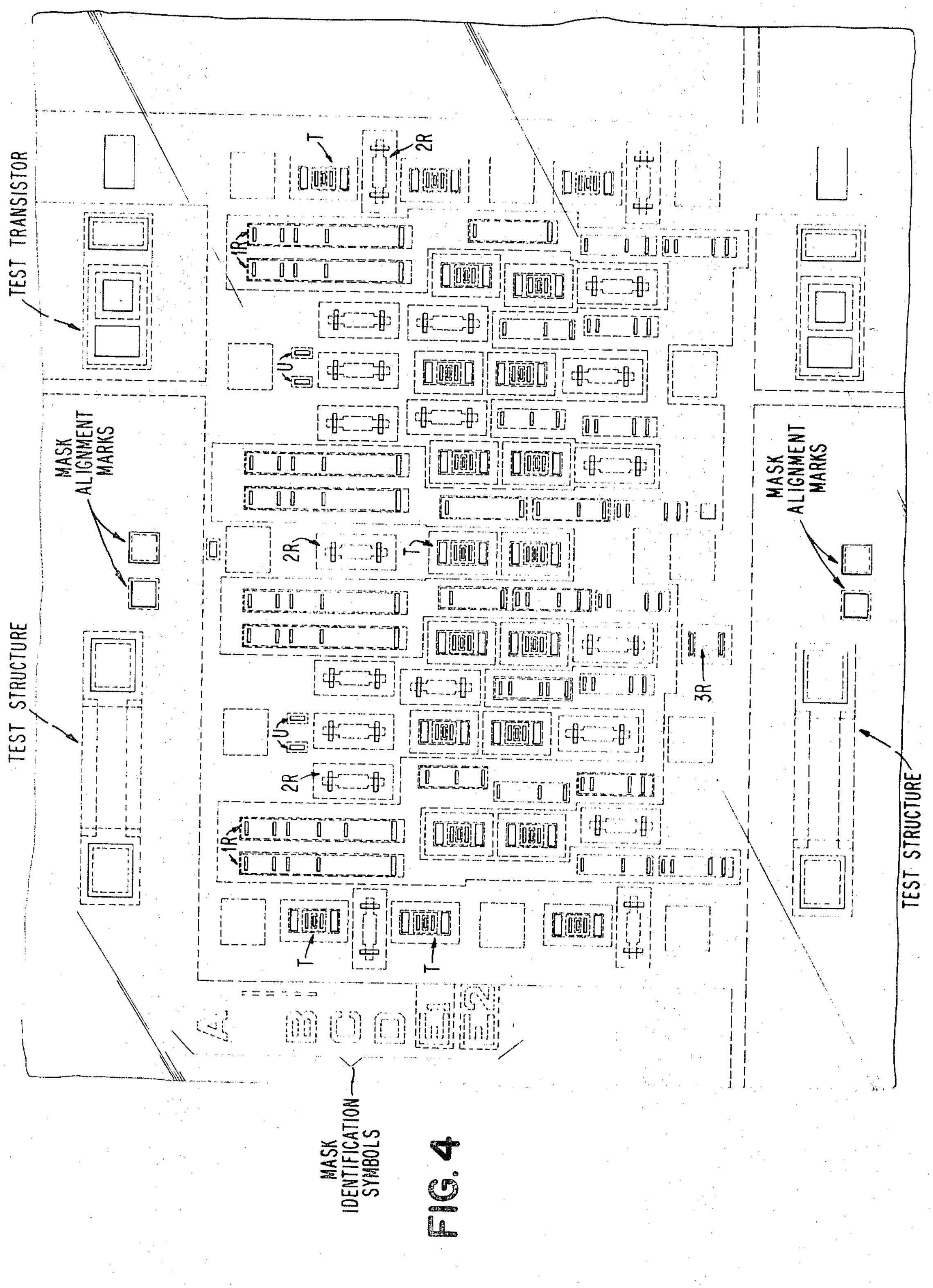
FIG. 4 is a top view of one master slice embodiment of this invention illustrating the location of each component.
Figure 4:
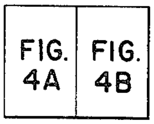
Figure 4A:
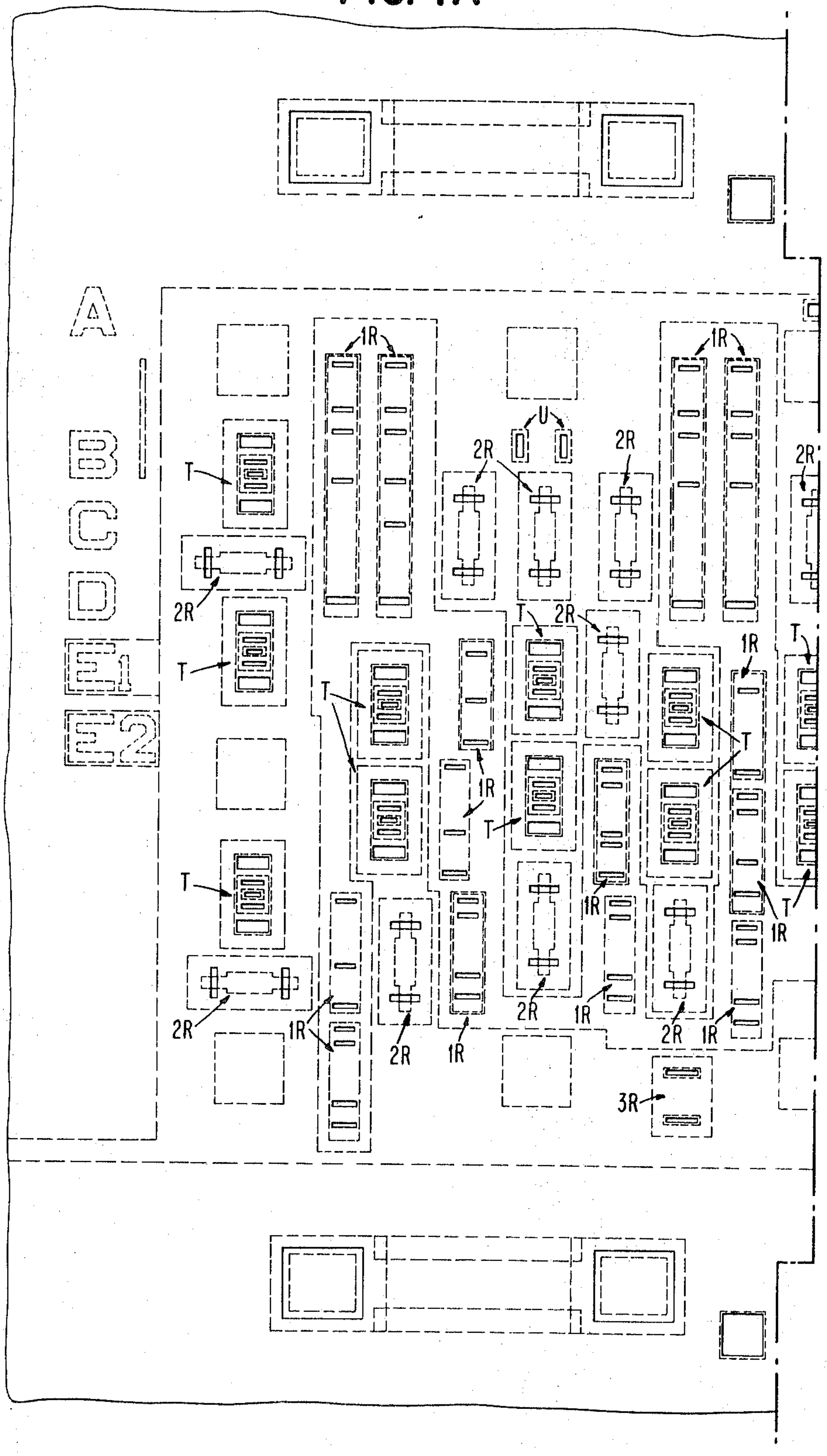
FIG. 4A is an enlarged view of the left hand portion of FIG. 4.
Figure 4B:
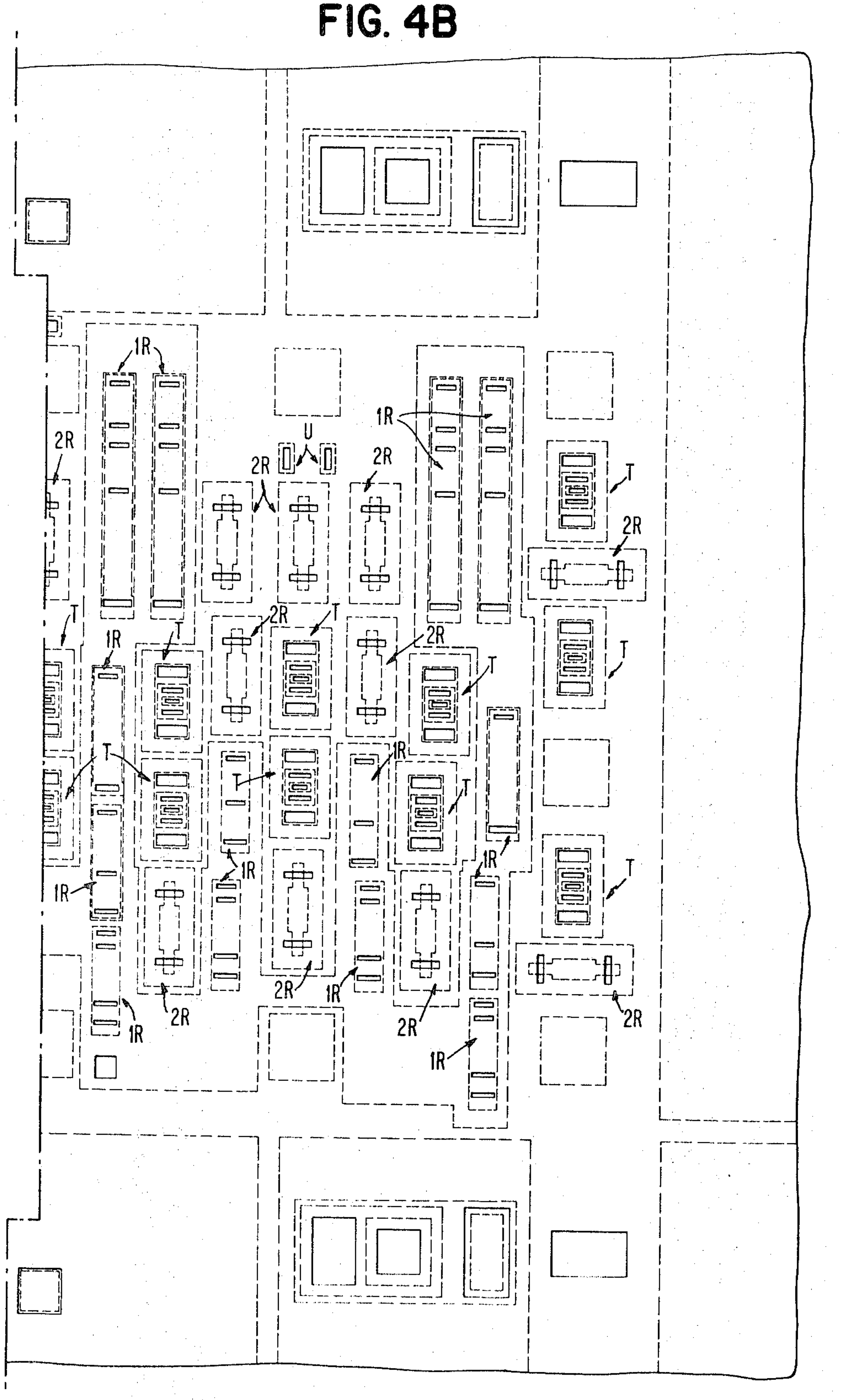
FIG. 4B is an enlarged view of the right hand portion of FIG. 4.
Figure 4D:
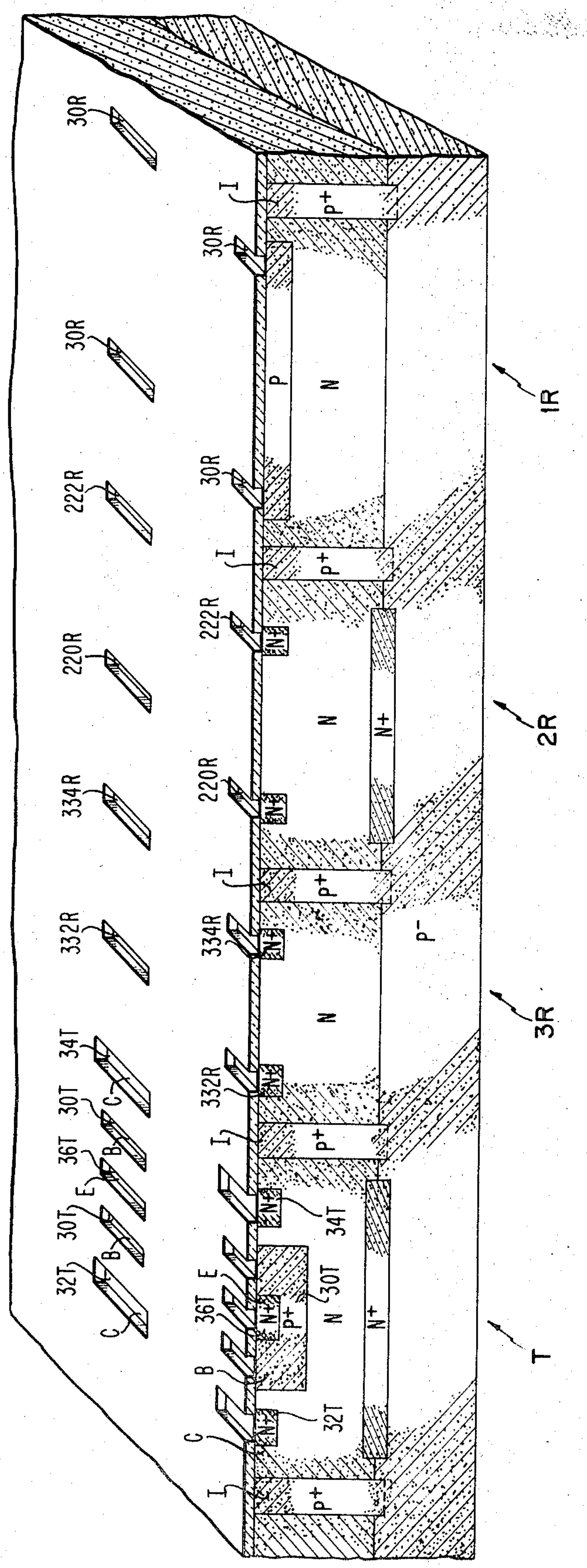
FIG. 4D is an enlarged, fragmentary, sectional perspective view of the components that are used in the master slice of FIG. 4.

The master chip shown in FIG. 4 and shown in enlarged form in FIGS. 4A and 4B which together compose FIG. 4 illustrates how the components identified as T, 1R, 2R, 3R and U are located on a portion of a semiconductor wafer. These components are arranged in a manner so as to permit optimum interconnection to form the desired logic type circuit such as shown in FIGS. 5, 5C or 6, 6C. It is evident from the master slice configuration that 1R resistors are easily connected to the minus V potential source (pad 9) of the metallized chips of FIGS. 5 and 6. The minus V pad, P9, is centrally located at one edge portion of the master slice so as to permit optimum interconnection between the components that are electrically connected to pad P9. This master slice is designed in a manner so as to permit or facilitate connection of the 1R resistors to the area designated as P9 where the minus V potential is applied. The shorter the line of connection between the 1R resistors and the P9 pad the better the electrical characteristics are for overcoming undesired voltage drops, etc. Furthermore, in this manner of locating the 1R resistors as close as possible to the P9 minus V pad, a minimum number of underpass devices are required to facilitate wiring up of the integrated circuit structure. Still further, the location of the 1R resistors as shown in the master slice of FIG. 4 permits a large degree of freedom in interconnecting a logic type circuit. At least 18 different logic type circuits can be interconnected using the master chip of FIG. 4. This is easily done by selecting the desired metallizing mask F after all the devices are fabricated. Despite the fact that some devices will not be used, this is kept at a minimum by virtue of the arrangement of components as shown in FIG. 4.

Figure 5:
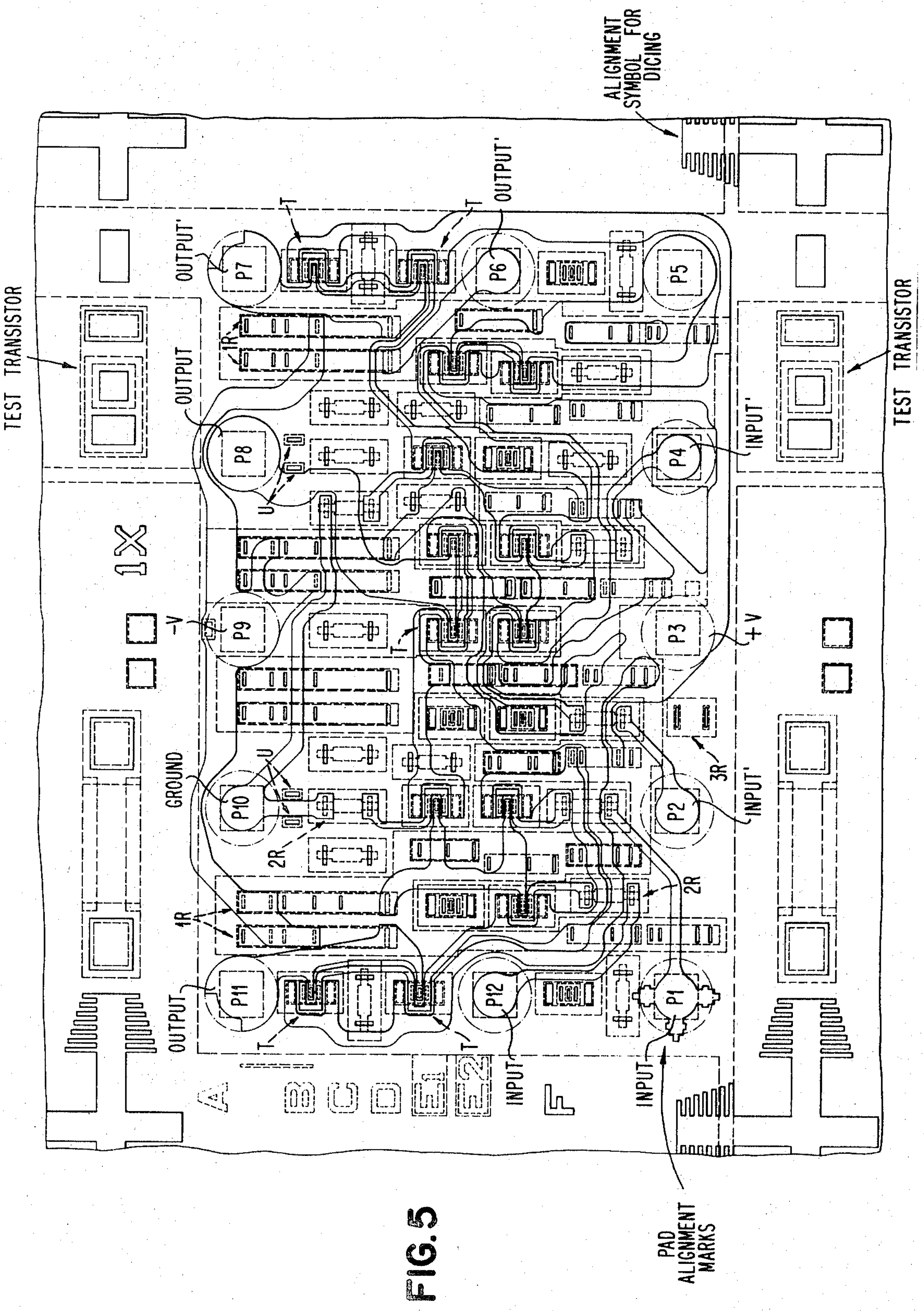
FIG. 5 is a top view of a metallized pattern showing one way of connecting components of the master slice of FIG. 4 to provide a logic type integrated circuit structure as shown schematically in FIG. 1C.
Figure 5:
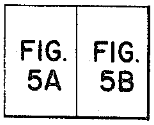
Figure 5A:
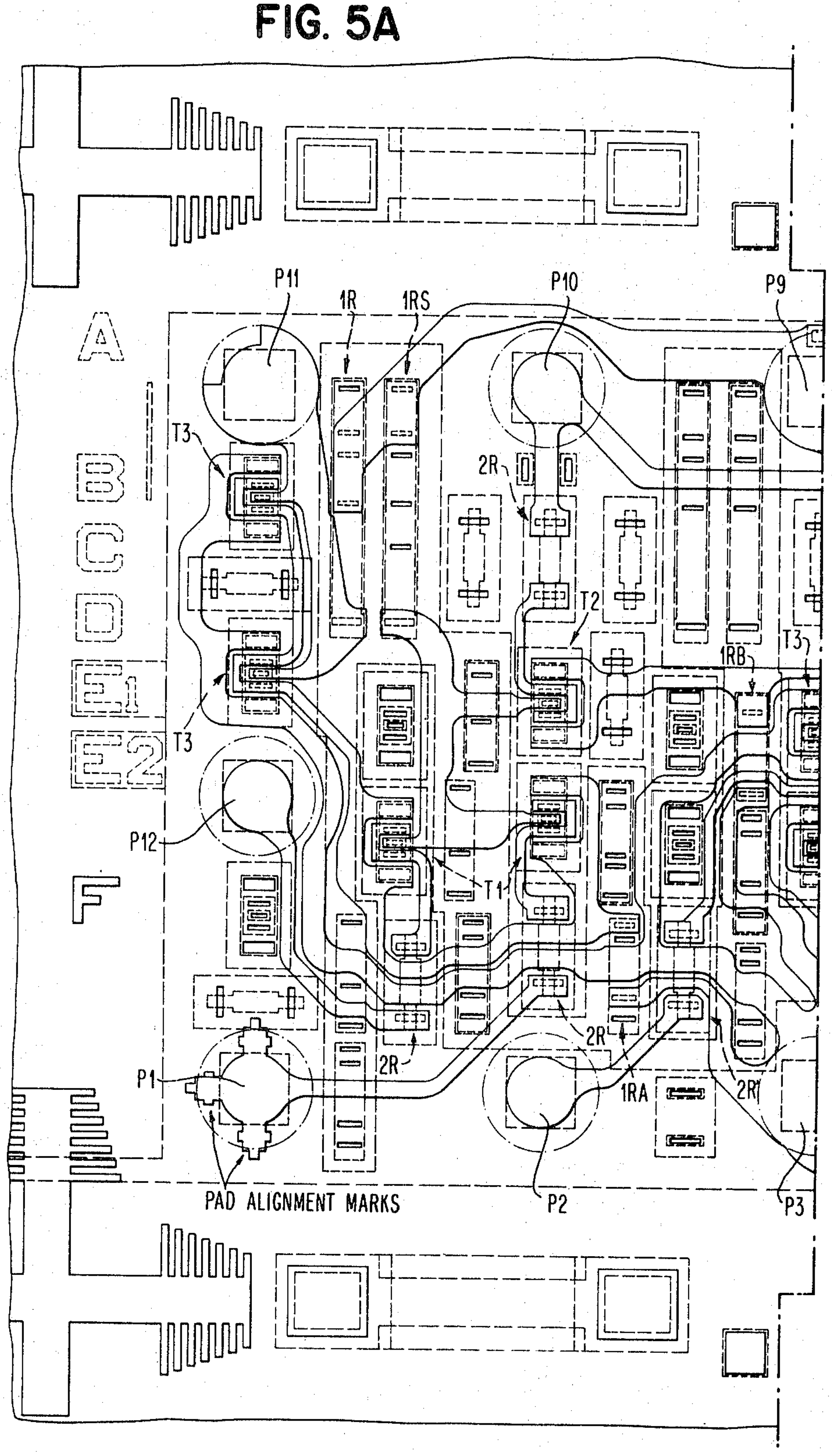
FIG. 5A is an enlarged view of the left hand portion of FIG. 5.
Figure 5B:
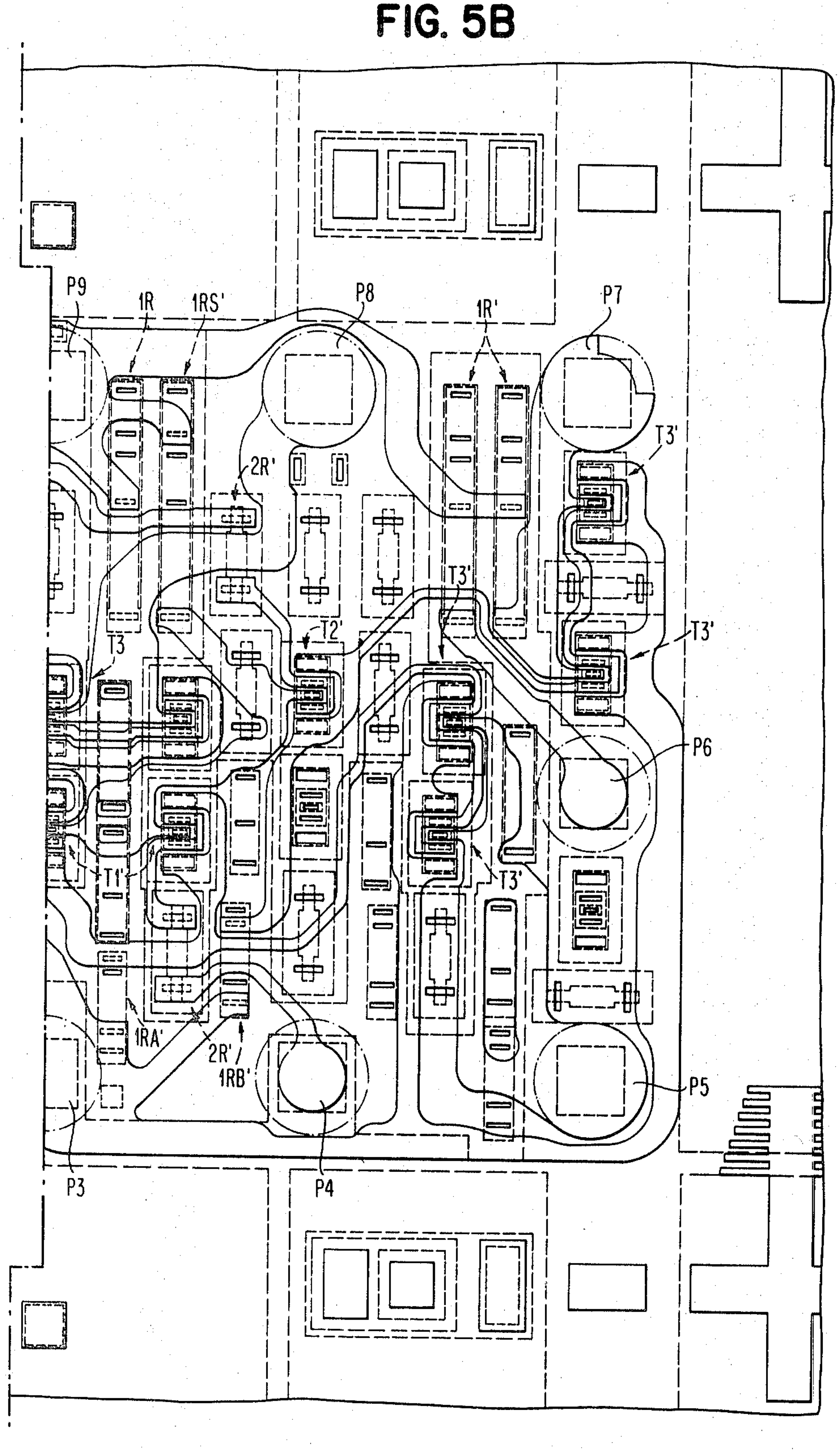
FIG. 5B is an enlarged view of the right hand portion of FIG. 5.

Similarly, with reference to FIGS. 4, 5 (5C), and 6 (6C), the pad P3 which is either ground or plus V is centrally disposed on the master slice at one edge portion thereof. In the case of the embodiments of FIGS. 5 and 6, pads 9 and 3 are both centrally disposed and are located opposite each other so that the minus V potential can be applied to pad 9 and a plus V or ground is applied to pad 3. The devices that have to be connected to the plus V or ground pad P3 are located close to this pad to facilitate interconnection and minimize undesired electrical characteristics.

Figure 21:
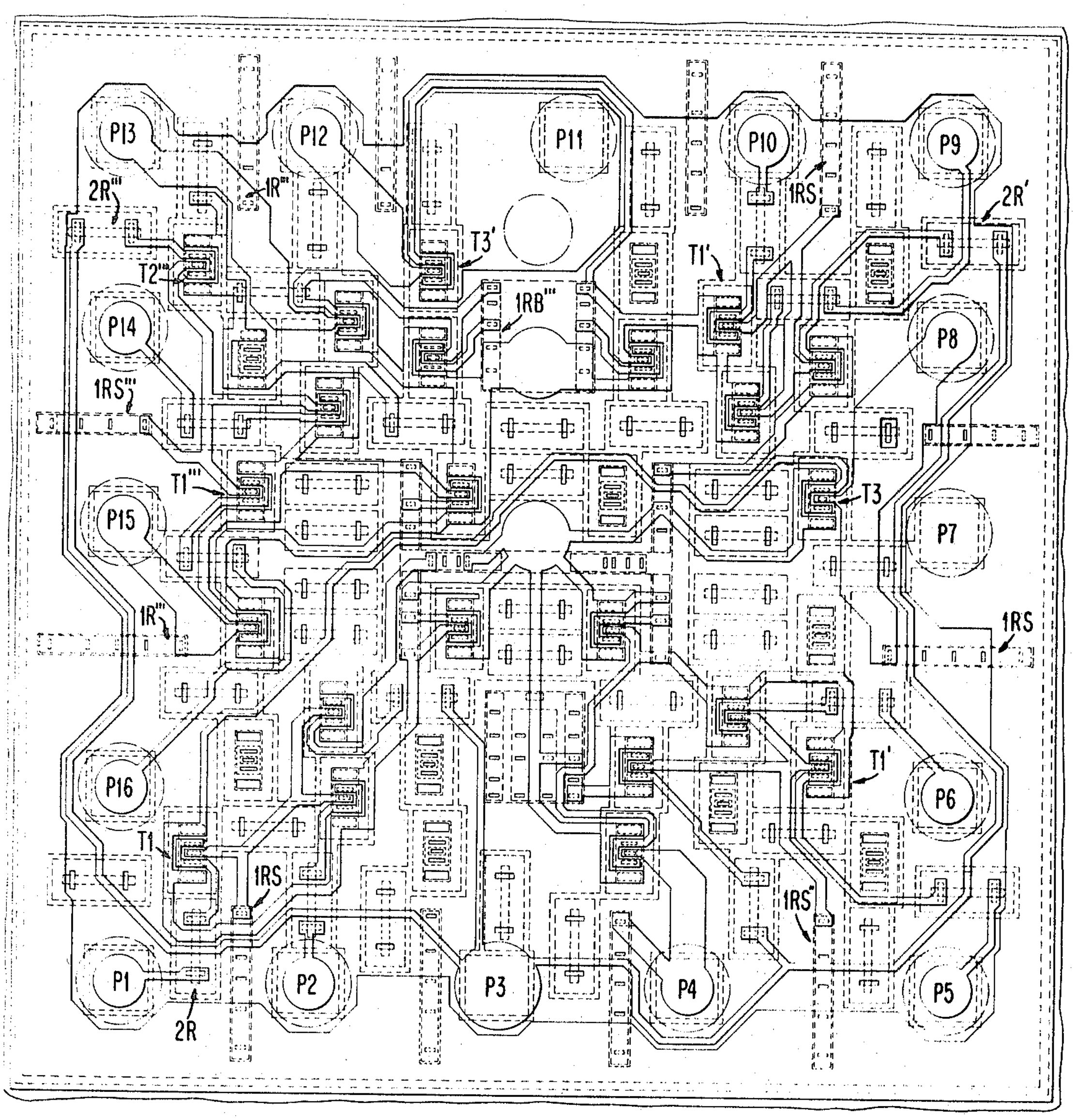
FIG. 21 is a top view of a metallized pattern showing one way of connecting components of the master slice of FIG. 20 to provide a logic type integrated circuit structure as shown schematically in FIG. 3C.
Figure 21:
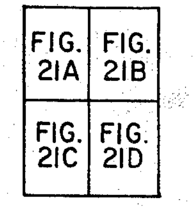
Figure 21A:
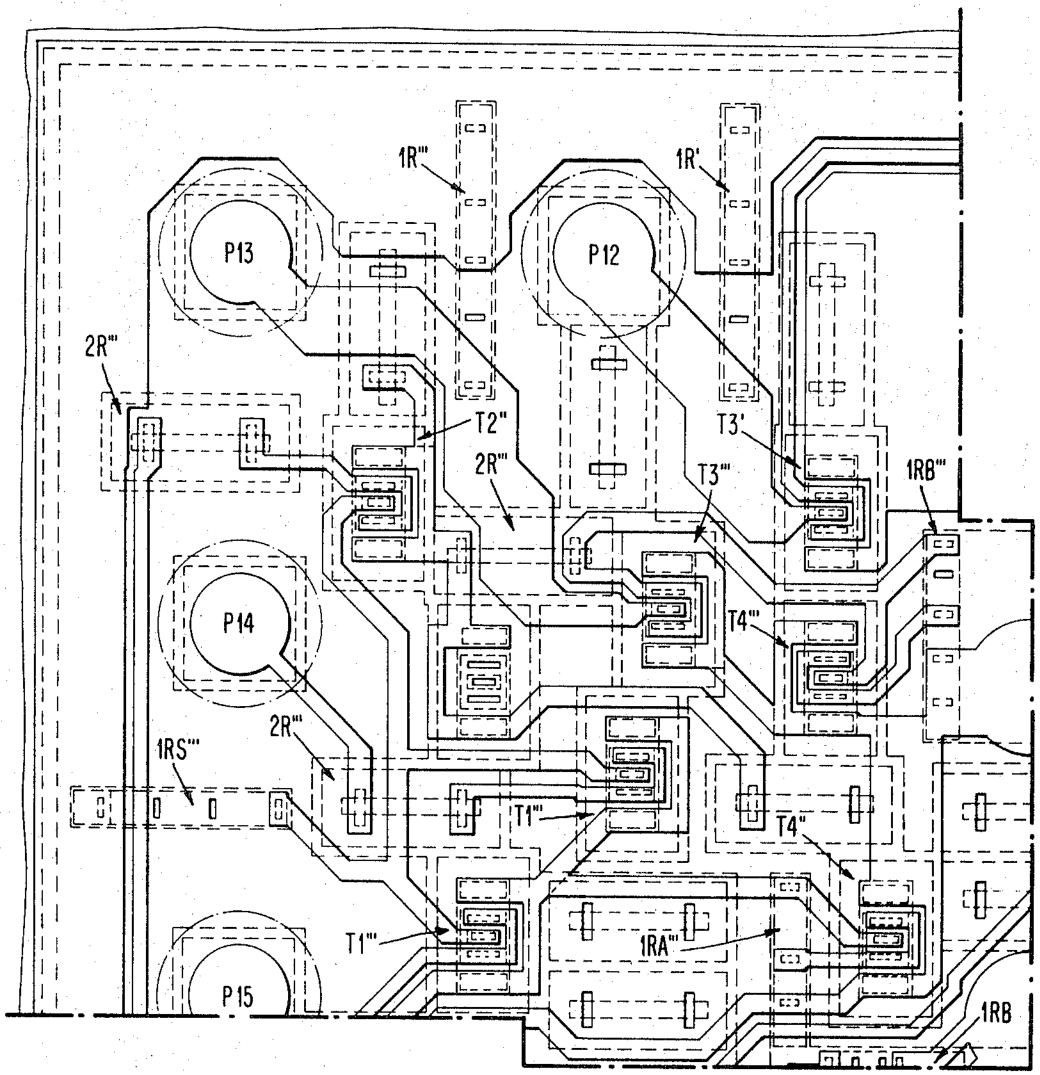
FIG. 21A is an enlarged view of the upper left hand quadrant portion of FIG. 21.
Figure 21B:
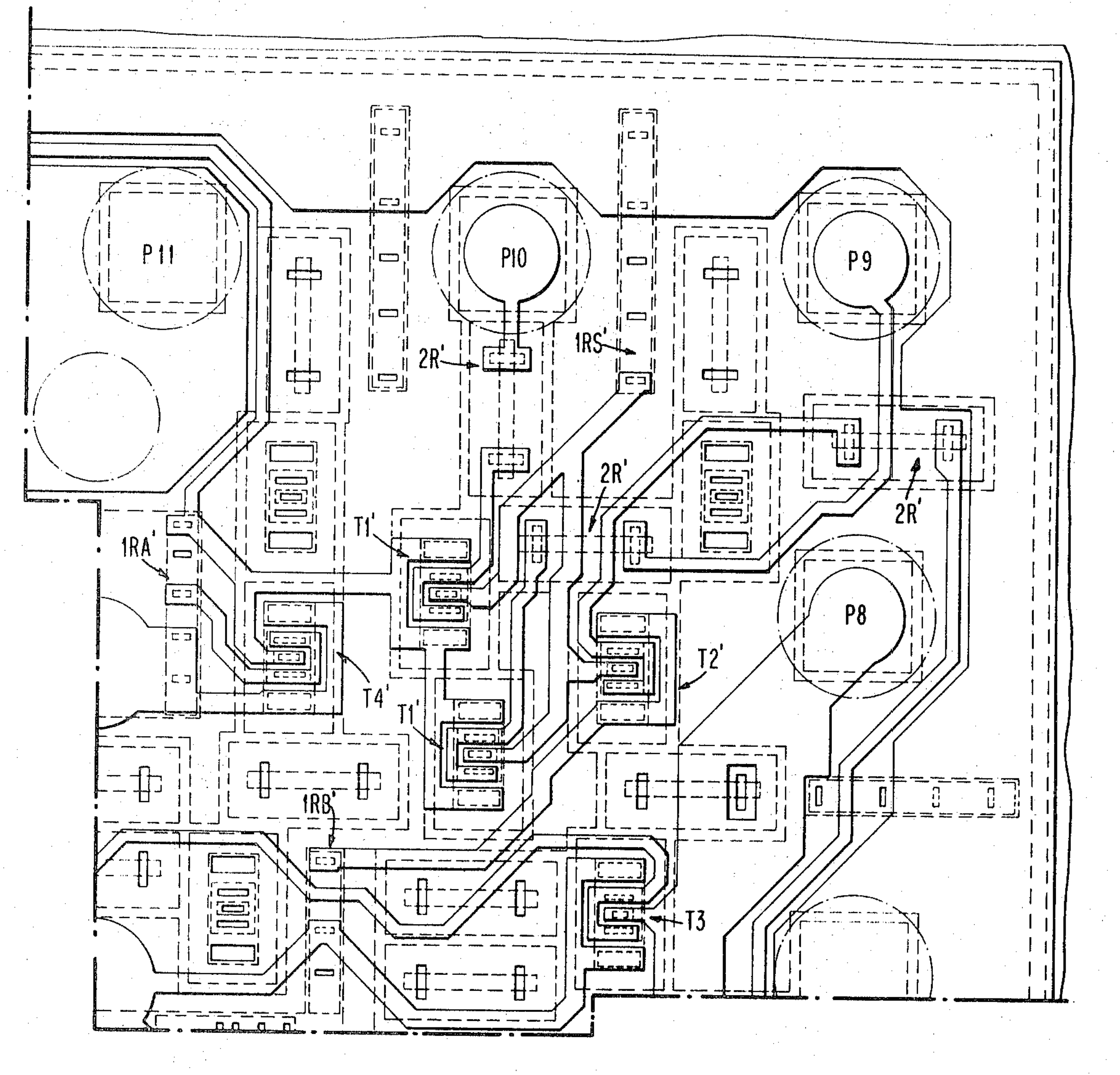
FIG. 21B is an enlarged view of the upper right hand quadrant portion of FIG. 21.
Figure 21C:
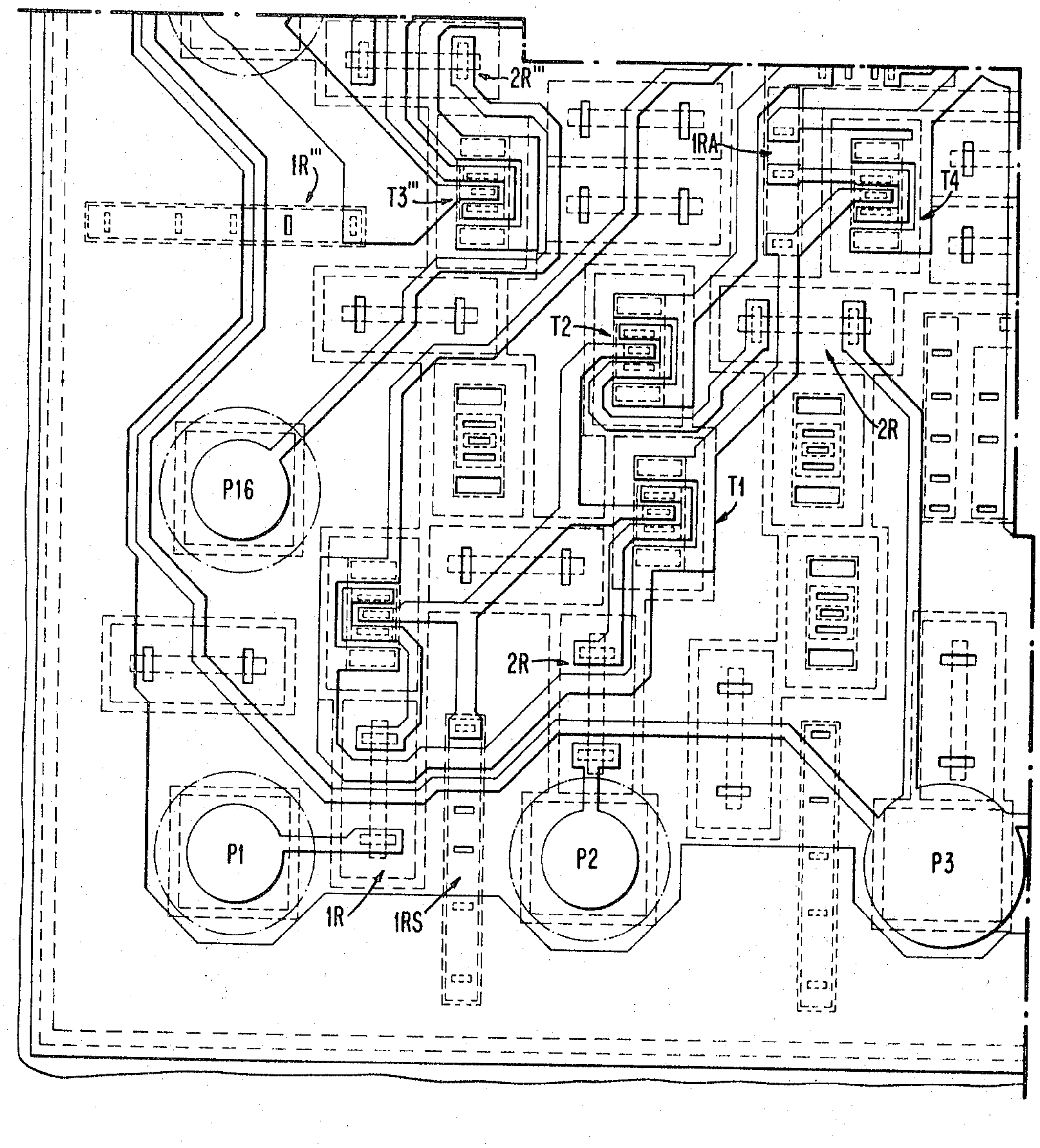
FIG. 21C is an enlarged view of the lower left hand quadrant portion of FIG. 21.
Figure 21D:
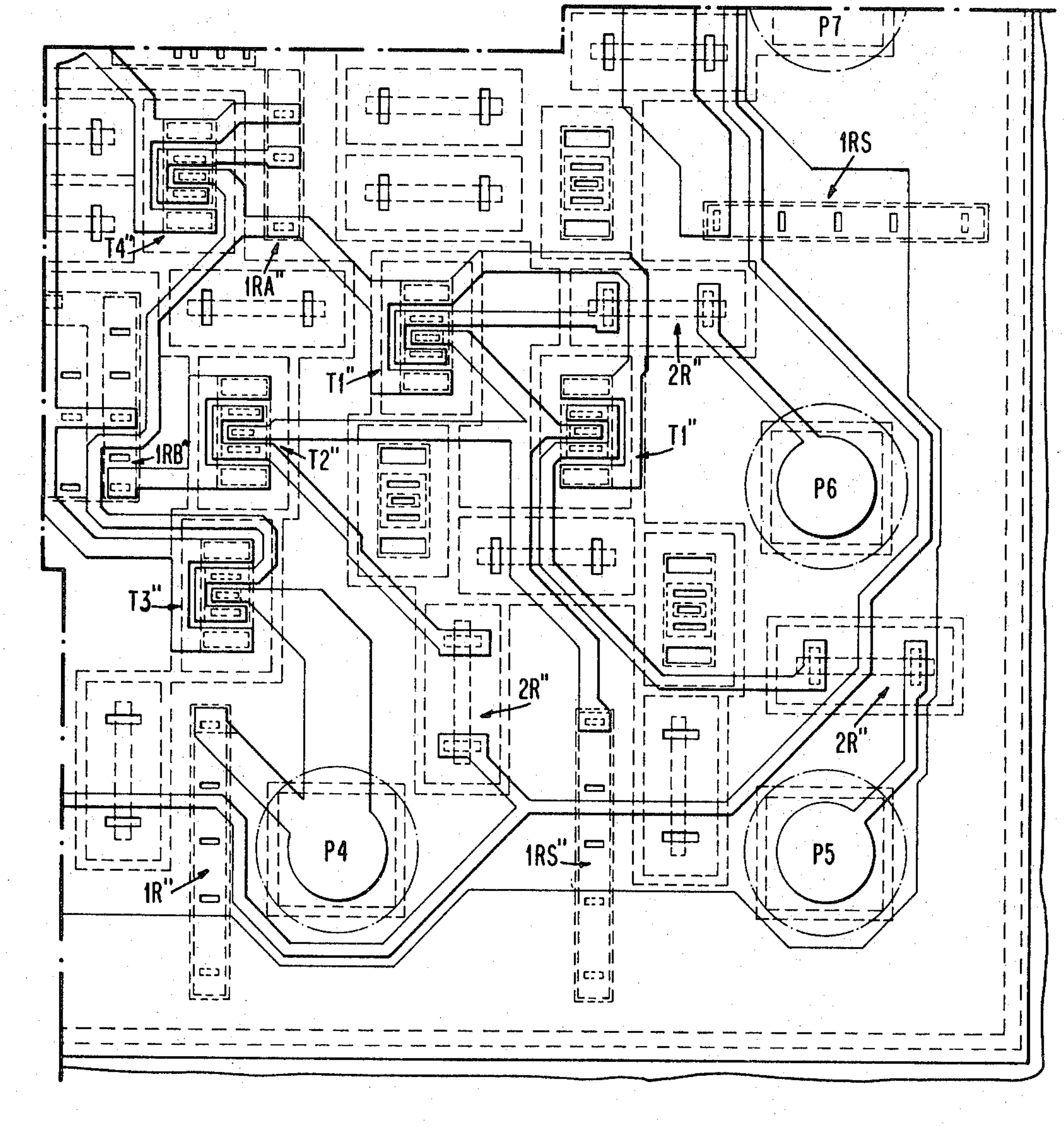
FIG. 21D is an enlarged view of the lower right hand quadrant portion of FIG. 21.

It is very important in fabricating the monolithic integrated device of this invention to place the 1RA and 1RB resistors of each logic circuit (as shown in FIGS. 1C, 3C, 5, 6, 5C, 6C, 21, and 22) close to the +V pad (pad P3 of FIGS. 5 and 6) (pad P11 of FIG. 21). This is the most critical resistor for determining the output level of the logic circuit and hence, undesired voltage drops within the line must be avoided. Each 1RA and 1RB resistor of each circuit must have its own individual current path or conductive link to the +V pad. This is necessary since any shared series resistance between any two 1RA, 1RB or combination resistors will result in an undesirable voltage drop across the shared resistor that is not drawing current thereby reducing the voltage level at the output of the emitter-follower. In integrated structures using more than one circuit on a chip, the metallized lands, which are thin films, have an appreciable series resistance. This is not the case with discrete components conventionally wired to fabricate the circuit.

Figure 6:
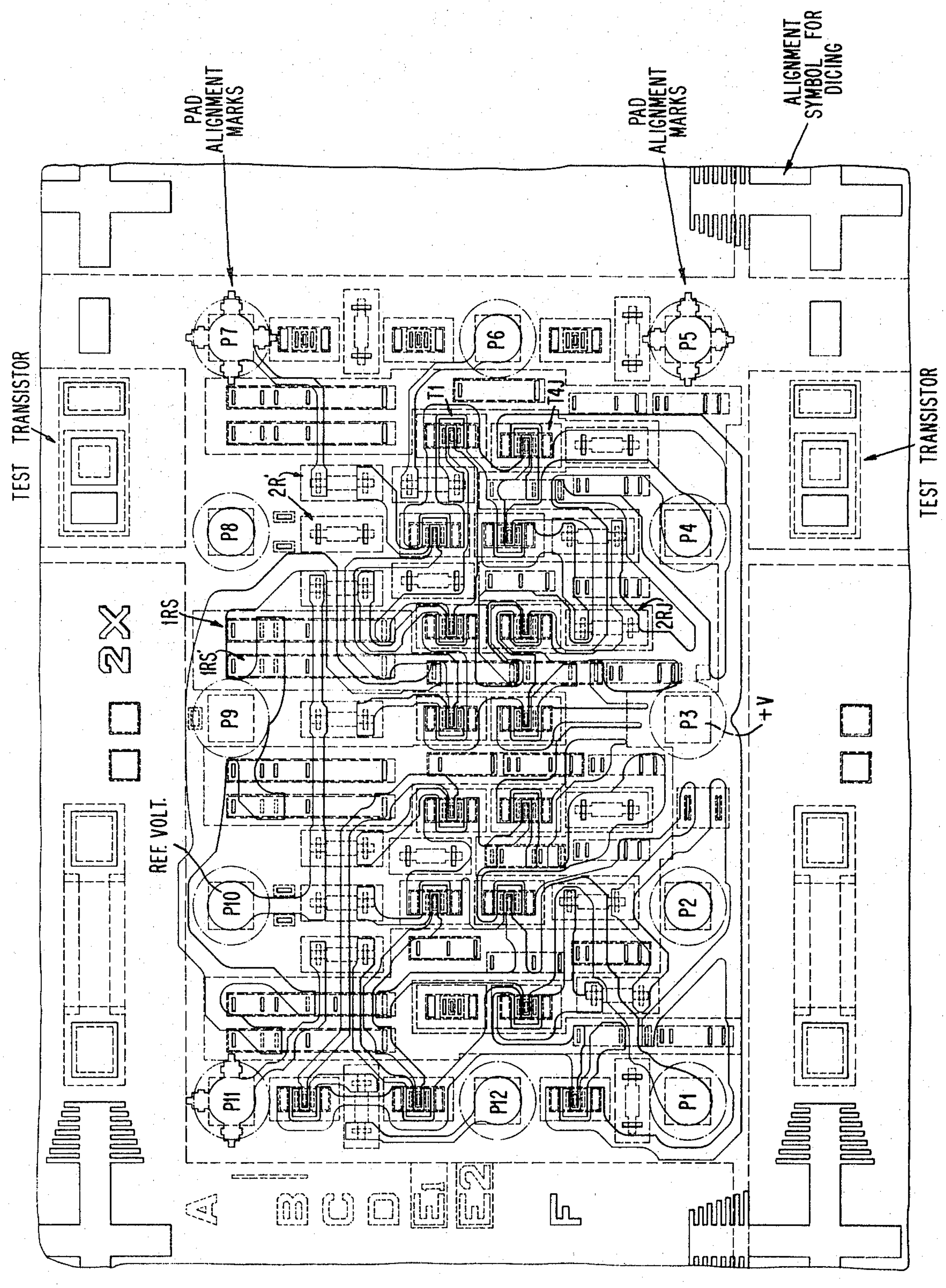
FIG. 6 is a top view of a metallized pattern showing another way of connecting components of the master slice of FIG. 5 to provide a logic type integrated circuit structure substantially as shown schematically in FIG. 3C.
Figure 6:
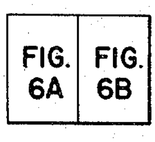
Figure 6A:
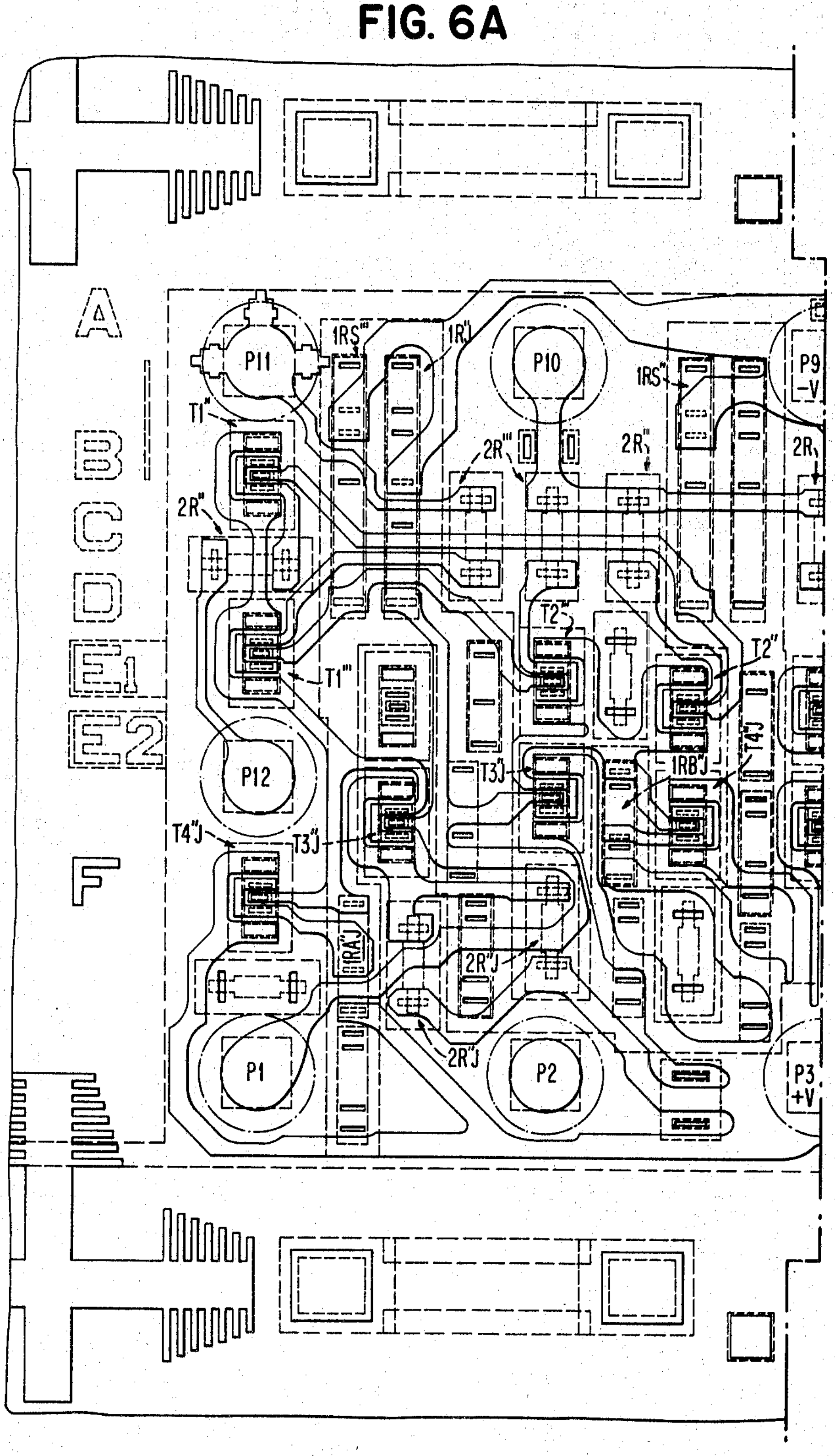
FIG. 6A is an enlarged view of the left hand portion of FIG. 6.
Figure 6B:
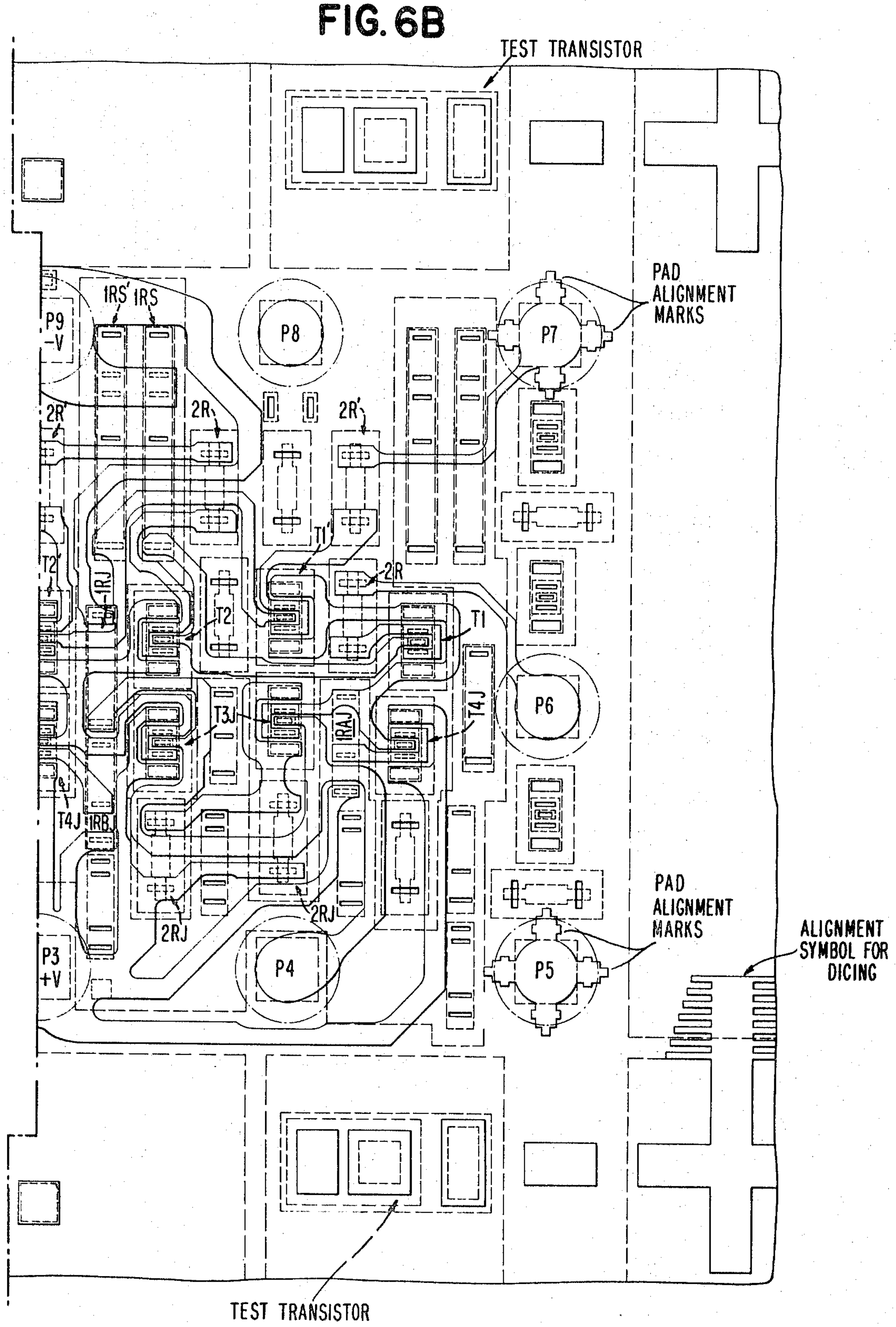
FIG. 6B is an enlarged view of the right hand portion of FIG. 6.

Referring to FIGS. 4, 5, and 6, test structures are identified which are located on the kerf or outer peripheral portion of the master slice. These test structures are useful in permitting non-destructive testing operations to be carried out to test components that are not needed for the integrated circuit and thereby determine whether the integrated circuit components are capable of functioning properly. A test structure of the type shown in these figures is described in copending U.S. patent application Ser. No. 364,834, now U.S. 3,335,340, filing date Feb. 24, 1964, inventors Fred Barson and Walter E. Mutter, and assigned to the same assignee of this invention. In addition, test transistor structures are identified and shown in the kerf portion of the master slice which serve to permit nondestructive testing of the transistor devices that are formed.

A further feature of this master slice is the use of mask identification marks on the left hand portion of the slice which permit the visual identification of the step in the process of the fabrication of the monolithic integrated structure. For example, the letter A indicates that a photolithographic and etching operation using the A mask has been performed. Similarly, the letters B, C, D, E1, and E2 indicate that these photolithographic masking and etching operations have also been performed. In this manner, any person can visually identify the completed step in the fabrication process since each mask letter or corresponding symbol is formed or created at the conclusion of the specific step in the fabrication process. Consequently, no mistakes can be made by redoing a step in the process that has already been carried out as signified by the appropriate mask letter. It should readily be apparent to those skilled in the art that other symbols can be used to indicate the same function. Furthermore, small code letters or numbers can also be used in conjunction with the larger letters to indicate the engineering level so that design and/or process changes in chip fabrication can be monitored and noted permanently on each chip.

When fabricating the metallized structure shown in FIGS. 5 and 6, metallized marks that permit accurate dicing operations to be carried out are located at the four kerf corners of the metallized master slice. These marks are in the form of a stepped rectangle configuration with the differences between each stepped rectangle mark noting a different dimension so that an operator dicing the wafer can readily identify errors in cutting up the wafer by merely noting which stepped rectangle has been cut which thereby indicates the degree of error since each stepped rectangle is a fixed distance from the center line running longitudinally through all the stepped rectangle of a single alignment mark. The metallized pattern shown in FIGS. 5 and 6 utilizes the F symbol to designate that the metallized F mask has been used. A further metallized symbol, 1X (FIG. 5), 2X (FIG. 6), is applied to the metallized master slice to designate the type of circuit that has been fabricated. This symbology is extremely useful in preventing errors in assembling or mounting integrated devices onto a module. Furthermore, this symbology permits relatively untrained people to perform various operations without making errors because of the use of a visual identification mark.

A further very useful alignment symbol is the metallized marks which are 90° apart located on one or more of the corner pads. These marks facilitate photolithographic masking and etching operations that are carried out in connection with the G mask which is used to make openings in a sputtered glass layer to permit subsequent terminal metallurgy to be deposited to form all of the terminal pads P1–P12. These marks are also useful to align the metal masks H and I that are used in making terminal contacts. The degree of misalignment of the masks is indicated by the shape of the mark which functions like the saw-tooth mark used for dicing. Without these alignment marks on the corner pads, it is difficult to line up all of the pads to insure the formation of accurate terminal contacts to all of the pads.

As can be seen by reference to both FIGS. 4 and 20, each master slice or chip has pad areas spaced substantially equally distant from each other with the exception that a longer space is provided between two pair of pad areas for each master chip. Referring to FIG. 5, a longer space is provided between pad areas 6 and 7 and pad areas 11 and 12 than the space provided between any other pair of pad areas. With reference to FIG. 21, a longer space is provided between pad areas 6 and 7 and pad areas 15 and 16 than is provided between the other pad areas of the master slice. The reason for this pad area location configuration is to facilitate mechanical handling of the completed integrated chips with an enlarged slot provided across each integrated device. The slot is defined by the space between pads 6 and 7 and 11 and 12 of the integrated device made from the master chip of FIG. 4. For the integrated device made from the master slice of FIG. 20, the slot is defined by the space between pads 6 and 7 and 15 and 16 of the integrated device made from the master chip of FIG. 20. Hence, these enlarged slots for the integrated devices of the FIG. 4 and FIG. 20 embodiments facilitate orientation, location, and feeding of the integrated chips to equipment for properly placing the chips onto a module using the enlarged space for chip placement purposes.

The master slice of FIG. 20 (see also FIG. 21) uses via holes, which are conductive through holes formed in the sputtered glass encapsulation layer to electrically connect to terminal type regions of the chip. These conductive via holes are formed in the same manner as the terminal pads. These via holes are electrically connected together as shown by the phantom connecting line which designates a conductive land formed on the surface of the sputtered glass layer between via holes.

MASKS

Figure 17:
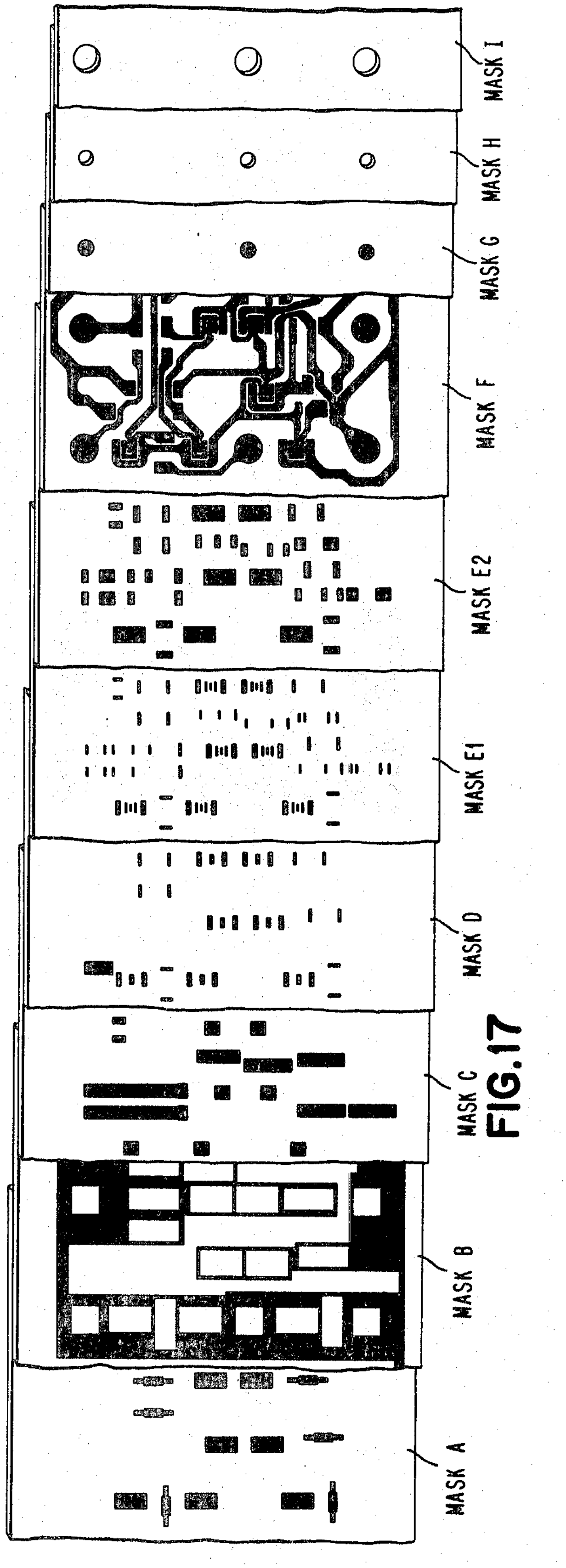
FIG. 17 is a fragmentary, exploded, perspective view of a portion of each mask of FIGS. 7–16 shown in an overlay arrangement.

FIGS. 7, 8, 9, 10, 11, 12, 13, 14, 15 and 16 shows the glass and metal masks that are used in fabricating one monolithic integrated structure of this invention. FIG. 17 illustrates how the masks are placed in alignment in the manner shown during successive photolithographic masking operations.

FIG. 7 is an enlarged view of mask A which is primarily used for sub-collector diffusions for the active and passive devices. The dark patterns in all the glass masks (FIGS. 7–13) serve to prevent light from striking a photosensitive emulsion that has been coated on the wafer. Hence, polymerization of the areas of the wafer shielded by the dark areas of the mask is prevented and therefore, these shielded areas are removed during developing. However, the lightstruck photosensitive areas of the photoresist layer are not removed so as to act as a mask to prevent subsequent chemical etching of the oxide beneath these portions of the photoresist layer. Black boxes CT represent the sub-collector diffused areas for the transistor devices described in FIG. 1T. Black marks identified as C2R represent the sub-collector regions for the 2R resistors as described in FIG. 2R. Alignment mark 70A adjacent the mask designation mark A is a standard line used on all masks to check each mask for line dimension accuracy. Two alignment squares identified as AS are used for mask alignment purposes. One of these squares is always larger than the other square to permit the next mask to be aligned properly. The next mask reverses the sizes used for the alignment squares of the previous mask, etc. The sub-collector for dumbbell or base width test structure is identified as CTS and the sub-collector for the large test transistor is identified as CTT.

Referring to FIG. 8, this is mask B for isolation diffusion. The black area is the $P^+$ isolation diffusion. From this mask, it is clear that all the 1R resistors have a common N bed or region as designated by reference NIR.

FIG. 9 depicts the mask C for P-type or base type diffusions. Reference numeral 10C identifies the rectangular black boxes which represent the P-type diffusion used to make the 1R resistor device as described with reference to FIG. 1R. Reference numeral 12C identifies the square black boxes that define the base diffusion for the transistor devices as described with reference to FIG. 1T. Reference numerals 14C and 16C identify the base regions formed in the "dumbbell" or test structure and the test transistor, respectively. Reference numeral 18C identifies a diffused region that is performed on the isolation regions of the test transistor to keep the oxide thickness at that region the same as the oxide thickness over the base region to facilitate contact hole formation. Reference numeral 20C identifies the diffusion which permits the formation of contact to the P-type isolation from the negative voltage supply. Reference numeral 22C identifies the diffused region for the $P^{++}$ regions of the underpass of FIG. 1U.

Referring to FIG. 10 (mask D), reference numerals 10D represent the emitter regions for the transistor. Numerals 12D represent the two collector contact regions for each transistor. Numerals 14D and 15D represent the two diffusion areas for providing electrical contact to the N-type epitaxial region of each 2R resistor. Reference numeral 16D identifies the two $N^+$ contact regions to the 3R resistor. Reference numeral 18D identifies the $N^+$ contact to the common N epitaxial region of all 1R resistors. Numeral 20D represents the emitter type region of the "dumbbell" test structure. Numerals 22D and 24D identify emitter and collector contact regions of the test transistor.

Referring to FIG. 11, mask E1 is used for forming the contact holes. Reference numeral 10E1 depicts the region on the mask which is used to form the isolation contact hole. Reference numerals 12E1 depict the dark areas on the mask used to form the two contact holes for the base regions of each transistor. Reference numerals 13E1 depict the dark areas on the mask used to form the two contact holes for the collector regions of each transistor. Reference numerals 14E1 represent the dark areas on the mask used in the formation of the contact holes for the emitter portion of each transistor. Reference numerals 16E1 depict the dark areas on the mask used in the formation of the contact holes for the 3R resistor. Reference numeral 18E1 depicts the dark region on the mask used to form the contact hole for the emitter portion of the test transistor device. Reference numeral 20E1 depicts the dark area on the mask used in the formation of the contact hole to the collector portion of the test transistor. Reference numerals 22E1 depicts the dark area on the mask used in the formation of the contact holes for the base portion of the test transistor device. Reference numeral 24E1 is the contact hole for the isolation region of the test transistor. Reference numeral 26E1 depicts the dark areas on the mask used in the formation of contact holes to the "dumbbell" test structure. Reference numerals 28E1 depict each of the two dark areas on the mask used in the formation of contact holes to the 2R resistors. Reference numerals 30E1 identify the U underpass contact holes. Reference numerals 32E1 point out the dark areas on the mask used in the formation of contact holes for the 1R resistors.

Referring to FIG. 12, block out regions for reducing alignment problems are shown in the E2 mask. Black boxes blocking out the transistor areas insure pinhole free oxide films while facilitating alignment of the two E masks. The E2 mark on this mask is permitted because of black box directly beneath the E1 mark on mask E1 of FIG. 11.

With reference to FIG. 13, mask F is shown for the metal interconnections. The dark areas in the mask are used to permit the formation of an aluminum land pattern corresponding to the dark portions of the mask. This aluminum land interconnection pattern serves to interconnect the various portions of the monolithic integrated structure and also serves to provide contact to the test structure. The saw-tooth dicing marks are also formed by this F mask. This F mask interconnects the components as shown by FIG. 6.

Referring to FIG. 14, a mask G is shown for the formation of terminal holes in the sputtered glass (silicon dioxide) layer that is formed on the aluminum interconnection land pattern. Reference numerals 140G depict the dark areas on the mask which permit the formation of terminal holes to the terminal pad regions of the monolithic integrated structure. All the masks depicted in FIGS. 7, 8 , 9, 10, 11, 12, 13 and 14 are made of glass having the dark opaque regions thereon.

With reference to FIG. 15, a metal mask H is shown to permit the formation of Cr-Cu-Au limiting lands by means of openings 150H. As is evident from inspection of FIG. 15 with respect to FIG. 14, the Cr-Cu-Au limiting lands for the chip are formed over the terminal holes formed in the sputtered glass layer.

Referring to FIG. 16, the final metal mask I is shown for forming the monolithic integrated structure. The mask of FIG. 16 is for permitting the formation of Pb-Sn pads. Reference numerals 160I depict the holes in the mask which permit the formation of the Pb-Sn pads over the Cr-Cu-Au limiting lands formed on the chip. As is noted from inspection of FIG. 16 with reference to FIG. 15, the holes 160I of FIG. 16 are much larger in diameter than the holes 150H in FIG. 15 which is necessary for the lead-tin pad reflow operation described in the section entitled "Fabrication Method."

With reference to the mask overlay view of FIG. 17, partial views depict a corner portion of each mask shown in full in FIGS. 7 through 16. FIG. 17 shows how portions of the masks are aligned with respect to each other to provide an understanding of the manner in which the monolithic integrated structure of FIG. 6 is formed. Similarly, other suitably designed masks can form the metallized integrated structures of FIGS. 5 and 21, from the master slice of FIGS. 4 and 20, respectively.

CIRCUIT DESCRIPTION

Referring to FIG.1C, which is an electrical schematic representtion of the logic circuit that is generally known as a current switch-emitter follower (or emitter coupled logic), the logic circuit operation is as follows:

A negative potential is applied to pad P9 which is connected to a resistor 1RS thereby providing a current source to the emitters of transistors T1, T1, and T2 which are common. Input potentials are applied to either one or both of pads P1 and P12. If the input potentials to pads P1 and/or P12 are positive with respect to the base potential applied to T2 then current from the current source 1RS is directed through transistor T1 or both transistors T1 if both are biased with a positive potential. Conversely, if the input potential applied to both pads P1 and P12 is negative with respect to the potential applied to the base of transistor T2, then only the transistor T2 will conduct current from the current source 1RS.

In the case where either one or both T1 transistors are conducting, a potential drop occurs across resistor 1RA which is electrically connected to a positive potential (pad P3) thereby resulting in a reduced potential applied to the bases of transistors T3 (emitter-follower). This results in a reduced current flow through transistors T3 thereby reducing the output potential or voltage at pad P11. The emitters of transistors T3 are electrically connected together to a current source composed of resistor 1R which is electrically connected to pad P9 which is the negative potential pad. The output at pad P11, the out of phase output, is indicative of a logical zero and the output at pad P8, the inphase output, is indicative of a logical one (see also FIG. 2C which shows the logic diagram).

In the case where transistor T2 is conducting, similarly, the same operation described above occurs starting with resistor 1RB. The output at pad P8 is indicative of a logical zero and the output at pad P11 is indicative of a logical one (see also FIG. 2C which shows the logic diagram). It is advantageous to use a plurality of transistors T3 which are connected up in the manner shown in FIG. 1C to thereby reduce the current densities that would otherwise be required to be carried by the lands or transistors. In this manner, transistors that are not used in the master slice for logic purposes can be used as T3 transistors by electrical connection.

Referring to FIG. 3C which is an alternative logic circuit with many features common to the circuit shown in FIG. 1C, the same reference designations common to both circuits are repeated. The basic difference between the two logic circuits is that only one emitter follower transistor T3 is used in the circuit of FIG. 3C which cooperates with transistor T4 in setting a limit for the most negative potential that is applied to the base of the transistor T3. This clamped emitter follower arrangement is more clearly described in U.S. patent application Ser. No. 606,939, filed Jan. 3, 1967, entitled "Digital Circuit With Anti-Saturation Collector Load Network," inventor Joseph R. Cavaliere, and assigned to the same assignee of this invention. FIG. 4C describes the logic diagram of the FIG. 3C circuit.

For wiring purposes, pad P3 can either be directly connected as shown in FIG. 3C or, in the alternative, can be connected through a pair of 2R resistors which are connected in parallel (see the phantom designation of this arrangement in FIG. 3C).

Figure 5C:
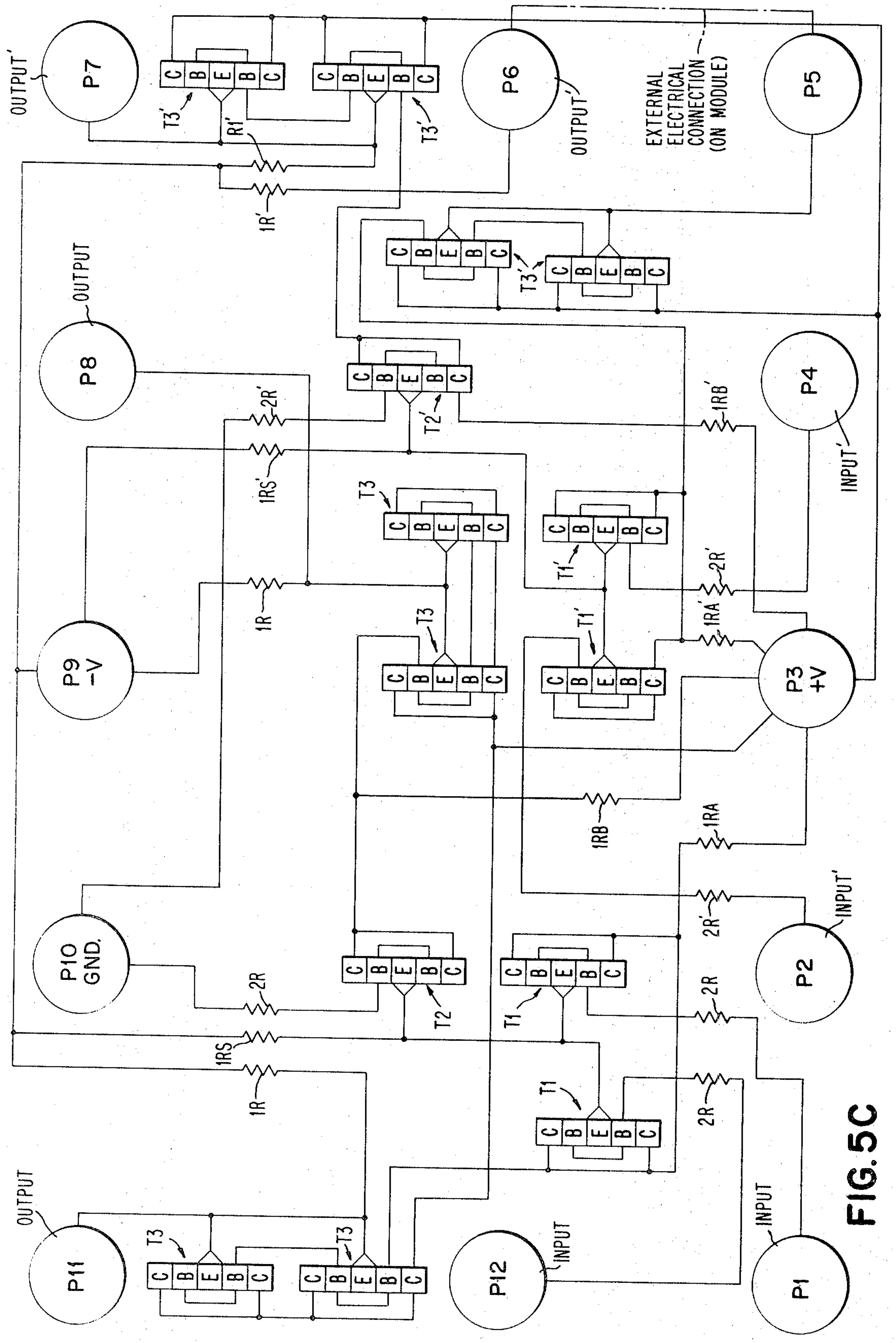
FIG. 5C is an electrical schematic representation of the metallized master slice pattern shown in FIG. 5.

FIG. 5C is an electrical schematic representation of the metallized chip of FIG. 5. FIG. 5C is basically a combination of two circuits shown in FIG. 1C with the prime designation used to indicate or identify the second circuit. The reference number or letter designations used in FIG. 1C are used in FIG. 5C.

Figure 6C:
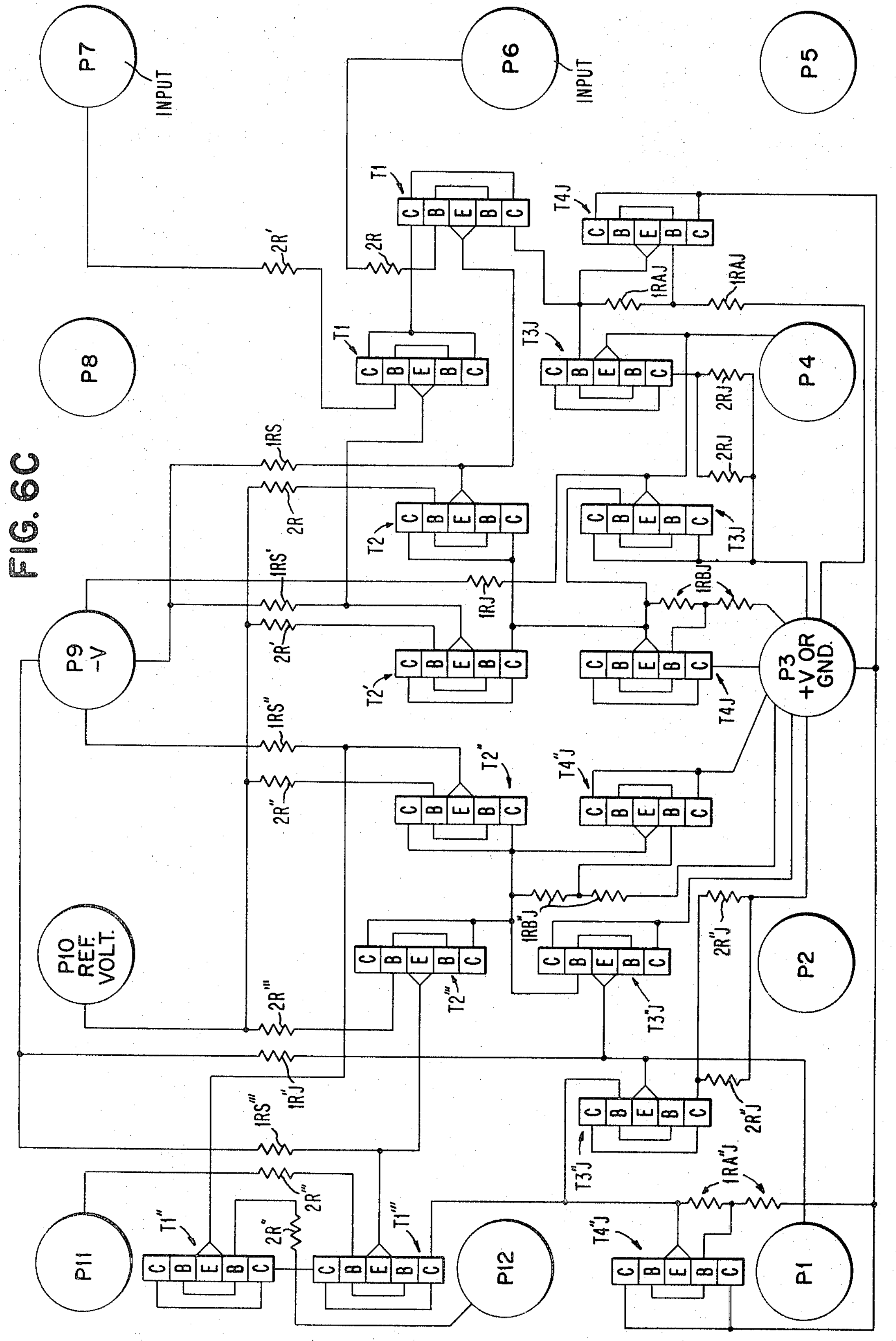
FIG. 6C is an electrical schematic representation of the metallized master slice configuration of FIG. 6.

FIG. 6C is an electrical schematic representation of the metallized chip shown in FIG. 6. FIG. 6C is basically a combination of four circuits as shown in FIG. 3C with the difference being that only one T1 input transistor is used per circuit and two circuits share a common clamped emitter follower. This is achieved by joining together just the two collectors of the two T1's, one from each circuit, and then joining together just the two T2's, one from each circuit, respectively, to the node designated as 1J and 2J in FIG. 3C. Additionally, both clamped emitter followers for each set of two circuits share a common output pad and a common 1R resistor. FIG. 6C illustrates how four circuits are functionally positioned and connected on a chip. The prime designation indicates the distinction between different circuits. For example, T1 is a transistor of one circuit, T1' is a transistor of the second circuit, T1'' is a transistor of the third circuit, and T1''' is a transistor of the fourth circuit. Furthermore, the letter J after certain identified components indicates that these components are shared by two circuits as explained above with reference to the sharing of the clamped emitter followers. The designation used in FIG. 6C to show shared components between circuit 1 and circuit 2 was to use the letter J after a component designated as being part of circuit 1 (no prime). Similarly, shared components between circuits 3 and 4 are identified by the addition of the letter J after a component designated as being part of circuit 3 (double prime).

FIG. 6C illustrates the connection of the pair of parallel 2R resistors as shown in phantom in FIG. 3C. These 2R resistors are identified by the addition of the letter J.

Figure 22:
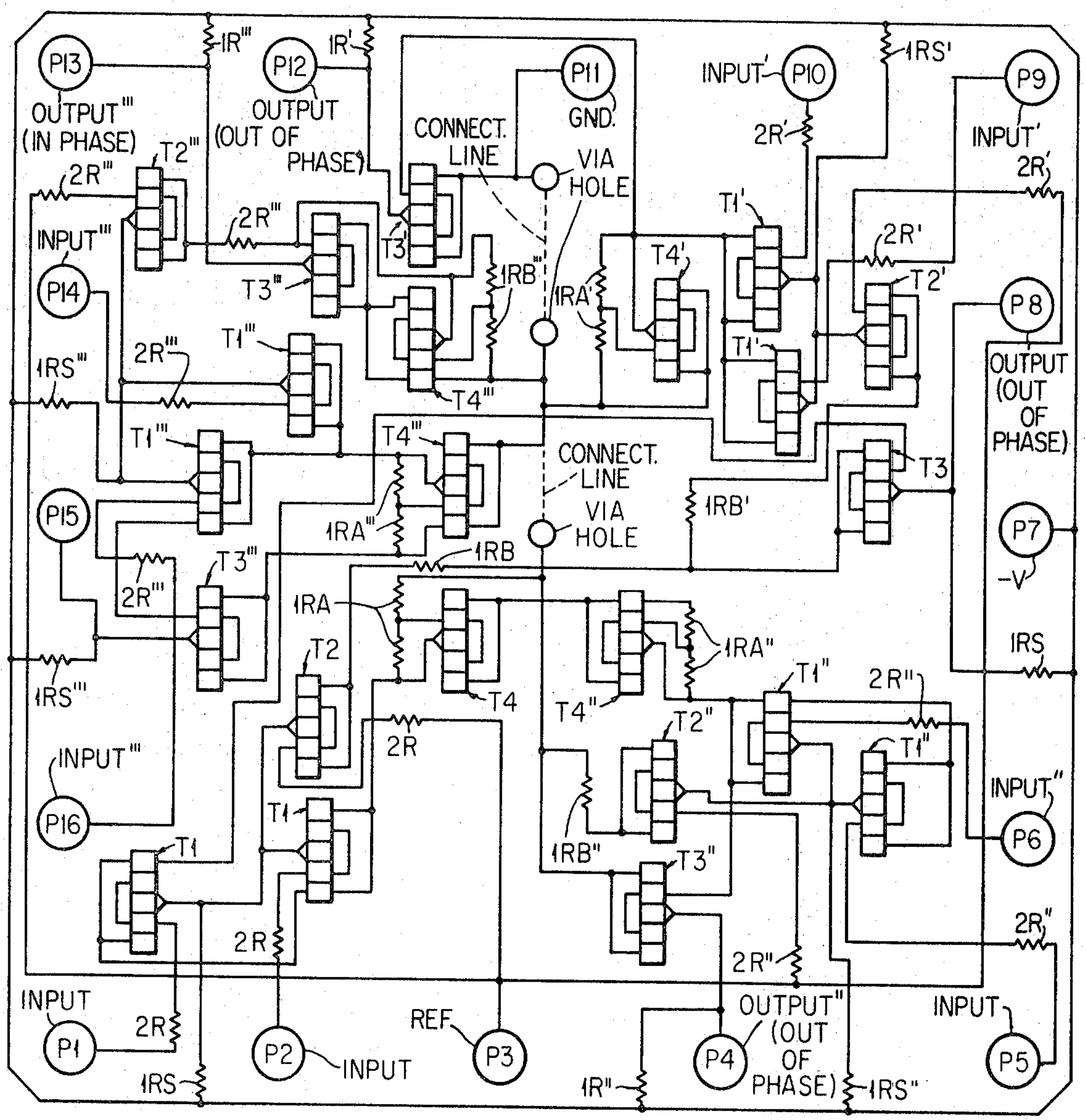
FIG. 22 is an electrical schematic representation of the metallized master slice configuration of FIG. 21.

Referring to FIG. 22, which is an electric schematic representation of the metallized master slice shown in FIG. 21, four circuits are shown. Each of the circuits are designated by the reference numeral designation used in FIG. 3C since the electrical schematic of FIG. 22 is a combination of four circuits substantially identical to the basic circuit shown in FIG. 3C. Hence, reference designations used in FIG. 3C are identical to the reference designations used in FIG. 22. The only difference is that each circuit is either identified by a number without the prime designation (circuit 1), with a single prime designation (circuit 2), with a double prime designation (circuit 3), and with a triple prime designation (circuit 4). Contrary to the electrical schematic shown in FIG. 6C which had only one input transistor T1, two input transistors T1 are used for each of the four circuits. Hence, each of the four circuits of this figure are substantially identical to the circuit of FIG. 3C. The only difference is that the circuits designated by no prime number, a single prime number, and a double prime number, or circuits 1, 2 and 3 respectively, do not use the clamped in phase emitter follower output. In other words, the collector of each T2 transistor is electrically connected through resistor 1RB to the positive or ground pad P11. This in phase output is not needed for these three circuits of this logic chip.

PACKAGE

Figure 18:
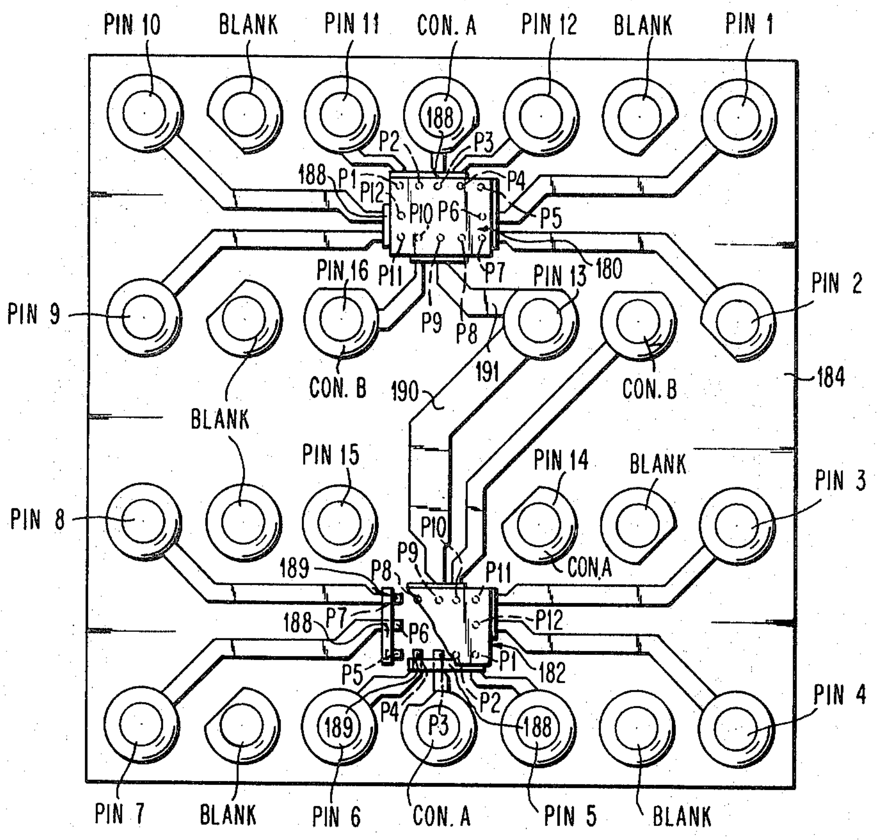
FIG. 18 is a planar view of a package containing two monolithic integrated chips of the type shown in FIG. 6 mounted on and electrically connected to printed conductive lands located on the surface of a dielectric substrate.
Figure 19:
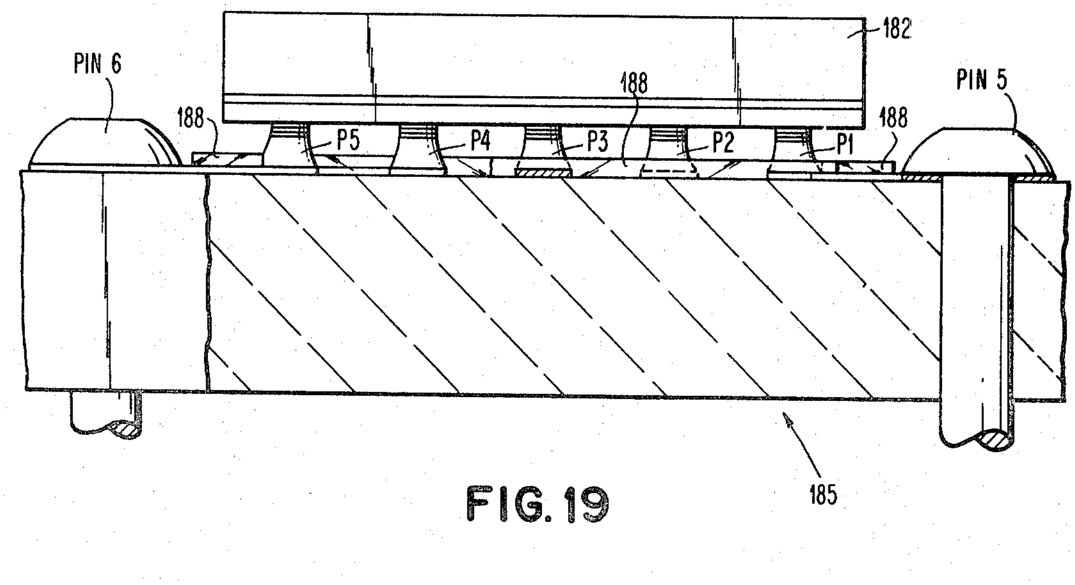
FIG. 19 is an elevational view with parts broken away to show interconnection between one monolithic integrated chip and the conductive lands on the dielectric substrate.

With reference to packaging the monolithic integrated chip shown in the FIG. 6 embodiment, FIGS. 18 and 19 show the manner in which the individual chips are mounted on a conductive land pattern preferably formed on a ceramic substrate.

With reference to FIG. 18, a pair of monolithic integrated chips 180 and 182 (chip 182 being broken away to show underlying construction) are positioned on a printed land pattern corresponding to the pad positions on the chip. The printed land pattern is located on a surface 184 of a ceramic module 185. A plurality of glass dams 188 are formed across the tips of a plurality of printed lands. The formation of the lands and glass dams is described in the above-identified copending Lew Miller patent application now U.S. 3,429,040. Fingers 189 of the lands on the ceramic surface 184 are used to provide electrical contact between the lands of the ceramic substrate and the lead-tin pads of each chip. Conductive lands 190 and 191 connect the common P9 pads of chips 182 and 180 respectively to a common external terminal A located on the surface 184 of the module 185 which is part of Pin 13. Many of the external terminals on the surface 184 of the ceramic module 185 are electrically connected to pins which extend through the ceramic module and permit interconnection, as desired, to an external printed circuit board (not shown). P2, P5 and P8 are not tied to pins.

Similarly, pins 11, 12, 1, 2, 16, 9 and 10 are electrically connected to pads P1, P4, P6, P7, P10, P11, and P12, respectively of chip 180. Pins 5, 6, 7, 8, 3, and 4 are electrically connected to pads P1, P4, P6, P7, P11, and P12, respectively of chip 182. Conductive lands (not shown) located on the other side of the module 185 electrically connect the pads P3 of each chip by means through pin conductor Con A to pin P14. Similarly, pad P10 of chip 182 is electrically connected to pin P16 by means of conductor Con B. Blank terminal pins for the module are available, if necessary.

Referring to FIG. 19, the monolithic integrated chip 182 is shown located on the ceramic module 185. As is clearly shown from this figure, the chip 182 is provided with a positive standoff because of the pads so as to support the chip spaced from the surface of the module 185. The glass dam 188 is also shown in this figure.

Figure 23:
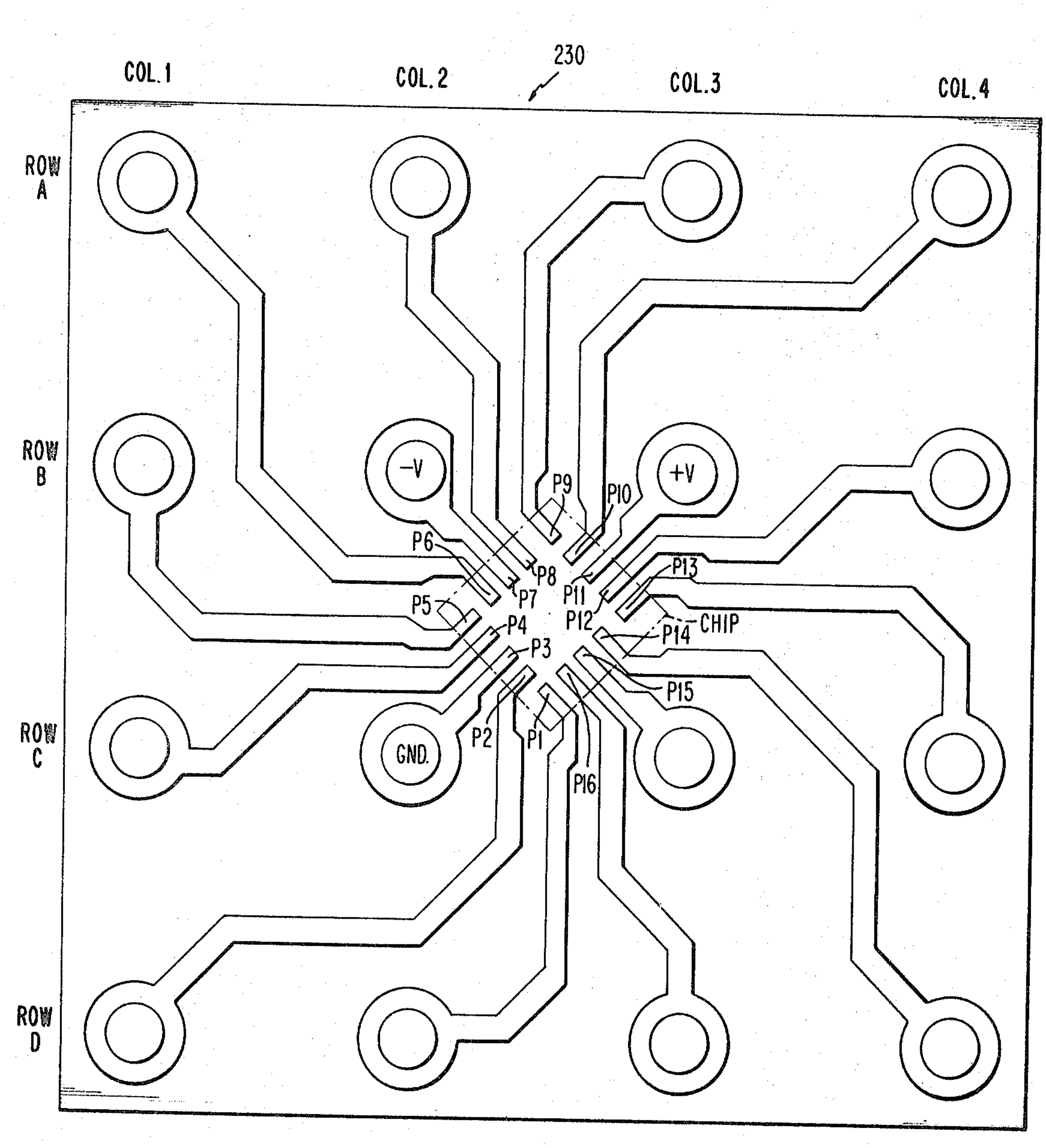
FIG. 23 is a planar view of a package containing the monolithic integrated chip of FIG. 21 mounted on printed conductive lands located on the surface of a dielectric substrate.

Referring to the package arrangement of FIG. 23 which is for the metallized integrated chip of FIG. 21, a module 230, like the module 185 of FIG. 18, is employed to provide electrical communication between the chip and a "daughter" or "mother" printed circuit card containing a number of such modules. Columns 1, 2, 3, and 4 and Rows A, B, C, and D identify the pins that are electrically connected up to the pads of the chip. There is only one pin on the module that is electrically connected to a single pad on the chip. Pads P1, P2, P3, P4, P5, P6, P7, P8, P9, P10, P11, P12, P13, P14, P15, and P16 of the chip are respectively connected to the pins of the module identified as pin Col. 2—Row D, Col. 1—Row D, Col. 2—Row C, Col. 1—Row C, Col. 1—Row B, Col. 1—Row A, Col. 2—Row B, Col. 2—Row A, Col. 3—Row A, Col. 4—Row A, Col. 3—Row B, Col. 4—Row B, Col. 4—Row C, Col. 4—Row D, Col. 3—Row C, and Col. 3—Row D. In this manner, the fan out pattern of conductive lines from the chip on the module surface is in the form of a "sunburst" configuration.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A monolithic semiconductor master slice structure comprising, in combination:

a monocrystalline semiconductor substrate having spaced terminal structures located about the peripheral portion of said structure;

each said terminal structure including an electrically isolated region in said substrate and a metal contact above the surface of said master slice structure;

an excess number of active and passive components located in the area defined by said terminal structures thereby permitting several integrated circuits to be fabricated from said master slice structure by selecting and interconnecting the desired active and passive components; and said integrated circuits being interconnected by lateral electrically conducting paths to specified terminal structures.

2. A monolithic semiconductor master slice structure in accordance with claim 1, in which two of said terminal structures for supplying potential sources of opposite polarity to said structure being substantially centrally disposed between parallel edge portions of said structure.

3. A monolithic semiconductor master slice structure in accordance with claim 1, in which two adjacent spaced terminal structures located on each side of opposite parallel sides of said structure being spaced further apart than the space between any other pair of adjacent terminal structures.

4. A monolithic semiconductor master slice structure in accordance with claim 2, in which a first group of one type of said passive components being located close to one of said two terminal structures for supplying potential sources of opposite polarity to said structure, and a second group of said one type of passive components being located close to the other of said two terminal structures.

5. A monolithic semiconductor master slice structure in accordance with claim 3, in which said space between all adjacent pad areas being the same but for the space between said two adjacent spaced structures located on each side of opposite parallel sides of said structure which are spaced further apart than the equal space between any other pair of adjacent structures.

6. A monolithic semiconductor master slice structure in accordance with claim 1, including test structure means being located outside of the area bounded by said terminal structures for permitting test information to be obtained from said test structure means indicative of the electrical characteristics of the devices located in the area defined by said terminal structures without affecting said devices located in the area defined by said terminal structures.

7. A monolithic semiconductor master slice structure in accordance with claim 1, in which all of one type of passive component having a common semiconductor region.

8. A monolithic semiconductor master slice structure in accordance with claim 7, in which each of said one type of passive component having a common semiconductor region with the others being a resistor.

9. A monolithic semiconductor master slice structure in accordance with claim 8, in which said common semiconductor region being of one type conductivity and electrically isolating each resistor region, which is of the opposite type conductivity, from the other resistor regions.

10. A monolithic semiconductor master slice structure in accordance with claim 1, in which said terminal structures define a parallel-sided configuration.

11. A monolithic semiconductor master slice in accordance with claim 1, in which said isolated region is isolated by junction isolation, said conducting paths are conductive layers separated from said isolated region of each said terminal structure by dielectric layer, a vitreous layer over said conductive layers and said metal contact extending above said vitreous layer.

12. A monolithic integrated semi-conductor chip comprising, in combination:

a monocrystalline semiconductor substrate having spaced terminal structures located about the peripheral portion of said chip and said structure including a metal contact above the surface of said chip;

active and passive components located in the semiconductor area defined by said terminal structures, certain of said passive components having a common semiconductor region;

lateral metal conductive paths on said chip electrically interconnecting less than all of said active and passive components located in the area defined by said terminal structures to specified terminal structures.

13. A monolithic integrated semiconductor chip in accordance with claim 12, in which two of said terminal structures supplying potential sources of opposite polarity to said chip, said two terminal structures being substantially centrally disposed between parallel edge portions of said chips.

14. A monolithic integrated semiconductor chip in accordance with claim 12, in which two adjacent spaced terminal structures located in each side of opposite parallel sides of said chip being spaced further apart than the space between any other pair of adjacent terminal structures.

15. A monolithic integrated semiconductor chip in accordance with claim 13, in which a first group of one type of resistor being located close to and electrically connected to said terminal structure that is positive with respect to the other of said two terminal structures supplying poential sources of opposite polarity to said chip, and a second group of said one type of resistor being located closed to and electrically connected to the other of said two terminal structures supplying potential sources of opposite polarity to said chip.

16. A monolithic integrated semiconductor chip in accordance with claim 12, in which said selected interconnected active and passive components defining at least two logic type circuits having current switches.

17. A monolithic integrated semiconductor chip in accordance with claim 16, in which said logic type circuits being current switch-emitter follower type circuits.

18. A monolithic integrated semiconductor chip in accordance with claim 16, in which said logic type circuits being current switch-clamped emitter follower type circuits.

19. A monolithic integrated semiconductor chip in accordance with claim 16, in which two of said terminal structures supplying potential sources of opposite polarity to said chip, said two terminal structures being centrally disposed between parallel edge portions of said chip, a first group of one type of resistor being accessibly located and electrically connected to said terminal structure that is positive with respect to the other of said two terminal structures supplying potential sources of opposite polarity to said chip, and a second group of said one type of resistor being accessibly located and electrically connected to the other of said two terminal structures supplying potential sources of opposite polarity to said chip.

20. A monolithic integrated semiconductor chip in accordance with claim 19, in which said second group of said one type of resistor being current source resistors supplying current to the common emitters of said current switches, said first group of said one type of resistor being electrically connected to collectors of said current switches.

21. A monolithic integrated semiconductor chip in accordance with claim 20, in which each of said first group of said one type of resistor being separately connected to said positive terminal structure.

22. A monolithic integrated semiconductor chip in accordance with claim 12, in which two adjacent spaced terminal structures located in each side of two opposite parallel sides of said chip being spaced further apart than the space between any other pair of adjacent terminal structures.

23. A monolithic integrated semiconductor chip in accordance with claim 22, in which said spaces between any other pair of adjacent terminal structures being equal, said terminal structures defining a parallel-sided configuration.

24. A monolithic integrated semiconductor chip in accordance with claim 23, in which at least one corner terminal metal contact above the surface of said chip having metallized alignment marks ninety degrees apart from each other.

25. A monolithic integrated semiconductor chip in accordance with claim 24, in which said metallized alignment marks have a substantially saw-tooth configuration.

26. In a monolithic integrated semiconductor chip, a resistor comprising, in combination:

a substrate of one type conductivity;

a low resistance region of the opposite type conductivity located in said substrate and along one surface portion thereof;

a high resistance region of the same conductivity type as said low resistance region located on said substrate and on said low resistance region;

a surrounding region of the same conductivity type as said substrate and in contact therewith electrically isolating said high resistance region;

a pair of spaced low resistivity regions located in surface portions of said high resistance region, each of said pair of spaced low resistivity regions being of the same conductivity type as said high resistance region and right angularly skewed with respect to said separated low resistance region; and ohmic contacts to said pair of spaced low resistivity regions.

27. A monolithic integrated semiconductor chip in accordance with claim 12 in which said passive components having a common semiconductor region are resistors and in which said common region being of one type conductivity and electrically isolating each resistor region which is of the opposite type conductivity, from other resistor regions.

28. In a semiconductor wafer having a plurality of metallized monolithic integrated structures, a series of graded dicing mark indicators located solely at adjacent corners of each of said plurality of metallized monolithic integrated structures.

29. The combination of claim 28, wherein each of said dicing mark indicators being a metallized layer.

30. The combination of claim 29, wherein each of said metallized dicing mark indicators having a stepped rectangle configuration.

31. A monolithic integrated semiconductor chip in accordance with claim 28 comprising a plurality of interconnected active and passive components; and a circuit mark indication located on the surface of said chip.

32. A monolithic integrated semiconductor chip in accordance with claim 31, wherein said circuit mark indication being a metallized layer.

33. A module package for monolithic integrated semiconductor structures comprising, in combination:

a dielectric substrate;

a conductive land pattern formed on a surface of said dielectric substrate;

a plurality of pins for module connection penetrating said dielectric substrate and connected to said conductive land pattern;

a monolithic integrated semiconductor chip including a monocrystalline semiconductor substrate having spaced terminal structures located about the peripheral portion of said structure, each said terminal structure including an electrically isolated region in said substrate and a metal contact above the surface of said master slice structure, said chip further including an excess number of active and passive components located in the area defined by said terminal structures thereby permitting several integrated circuits to be fabricated from said master slice structure by selecting and interconnecting the desired active and passive components, said integrated circuits being interconnected by lateral electrically conducting paths to specified terminal structures;

said monolithic integrated semiconductor chips being spaced from the surface of said dielectric substrate by means of the terminal metal contacts which are connected to said lands, each of said plurality of pins being electrically connected to a terminal metal contact of said chip.

34. A module package in accordance with claim 33, wherein said integrated chip having at least two logic circuits.

35. A module package in accordance with claim 33, wherein said integrated chip being mounted in a diamond-shaped configuration with respect to the dielectric substrate.

References Cited

UNITED STATES PATENTS

| | | | |
|---|---|---|---|
| 2,877,544 | 3/1959 | Gammel | 29—401 |
| 3,252,087 | 5/1966 | Parke. | |
| 3,340,620 | 9/1967 | Meade. | |
| 3,393,349 | 7/1968 | Huffman. | |
| 3,405,224 | 10/1968 | Yawata et al. | |
| 3,412,460 | 11/1968 | Lin. | |
| 3,419,765 | 12/1968 | Clark et al. | |
| 3,419,955 | 1/1969 | Schutze et al. | |
| 3,430,104 | 2/1969 | Burgess et al. | |
| 3,445,727 | 5/1969 | Maple. | |
| 2,884,571 | 4/1959 | Hannahs | 174—68.5 |
| 3,229,119 | 1/1966 | Bohn et al. | |
| 3,239,716 | 3/1966 | Shower. | |
| 3,365,620 | 1/1968 | Butler et al. | |
| 3,368,113 | 2/1968 | Shaunfield. | |
| 3,369,159 | 2/1968 | Sihvonen et al. | |

OTHER REFERENCES

IBM Technical Disclosure Bulletin, vol. 7, No. 9, February 1965, p. 802.

Xerox copy of Perforated Postage Stamp Exhibit.

HERMAN O. JONES, Primary Examiner

J. R. SCOTT, Assistant Examiner

U.S. Cl. X.R.

317—235

PO-1050
(5/69)

UNITED STATES PATENT OFFICE
CERTIFICATE OF CORRECTION

Patent No. 3,539,876 Dated November 10, 1970

Inventor(s) I. Feinberg, J. L. Langdon, C. L. Sitler

It is certified that error appears in the above-identified patent and that said Letters Patent are hereby corrected as shown below:

| | |
|---|---|
| Column 2, Line 7 | change "selected" to --selecting-- |
| Column 8, Line 25 | change "photoltihographic" to --photolithographic-- |
| Column 8, Line 48 | change "chip" to --chips-- |
| Column 8, Line 60 | change "appliaction" to --application-- |
| Column 9, Line 39 | change "$2x20^{20}$" to --$2x10^{20}$-- |
| Column 17, Line 60 | change "of" to --or-- |
| Column 20, Line 69 | change "Figs. 4 and 20" to --Figs. 5 and 21-- |
| Column 25, Line 45 | after "means" insert --of each-- |

Signed and sealed this 1st day of May 1973.

(SEAL)
Attest:

EDWARD M. FLETCHER, JR.
Attesting Officer

ROBERT GOTTSCHALK
Commissioner of Patents